United States Patent
Lim

(10) Patent No.: US 9,866,594 B2
(45) Date of Patent: *Jan. 9, 2018

(54) ENFORCING POLICY-BASED APPLICATION AND ACCESS CONTROL IN AN INFORMATION MANAGEMENT SYSTEM

(71) Applicant: NextLabs, Inc., San Mateo, CA (US)

(72) Inventor: Keng Lim, Atherton, CA (US)

(73) Assignee: NextLabs, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/214,378

(22) Filed: Jul. 19, 2016

(65) Prior Publication Data
US 2016/0330247 A1    Nov. 10, 2016

Related U.S. Application Data

(63) Continuation of application No. 14/624,462, filed on Feb. 17, 2015, now Pat. No. 9,398,051, which is a
(Continued)

(51) Int. Cl.
*G06F 17/00* (2006.01)
*H04L 29/06* (2006.01)
*G06Q 10/10* (2012.01)

(52) U.S. Cl.
CPC .............. *H04L 63/20* (2013.01); *G06Q 10/10* (2013.01); *H04L 63/10* (2013.01); *H04L 67/42* (2013.01)

(58) Field of Classification Search
CPC .................... H04L 63/20; G06Q 10/10
(Continued)

(56) References Cited

U.S. PATENT DOCUMENTS 4,633,430 A    12/1986  Cooper
5,564,016 A    10/1996  Korenshtein
(Continued)

OTHER PUBLICATIONS

Tim Moses et al. eXtensible Access Control Markup Language (XACML) Version 2.0 OASIS Standard Feb. 1, 2005 OASIS Open. (Source:  http://docs.oasis-open.org/xacml/2.0/access_control-xacml-2.0-core-spec-os.pdf see also http://www.oasis-open.org/committees/tc_home.php?wg_abbrev=xacml#XACML20).
(Continued)

*Primary Examiner* — Baotran N To
(74) *Attorney, Agent, or Firm* — Aka Chan LLP

(57) ABSTRACT

A method and apparatus for controlling document access and application usage using centrally managed rules. The rules are stored and manipulated in a central rule database via a rule server. Policy enforcers are installed on client systems and/or on servers and perform document access and application usage control for both direct user document accesses and application usage, and application program document accesses by evaluating the rules sent to the policy enforcer. The rule server decides which rules are required by each policy enforcer. A policy enforcer can also perform obligation and remediation operations as a part of rule evaluation. Policy enforcers on client systems and servers can operate autonomously, evaluating policies that have been received, when communications have been discontinued with the rule server.

16 Claims, 32 Drawing Sheets

Related U.S. Application Data continuation of application No. 14/091,215, filed on Nov. 26, 2013, now Pat. No. 8,959,580, which is a continuation of application No. 11/928,493, filed on Oct. 30, 2007, now Pat. No. 8,595,788, which is a continuation of application No. 11/383,161, filed on May 12, 2006, now Pat. No. 8,621,549.

(60) Provisional application No. 60/755,019, filed on Dec. 29, 2005, provisional application No. 60/766,036, filed on Dec. 29, 2005, provisional application No. 60/743,121, filed on Jan. 11, 2006.

(58) Field of Classification Search
USPC .................................................. 726/1
See application file for complete search history.

(56) References Cited

U.S. PATENT DOCUMENTS

| | | | |
|---|---|---|---|
| 5,629,980 A | 5/1997 | Stefik et al. | |
| 5,634,012 A | 5/1997 | Stefik et al. | |
| 5,638,443 A | 6/1997 | Stefik et al. | |
| 5,715,403 A | 2/1998 | Stefik | |
| 5,987,611 A | 11/1999 | Freund | |
| 6,236,971 B1 | 5/2001 | Stefik et al. | |
| 6,266,670 B1 * | 7/2001 | LaMarca | G06F 17/24 707/999.1 |
| 6,430,549 B1 | 8/2002 | Gershfield et al. | |
| 6,449,617 B1 * | 9/2002 | Quinn | G06F 9/44505 |
| 6,529,985 B1 | 3/2003 | Deianov et al. | |
| 6,578,029 B2 | 6/2003 | Gershfield et al. | |
| 6,594,661 B1 | 7/2003 | Tagg | |
| 6,647,388 B2 | 11/2003 | Numao et al. | |
| 6,701,342 B1 | 3/2004 | Bartz et al. | |
| 6,763,467 B1 | 7/2004 | Radatti et al. | |
| 6,823,460 B1 | 11/2004 | Hollander et al. | |
| 6,839,843 B1 | 1/2005 | Bacha et al. | |
| 6,941,465 B1 | 9/2005 | Palekar et al. | |
| 6,948,070 B1 | 9/2005 | Ginter et al. | |
| 6,948,122 B2 | 9/2005 | Matsumoto | |
| 6,950,943 B1 | 9/2005 | Bacha et al. | |
| 6,961,762 B1 | 11/2005 | Yeap et al. | |
| 7,069,451 B1 | 6/2006 | Ginter et al. | |
| 7,100,199 B2 | 8/2006 | Ginter et al. | |
| 7,143,288 B2 | 11/2006 | Pham et al. | |
| 7,434,048 B1 | 10/2008 | Shapiro et al. | |
| 8,065,713 B1 | 11/2011 | Vainstein et al. | |
| 2001/0003819 A1 | 6/2001 | Matsumoto | |
| 2001/0023421 A1 | 9/2001 | Numao et al. | |
| 2002/0077985 A1 * | 6/2002 | Kobata | G06F 21/10 705/51 |
| 2002/0095432 A1 | 7/2002 | Shimomura et al. | |
| 2002/0099952 A1 | 7/2002 | Lambert et al. | |
| 2003/0004734 A1 | 1/2003 | Adler et al. | |
| 2003/0014418 A1 | 1/2003 | Adler et al. | |
| 2003/0014654 A1 | 1/2003 | Adler et al. | |
| 2003/0055994 A1 | 3/2003 | Herrmann et al. | |
| 2003/0115344 A1 | 6/2003 | Tang et al. | |
| 2003/0177389 A1 | 9/2003 | Albert et al. | |
| 2003/0182583 A1 | 9/2003 | Turco | |
| 2004/0019807 A1 | 1/2004 | Freund | |
| 2004/0078434 A1 | 4/2004 | Parker et al. | |
| 2004/0078591 A1 | 4/2004 | Teixeira et al. | |
| 2004/0107360 A1 | 6/2004 | Herrmann et al. | |
| 2004/0117655 A1 | 6/2004 | Someshwar | |
| 2004/0133777 A1 | 7/2004 | Kiriansky et al. | |
| 2004/0167984 A1 | 8/2004 | Herrmann | |
| 2005/0008163 A1 | 1/2005 | Leser et al. | |
| 2005/0071657 A1 | 3/2005 | Ryan | |
| 2005/0097061 A1 | 5/2005 | Shapiro et al. | |
| 2005/0125688 A1 | 6/2005 | Ogawa et al. | |
| 2005/0210035 A1 | 9/2005 | Kester et al. | |
| 2005/0235204 A1 | 10/2005 | Matsumoto | |
| 2005/0273857 A1 | 12/2005 | Freund | |
| 2006/0047731 A1 | 3/2006 | Matsui | |
| 2006/0080535 A1 * | 4/2006 | Elazar | G06F 21/10 713/176 |
| 2006/0120526 A1 * | 6/2006 | Boucher | G06F 21/6218 380/247 |
| 2006/0137016 A1 | 6/2006 | Margalit et al. | |
| 2006/0174334 A1 | 8/2006 | Perlin et al. | |
| 2006/0179432 A1 | 8/2006 | Walinga et al. | |
| 2006/0277185 A1 | 12/2006 | Sato et al. | |
| 2006/0277409 A1 | 12/2006 | Galwas | |

OTHER PUBLICATIONS

Scott Cantor et al. Assertions and Protocols for the OASIS Security Assertion Markup Language (SAML) V2.0 OASIS Standard Mar. 15, 2005 OASIS Open. (Source: http://docs.oasis-open.org/security/saml/v2.0/saml-core-2.0-os.pdf; see also http://www.oasis-open.org/committees/tc_home.php?wg_abbrev=security).

Kelvin Lawrence et al. Web Services Security: SOAP Message Security 1.1 (WS-Security 2004) OASIS Standard Specification Feb. 1, 2006 OASIS Open. (Source: http://www.oasis-open.org/committees/download.php/16790/wss-v1.1-spec-os-SOAPMessageSecurity.pdf; see also http://www.oasis-open.org/committees/tc_home.php?wg_abbrev=wss).

Kelvin Lawrence et al. Web Services Security Rights Expression Language (REL) Token Profile 1.1 OASIS Standard Feb. 1, 2006 OASIS Open. (Source: http://www.oasis-open.org/committees/download.php/16687/oasis-wss-rel-token-profile-1.1.pdf; see also http://www.oasis-open.org/committees/tc_home.php?wg_abbrev=wss).

Paul Ashley Satoshi Hada Günter Karjoth Calvin Powers Matthias Schunter Enterprise Privacy Authorization Language (EPAL 1.1) Oct. 1, 2003 IBM Research mts at zurich.ibm.com. (Source: http://www.zurich.ibm.com/security/enterprise-privacy/epal/Specification/).

Paul Ashley Satoshi Hada Günter Karjoth Calvin Powers Matthias Schunter The Enterprise Privacy Authorization Language (EPAL)—How to Enforce Privacy throughout an Enterprise IBM Research mts@zurich.ibm.com. (Source: http://www.w3.org/2003/p3p-ws/pp/ibm3.html).

Prateek Mishra et al. Security Services Markup Language Draft Version 0.8a Jan. 8, 2001 OASIS Open. (Source: http://www.oasis-open.org/committees/security/docs/draft-s2ml-v08a.pdf; see also ).

Portable Document Rights Language (PDRL) Specification Version 7.2 Jul. 2006 Adobe Systems Incorporated. (Source: http://www.adobe.com/devnet/livecycle/policyserver/articles/pdrl.pdf; see also http://www.adobe.com/devnet/ivecycle/security.html).

John S. Erickson OpenDRM: A Standards Framework for Digital Rights Expression Messaging and Enforcement Revised Sep. 2002 Hewlett-Packard Laboratories. (Source: http://xml.coverpages.org/EricksonOpenDRM20020902.pdf).

\* cited by examiner

A Policy Enforcer that Supports Multiple Policy Enforcement Points

A Policy Enforcer that Supports Policy Enforcement Point Plug-in Architecture

A Policy Enforcer that Utilizes an External Policy Engine

I&CA – Interceptor and Consequence Applicator

I&CA – Interceptor and Consequence Applicator

I&CA – Interceptor and Consequence Applicator

Network File Share Protocol Server Implemented as a Device Driver (e.g. CIFS)

I&CA – Interceptor and Consequence Applicator

Network File Share Protocol Server Implemented as a Server Program (e.g. NFS)

I&CA – Interceptor and Consequence Applicator

Network File Share Protocol Server and Policy Engine
Running on Separate Computers I&CA – Interceptor and Consequence Applicator I&CA – Interceptor and Consequence Applicator I&CA – Interceptor and Consequence Applicator I&CA – Interceptor and Consequence Applicator I&CA – Interceptor and Consequence Applicator I&CA – Interceptor and Consequence Applicator I&CA – Interceptor and Consequence Applicator (including Obligation Handlers)

I&CA – Interceptor and Consequence Applicator

I&CA – Interceptor and Consequence Applicator
EDSA – Enforcer Data Service Adaptor I&CA – Interceptor and Consequence Applicator

ENFORCING POLICY-BASED APPLICATION AND ACCESS CONTROL IN AN INFORMATION MANAGEMENT SYSTEM

CROSS-REFERENCE TO RELATED APPLICATIONS

This patent application is a continuation of U.S. patent application Ser. No. 14/624,462, filed Feb. 17, 2015, issued as U.S. Pat. No. 9,398,051 on Jul. 19, 2016, which is a continuation of U.S. patent application Ser. No. 14/091,215, filed Nov. 26, 2013, issued as U.S. Pat. No. 8,959,580 on Feb. 17, 2016, which is a continuation of U.S. patent application Ser. No. 11/928,493, filed Oct. 30, 2007, issued as U.S. Pat. No. 8,595,788 on Nov. 26, 2013, which is a continuation of U.S. patent application Ser. No. 11/383,161, filed May 12, 2006, issued as U.S. Pat. No. 8,621,549 on Dec. 31, 2013, which claims the benefit of U.S. patent applications 60/755,019, filed Dec. 29, 2005; 60/766,036, filed Dec. 29, 2005; and 60/743,121, filed Jan. 11, 2006. These applications along with all other cited references in this application are incorporated by reference.

BACKGROUND OF THE INVENTION

The present invention generally relates to the access and usage control and management of information stored in a computer environment. The invention relates more specifically to a method and apparatus for controlling access to and usage of electronic information using centrally managed rules in a computer environment.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networked computer systems have evolved over the years from simple serially connected computer systems to massively networked computer systems connected via large intranets and the Internet. During this evolution, many different concepts were developed to manage how users are granted access to electronic files stored in the computer systems. How a computer system determines if a user permission to access a file has been a complex problem to solve.

Some operating systems use a simple approach to determining whether a user has permission to access a file. For example the Unix operating system gives a system administrator or file owner the ability to attach access permissions to directories and files. There are three types of access permissions that the system administrator or file owner can select from. The permissions are: read, write, and execute. These permissions can then be limited to three types of users: the owner of the file; the group that the owner belongs to; and other users. Each permission and user type has two states: allowed or denied.

Whenever a user accesses a file, the Unix operating system first checks the permissions set for a file against the user's type. The operating system checks if the user falls into any of the three user types. If the user is a member of any of the user types and the user type has been specified as allowed, then the operating system checks which of the permissions are set as allowed. The user is then allowed to perform any access that falls under an allowed permission.

This approach does not offer much flexibility to the system administrator. The system administrator cannot specify particular users other than the owner or particular groups. The permissions are limited to directories and files within the file system and do not cover nonfile system objects such as e-mails and Web pages. Further, the operating system checks permissions for file accesses based only on user and it does not restrict file accesses based on application programs.

A more advanced approach that is commonly used is called Access Control Lists (ACL). ACL uses a language that allows the system administrator or file owner to set read, write, and execute permissions for specific users and groups of users for accesses to files. In some approaches, each set of ACLs for a particular directory reside in a file stored in that directory. The ACLs apply to files that are contained within that directory. When a user attempts to access a file in a directory, the operating system loads the ACL file and reads the ACL rules that were created by the system administrator or user. The operating system determines if the user is allowed to access the file by parsing the ACL rule. In other approaches, a set of ACLs associated with a file is stored as one or more extended file system attributes of the file. In another implementation, access control and auditing ACLs are stored in a security descriptor associated with a file or a directory.

There are many drawbacks to the ACL approach. ACL only applies to files within a file system and does not apply to nonfile system objects. The ACL support is built into the operating system kernel and cannot be extended. ACL is not very portable because it is file system specific and is therefore not universal which means that not all file systems support the same ACL and not all operating systems have the same interpretation of an ACL. When a file is copied from one file system to another (or from one operating system to another), some of the control information may be lost due to compatibility issues. Further, ACL is difficult to apply to users outside of a company's file system (e.g., a customer). Finally, as with the operating system example above, ACL is capable of controlling file accesses by a user but is not capable of controlling file accesses by a particular application program or at a particular time or location.

Applications such as document management systems require a user to check a document in and out of a library system. Once the document has been checked out, it can be distributed and modified in any manner. This means that there is no control over how a document is used once the document leaves the document management system.

BRIEF SUMMARY OF THE INVENTION

A method and apparatus controls document access and application usage using centrally managed rules. The rules are stored and manipulated in a central rule database via a rule server. Policy enforcers are installed on client systems and/or on servers and perform document access and application usage control for both direct user document accesses and application usage, and application program document accesses by evaluating the rules sent to the policy enforcer. The rule server decides which rules are required by each policy enforcer. A policy enforcer can also perform obligation and remediation operations as a part of rule evaluation. Policy enforcers on client systems and servers can operate autonomously, evaluating policies that have been received, when communications have been discontinued with the rule server.

In an embodiment, the invention is a method of controlling application usage in a number of computers using centrally managed rules, the method including the computer-implemented step of controlling usage of an application program on a computer system, where the controlling step limits the application program's operational functionality in accordance to at least one rule stored on the computer system, and the at least one rule contains at least one expression used by the controlling step to control application program operation.

In another embodiment, the invention is a method of controlling document access in a number of computers using centrally managed rules, the method including the computer-implemented step of controlling, on a computer system, access to documents, where the controlling step limits the document access operation in accordance to at least one rule stored on the computer system, and where the at least one rule contains at least one expression used by the controlling step to control document access operation.

In another embodiment, the invention is a method including: controlling usage, at a client system, of an application program, where the controlling step limits the application program's operational functionality in accordance to at least one rule stored on the client system, and the at least one rule contains at least one expression used by the controlling step to control application program operation. Further, the steps include controlling access, at a server, to documents, where the controlling step limits document access operation in accordance to at least one rule stored on the server, and the at least one rule contains at least one expression used by the controlling step to control document access operation.

In another embodiment, the invention is an apparatus for controlling application usage in a number of computers using centrally managed rules, including: a module for controlling usage of an application program on a computer system, where the controlling module limits the application program's operational functionality in accordance to at least one rule stored on the computer system, and the at least one rule contains at least one expression used by the controlling module to control application program operation.

In another embodiment, the invention is an apparatus for controlling document access in a number of computers using centrally managed rules, including a module for controlling, on a computer system, access to documents, where the controlling module limits the document access operation in accordance to at least one rule stored on the computer system, and the at least one rule contains at least one expression used by the controlling module to control document access operation.

In another embodiment, the invention is an apparatus including: a module for controlling usage, at a client system, of an application program, where the controlling module limits the application program's operational functionality in accordance to at least one rule stored on the client system, and the at least one rule contains at least one expression used by the controlling module to control application program operation. Further, the apparatus includes a module for controlling access, at a server, to documents, where the controlling module limits document access operation in accordance to at least one rule stored on the server, and the at least one rule contains at least one expression used by the controlling module to control document access operation.

In another embodiment, the invention is a method of controlling application usage and document access in a number of computers using centrally managed rules, the method including: controlling usage of an application program on a computer system, where the controlling usage step limits the application program's operational functionality in accordance with at least one rule stored on the computer system, and the at least one rule includes a first expression used by the controlling usage step to control application program operation. Further, the steps include controlling, on a computer system, access to documents, where the controlling access step limits the document access operation in accordance with the at least one rule stored on the computer system, and the at least one rule includes a second expression used by the controlling access step to control access to documents.

In another embodiment, the invention is a method of controlling application usage and document access in a number of computers using centrally managed rules, the method including: controlling usage of an application program on a computer system, where the controlling usage step limits the application program's operational functionality in accordance with a rule stored on the computer system, and the rule includes an expression used by the controlling usage step to control application program operation. Further, the steps include controlling, on a computer system, access to documents, where the controlling access step limits the document access operation in accordance with the rule stored on the computer system, and the expression of the rule is used by the controlling access step to control access to documents.

Other objects, features, and advantages of the present invention will become apparent upon consideration of the following detailed description and the accompanying drawings, in which like reference designations represent like features throughout the figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Figure 1:
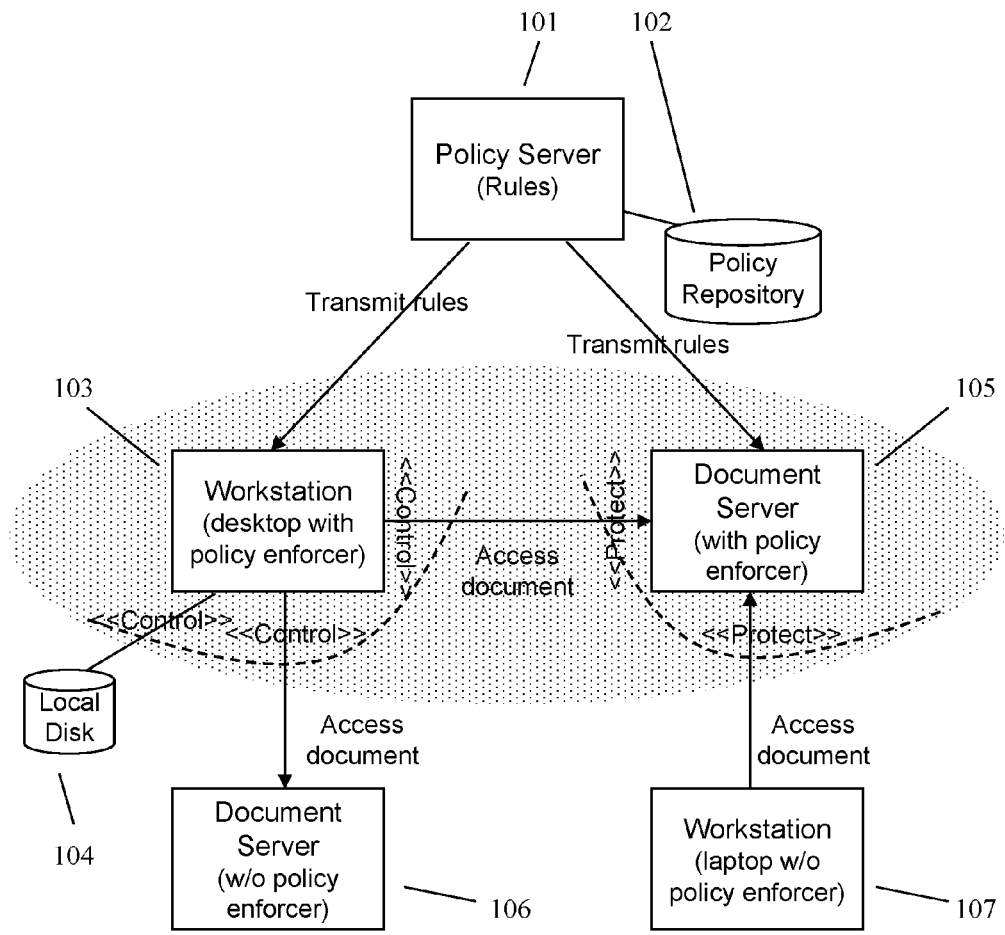
FIG. 1 is a block diagram that illustrates a policy server that centrally manages policies that are used by workstations and servers according to the invention.

A method and apparatus for enforcing control policies in an information management system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described in this application according to the following outline:

| | |
|---|---|
| 1.0 | General Overview |
| 2.0 | Structural and Functional Description |
| 2.1 | A Centrally Managed Policy System |
| 2.2 | Policy Creation and Management |
| 2.21 | Policy Server |
| 2.22 | Intelligence Server |
| 2.3 | Policy Enforcers |
| 2.4 | Example Scenarios |
| 3.0 | Implementation Mechanisms-Hardware Overview |
| 4.0 | Extensions and Alternatives |
| 1.0 | General Overview |

Based on the foregoing, there is a clear need for a system that provides for the control of access to files at both the user and application program levels. Additionally, the system would allow a system administrator to centrally manage access policies for files in workstations and file servers. There is a further need for a system that provides for the control of access to nonfile system objects.

An embodiment of the invention centrally manages policies (or rules) pertaining to the control of access to documents and usage of application data and functions. The policies are stored and manipulated by a policy administrator or user in the policy database via a policy server. The policy server is an intelligent system that has the ability to decide if a single or multiple policies or subset of policies are required by each policy enforcer. The policy server distributes the policies to each policy enforcer.

Policy enforcers are installed on client systems at the operating system level or in application programs (e.g., application programs such as Microsoft Word, Microsoft Excel, SAP Frontend, enterprise resource planning client applications, customer relationship management client applications, Internet Explorer, Mozilla Firefox, Windows Explorer, Notepad, Windows Messenger, Yahoo Messenger, Microsoft Outlook, Windows Media Player, Remote Assistance, FTP client, Java JVM, DOS command shell, DOS programs, and other third party system utilities) on the client system to provide document access and application usage control at the point-of-use. They can also be installed on servers at the operating system level or in an application program on the server to provide protection to the documents on the server.

Policy enforcers are able to perform document access and application usage control for both direct user document accesses and application usage, and application program document accesses and data usage. A document includes any of: a file, a Web page, an e-mail message, a discussion thread, an on-line report, results of a database query, an on-line form, a bitmap, a file system object, a data object managed by a document management system, a data object managed by a content management server, a data object in a product lifecycle management system, a source code file or a code fragment managed by a source code management system, a data object managed by a configuration management system, a data object managed by a project management system, a data object in an enterprise resource planning system, a data object in a customer relationship management system, a data object managed and/or served by a portal server, a data object served by a Web server, a data object managed and/or served by any application server, or any unit of information content stored on volatile or nonvolatile memory.

The client systems and servers can operate autonomously, evaluating policies that have been previously received, when communications have been discontinued with the policy server. For example, a policy enforcer installed on a laptop computer continues to enforce policies installed on or distributed to the laptop computer while the laptop computer is not connected to a network, or the laptop computer is connected to a network but cannot communicate with a policy server. In another example, a policy enforcer installed on a document server continues to enforce policies installed on or distributed to the document server while communication to a policy server is interrupted.

A client system can be a desktop computer, laptop computer, personal digital assistant (PDA), smart phone, thin clients (e.g., HP Consolidated Client Infrastructure clients and Wyse terminals), an instance of client operating environment running on a terminal server (e.g., Microsoft Terminal Server or Citrix MetaFrame), a guest operating system running on a virtual machine (e.g., VMWare Workstation or Microsoft Virtual Server), a server making document access or application usage request (acting as a client in the context of the request), information kiosk, Internet kiosk, and any computing device and computing environment from which a document access or application usage request originates, etc. A server can be a file server, network attached storage (NAS), virtual NAS device (e.g., a NAS switch such as Acopia Adaptive Resource Switch, NeoPath File Director, or Rainfinity RainStorage), edge file gateway (e.g., a wide area file service (WAFS) device such as Cisco File Engine series appliances, Tacit IShared products, or Riverbed Steelhead appliances), Web server, e-mail server, document management system, content management system, portal server, database server, or any other document repository.

In addition to providing control or protection, a policy enforcer can also perform obligation and remediation operations as a result of a document access or application usage attempt (whether successful or not) as dictated by the active policy.

The policies are evaluated when an action is taken by a user or an application to access a document, invoke a function in an application program, or operate on application data object or fragment. The action is intercepted (or detected) and relevant policies are applied before the action is allowed to be carried out. The policies that a policy enforcer can handle can be defined based on the type of action, user, user group, user attribute (e.g., department, role, project or status—full-time, part-time or consultant, user's business function), computer, type of computer (e.g., a laptop or smart phone), group of computers (e.g., "finance department computers"), application program (e.g., Word or Outlook), type of application program (e.g., spreadsheet), application module (e.g., SAP CRM module or Oracle Finance accounting module), location (e.g., New York office vs. London office), connectivity (including access mechanism and bandwidth; e.g., LAN, WLAN, VPN, Bluetooth, Internet, DSL, ISDN, dialup, Remote Desktop Protocol (RDP), Virtual Network Computing (VNC) protocol, latency, secure point-to-point, 56 k, broadband, 100 Mb and 1 Gb), time of day, day of the week, file path, file name, file size, file timestamp, file owner, file properties, document type (e.g., file or e-mail), document format (e.g., xls file or pdf file), document identifier, document classification, document characteristics (e.g., a document contains a watermark), document content, database query, database query result set, database query result set properties, metadata, and more. A policy enforcer can interpret any combination of parameters.

In other aspects, the invention encompasses a computer apparatus and a computer-readable medium configured to carry out the foregoing steps.

| 2.0 | Structural and Functional Description |
|---|---|
| 2.1 | A Centrally Managed Policy System |

An embodiment of the invention centrally manages policies (or rules) pertaining to the controlling of access to documents and usage of application data and functions. Documents can be file system or nonfile system objects. For example, a file system object may be an Excel spreadsheet. A nonfile system object may be an e-mail message or data delivered to an SAP Frontend client application (e.g., information about an employee) by an SAP human resource module running on a server. A document encompasses objects such as a file, an e-mail message, a Web page, an on-line report, an on-line form, a discussion thread, a result set generated by a database query, a bitmap, a file system object, a data object managed by a document management system, a data object managed by a content management server, a data object in a product lifecycle management system, a source code file or a code fragment managed by a source code management system, a data object managed by a configuration management system, a data object managed by a project management system, a data object in a enterprise resource planning system, a data object in a customer relationship management system, a data object managed and/or served by a portal server, a data object served by a Web server, a data object managed and/or served by any application server, or any unit of information content stored on volatile or nonvolatile memory. The policies allow policy enforcers (also referred to as agents) to make decisions on whether to allow or deny access to a particular document, execute a particular application function, or operate on a particular application data object or fragment. The policy enforcers perform document access and application usage control for operations performed in response to direct user action and execution of application program logic.

Referring to FIG. 1, policies are created and managed by a policy server 101. As discussed below, a policy may define to whom and under what condition(s) access to a document is granted or denied. The policies are stored and manipulated by the policy author and policy administrator in the policy repository 102. Policies and/or subsets of policies are transmitted to workstations 103 and document servers 105 to control local and remote document accesses and application usage. A workstation can be a desktop computer, laptop computer, personal digital assistant (PDA), smart phone, thin clients (e.g., HP Consolidated Client Infrastructure clients and Wyse terminals), an instance of client operating environment running on a terminal server (e.g., Microsoft Terminal Server or Citrix MetaFrame), a guest operating system running on a virtual machine (e.g., VMWare Workstation or Microsoft Virtual Server), a server making document access or application usage requests (acting as a client in the context of the request), information kiosk, Internet kiosk, and any computing device and computing environment from which a document access or application usage request originates. A document server can be a file server, network attached storage (NAS), virtual NAS device (e.g., a NAS switch device such as Acopia Adaptive Resource Switch, NeoPath File Director, or Rainfinity RainStorage), edge file gateway (e.g., a wide area file service (WAFS) device such as Cisco File Engine series appliances, Tacit IShared products, or Riverbed Steelhead appliances), Web server, e-mail server, document management system, content management server, portal server, database server, or any other document repository.

A policy enforcer can be installed on a workstation 103 to provide document access and application usage control at the point-of-use. The policies can be stored locally on the workstation. Point-of-use control prevents unauthorized access to documents anywhere on the network and prevents unauthorized application usage and operations on application data or usage of application functions. One may think of point-of-use access control as building a firewall around a user.

Similarly, a policy enforcer can be installed on a document server 105 (e.g., a file server or e-mail server) to provide protection to the documents on (accessible by or managed by) the document server. Server-based protection prevents unauthorized access to documents in a particular repository (or on a server) from any computer on a network, in other words, building a firewall around a server. Besides, an application server policy enforcer such as Microsoft Exchange policy enforcer can also control usage of application data and application functions (e.g., copying an e-mail message, deleting a contact or modifying a calendar entry).

The control and protection functions can be achieved either through one policy or multiple policies defined centrally. The policy server 101 is an intelligent system that has the ability to decide if a single, multiple policies, or a subset of policies are applicable to each policy enforcer. At least a subset of all policies defined is distributed to each policy enforcer.

Controlling document access can have different meanings when operating on different document types. For example, if a document type is a file, then document accesses are file accesses that includes: opening/reading a file, reading a file when connected using VPN, opening a file at a particular time of a day, writing/saving a file, deleting a file, reading a file's permission (or security setting), changing a file's permission, reading a file's attribute, or changing a file's attribute. Another example is when a document type is an e-mail message on a mail server then document access refers to application program internal operations that can include: opening an e-mail, deleting an e-mail, reading an e-mail's attribute, or changing an e-mail's attribute.

Controlling application usage can have different meanings when applied to different applications. For example, if an application is a word processor, then application usage includes: creating a file, opening a file, saving a file, saving a document as a different file, exporting or converting a file to a different format, printing a file, sending a file to a recipient via e-mail, publishing a file in a shared folder, cutting data to a clipboard, pasting data from a clipboard, performing a drag-and-drop operation, adding a macro or a script to a document, or modifying a macro or a script in a document. In another example, if an application is a mail client, then application usage includes: creating an e-mail, opening an e-mail, copying an e-mail, moving an e-mail, archiving an e-mail, saving an e-mail to a file, deleting an e-mail, sending an e-mail, forwarding an e-mail, attaching a file to an e-mail, cutting data to a clipboard, pasting data from a clipboard, performing a drag-and-drop operation, or changing e-mail attributes.

In yet another example, if an application is an enterprise resource planning (ERP) application, application usage includes: creating a quote, converting a quote to an order, viewing customer information, viewing an order, viewing product pricing and discounts, viewing sales data, viewing reports, or viewing employee information.

To control application usage and document access, a policy enforcer may exert control on a computer system at two functional levels. At a first functional level, a policy enforcer detects and controls application operations thereby effecting application usage control. For example, when application usage control is opening a file in Microsoft Word, a policy enforcer detects and controls application operation "File|Open" menu operation in Microsoft Word. At a second functional level, a policy enforcer detects and controls document access operations thereby effecting document access control. For example, when document access control is applied to the same file open action in Microsoft Word, a policy enforcer detects and controls operating system library operations fopen( ), open( ) and FileOpen( ) where these operations are typically required to open a file on local file system or on a file server.

Among the application operations that a policy enforcer may exert control, some application operations may translate into one or more document access operations while other application operations may not perform any document access operation. For example, a user action of opening a file typically translates into an application operation and a document access operation. In another example, a user action of sending an e-mail message in Microsoft Outlook typically translates into an application operation (e.g., "File|Send") and document access operation (e.g. a send function in messaging application programming interface (MAPI)). In yet another example, a user action of pasting data from a clipboard to a document typically generates an application operation but no document access operation.

To control document access and application usage, a policy enforcer may control user interface elements such as visual and input elements of an application program, commands and functionalities of an application program, and information presented to a user. For example, a visual element of an application program includes any of: a menu, a menu item, a button, a list box, a list item, a check box, a tab, a scroll bar, a slider, an icon, an image or a hypertext link. An input element of an application program includes any of: a key event handler, a mouse event handler, or any event handler associated with a visual element.

An application program may support a large number of commands. A command can be invoked by selecting a menu item, pressing a button (shown on a screen), pressing one or more keys, or pressing one or more mouse buttons. A command can also be invoked by a macro or script, or invoked by a code module that calls a function (or method) in an application program interface (API) library. For example, a command can perform a task such as opening a file, sending an e-mail message, editing a cell in a spreadsheet, editing a macro, changing text format, or more.

A function of an application program generally maps to a function or method in a high level programming language. For example, a function in an application program may correspond to a command such as saving a file, sending an e-mail message, or editing a cell formula in a spreadsheet. A function may also represent an internal application program operation such as a call to operating system library function fopen( ).

If information to be displayed contains personal information such as a social security number, personal identification number (PIN) or account balance, then controlling application usage includes: filtering out or obscuring the personal information.

If information to be displayed contains actionable data or objects such as a button, a hypertext link, or a clickable image, then controlling application usage includes: disabling the button, removing the hypertext link, or removing the link associated with the image.

In addition to providing control or protection, a policy enforcer can also perform obligation and remediation operations (described below) as a result of a document access or application usage attempt (whether successful or not) as dictated by the active policy, or policies.

Different levels of control and protection are achieved by distributing policy enforcers to workstations and/or document servers. For example, by using workstation policy enforcers only, such as on workstation 103, one can achieve document access and application usage control that covers access to documents on local disks 104 (i.e., local files), access to documents on a protected document server 105 (i.e., protected by a document server policy enforcer), access to documents on an unprotected document server 106, and application program functions for applications running on the workstation 103.

When only document server policy enforcers are used, such as on document server 105, one can achieve document access protection and application usage control for documents on protected servers when the documents are accessed from workstations with a workstation policy enforcer installed 103 and workstations without a workstation policy enforcer installed 107.

When both workstation policy enforcers and document server policy enforcers are installed, the combined benefit of both installations as described above is achieved.

The policy server 101 allows policies to be centrally managed and automatically distributed and updated to policy enforcers. Distribution is achieved through pushing policies to policy enforcers and/or pulling policies from the policy server 101 by policy enforcers. Policies are not tied to (or stored with) documents. The policies are evaluated when an action is taken by a user (or an application) to access a document or operate on application data. The action is intercepted and relevant policies are applied before the action is allowed to be carried out.

The policies that a policy enforcer can handle can be defined based on the type of action, user, user group, user attribute (e.g., department, role, project or status (e.g., full-time, part-time, or consultant), user's business function), host, group of computers (e.g., "finance department computers"), type of computer (e.g., laptop or smart phone), application program (e.g., Word or Outlook), type of application program (e.g., word processor or spreadsheet), application module (e.g., SAP CRM module or Oracle Finance accounting module), location (e.g., New York office vs. London office), connectivity (including access mechanism and bandwidth; e.g., LAN, WLAN, VPN, Bluetooth, Internet, DSL, ISDN, dialup, Remote Desktop Protocol (RDP), Virtual Network Computing (VNC) protocol, latency, secure point-to-point, 56 k, broadband, 100 Mb and 1 Gb), time of day, day of the week, file path, file name, document size, document timestamp, document owner, document properties, document type (e.g., file and e-mail), document format (e.g., XLS, PDF, or HTML format), document identifier, document classification (e.g., a confidential document or a financial report), document characteristics (e.g., a document contains a watermark), document content (e.g., a document contains a social security number), database query, database query result set, database query result set properties, metadata, and more. Not all of these parameters are required. A policy enforcer can interpret almost any combination.

2.2 Policy Creation and Management

Figure 2:
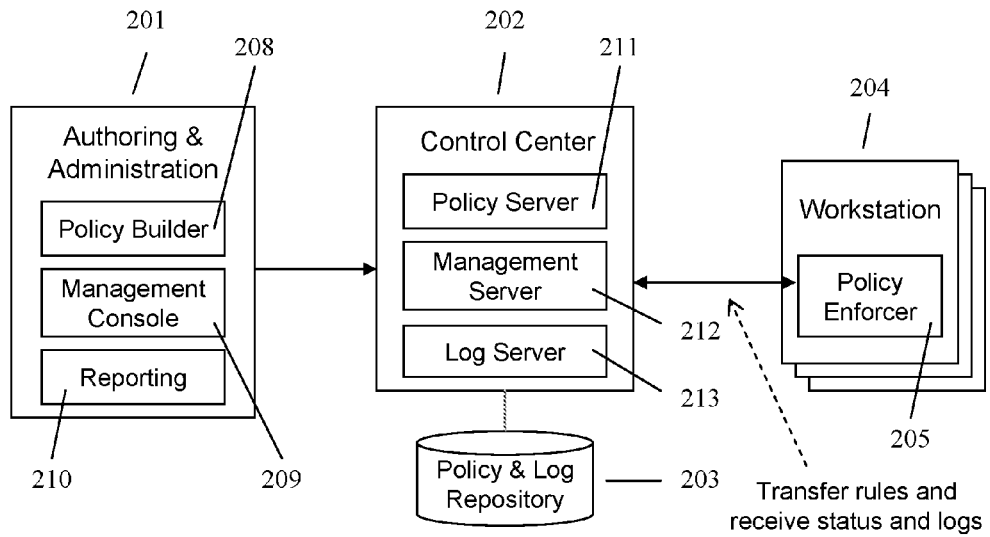
FIG. 2 is a block diagram that illustrates minimal embodiments that utilize a number of workstations each with policy enforcers installed or a number of document servers each with policy enforcers installed according to the invention.
Figure 2:
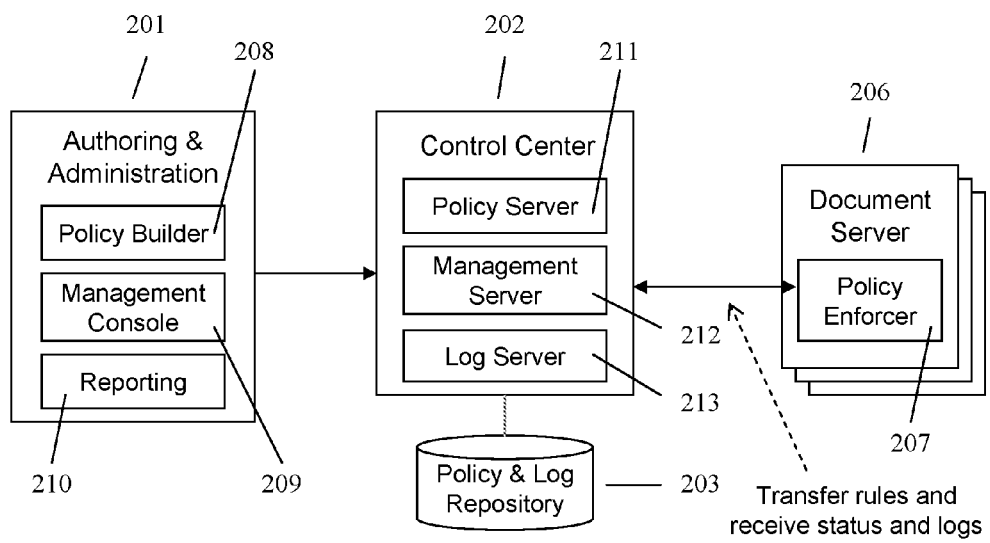

Referring to FIG. 2, minimal embodiments are shown that utilize a number of workstations 204 each with policy enforcers 205 installed or a number of document servers 206 each with policy enforcers installed 207. The authoring and administration module 201 is a client application running on a workstation. It provides the user interface to create, test, publish, modify, delete, and deploy policies, manage system configuration, monitor system health, and view document access activity, application usage activity and policy enforcement activity. The authoring and administration module 201 is connected to the control center 202 which is responsible for policy lifecycle management, system management, log data management and maintaining a central policy and log repository 203.

The policy builder 208 acts as an interface to the policy server 211 and makes it simple for the policy author and policy administrator to create, test, publish, and deploy policy rule statements. The main tasks that can be performed with policy builder 208 are policy authoring and policy administration. Policy authoring functions include creating a policy, modifying a policy, testing a policy, publishing a policy (i.e., making a new policy available for deployment and modifications on an existing policy available for redeployment), and retiring a policy. Policy administration functions include maintaining policy related configurations and deploying policies to policy enforcers.

The management console 209 acts as an interface to management server 212 and is a user interface for managing system configuration and monitoring the health of the system.

The policy server 211 transfers policies to the policy enforcers 205, 207 through a push and/or pull mechanism. The policy server 211 determines what policies are to be delivered to the policy enforcers 205, 207 and when policies are to be updated on the policy enforcers 205, 207. The policy enforcers 205, 207 report status logs to the log server 213 such as what documents were accessed or application program functions were used and by whom (described below) and what enforcement actions have been taken.

The reporting module 210 is a user interface element that interacts with the log server 213 to provide report generation and data analysis functions. The policy author and policy administrator can use the reporting module to view document access activity, application usage activity and policy enforcement activity and investigate cases of potential information misuse or effectiveness of a policy.

Figure 3:
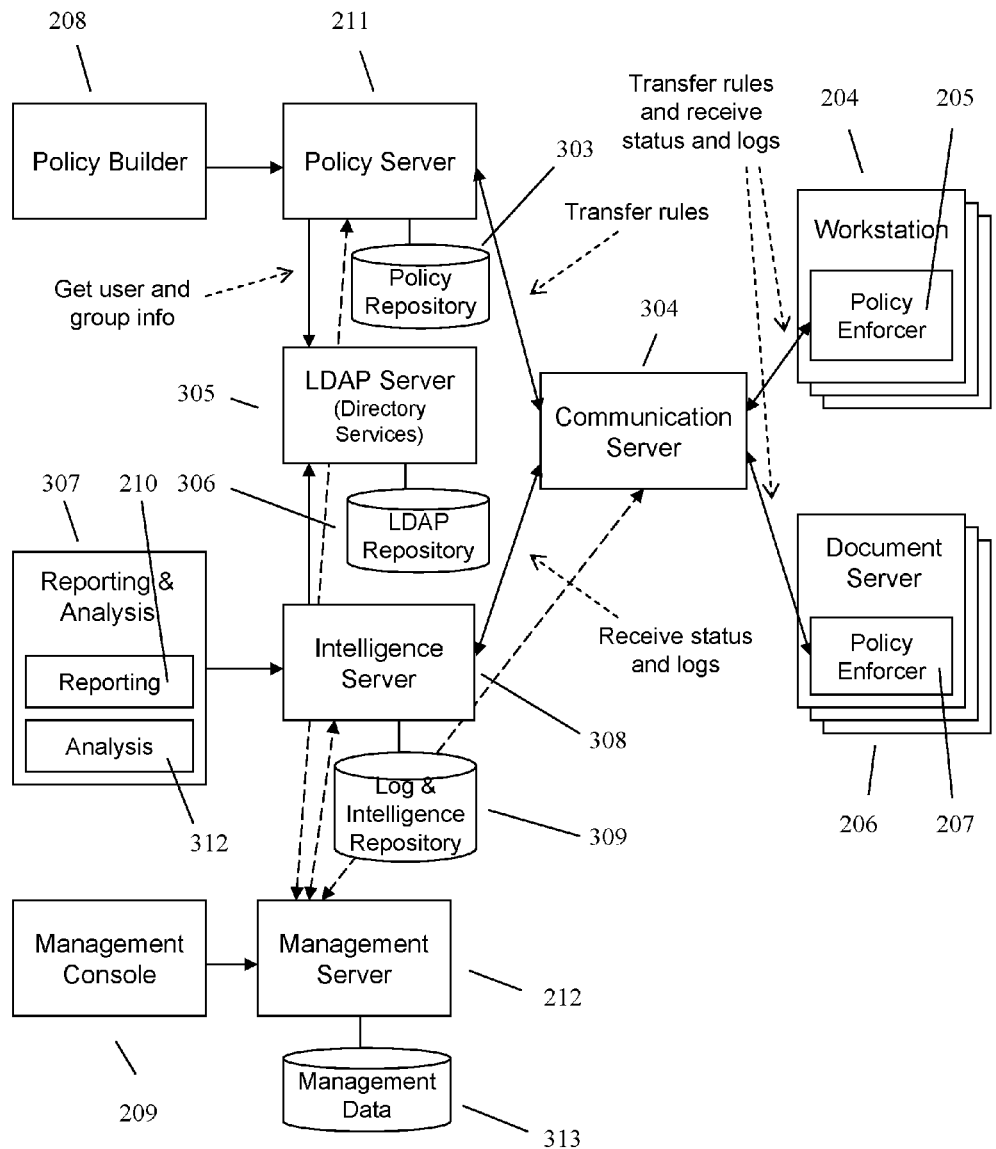
FIG. 3 is a block diagram that illustrates a number of workstations and document servers with policy enforcers installed and coexist within a system according to the invention.

Referring to FIG. 3, a more complex embodiment is shown where a number of workstations 204 and document servers 206 have policy enforcers 205, 207 installed and coexist within the system. The interaction between the policy builder 208, the policy server 211, and the policy repository 303 have been described above.

The reporting and analysis module 307 acts as a user interface to the intelligence server 308 for displaying reports and results from data analysis functions. The reporting module 210 allows the policy author and policy administrator to query and view document access activity, application usage activity and policy enforcement activity. The analysis tool 312 interacts with the intelligence server 308 to perform data analysis which includes event correlation and trend analysis. The policy author and policy administrator can use the capabilities offered by the reporting and analysis module 307 to analyze effectiveness of a policy, document access and application usage activity on a document or on a server, policy enforcement activity, and investigate cases of potential information misuse. The intelligence server 308 provides three functions: log services, integration with external data sources, and data analysis.

The log and intelligence repository 309 is used by the intelligence server 308 to store log data coming from the policy enforcers 205, 207, data from external sources that support event correlation, and data generated by the data analysis services. The log and intelligence repository 309 is normally implemented as one or more relational databases or sets of log files.

The Light Weight Directory Access Protocol (LDAP) server 305 and LDAP repository 306 provide user, user group and host information to the policy server 211 to assist in composing policy and assembling policy subsets and provide information to intelligence server 308 to support report generation and data analysis. Note that LDAP servers are normally deployed in organizations to provide authentication service and are not critical for the operation of the embodiment.

A management server 212 is responsible for system configuration (not policy configuration), system health monitoring, and system control. It provides centralized management of all the components in the system. The management server 212 provides a single location to view system status, modify system configurations, and manage policy author and policy administrator user accounts. The management console 209 is a user interface for system management via the management server 212.

The management server 212 provides services such as: monitoring all other system components including policy servers, intelligence servers, communication servers and policy enforcers; displaying the status of each component; registering new policy enforcers; maintaining a registry of all policy enforcers; managing the configuration for all servers; and managing configuration profiles for policy enforcers.

The communication server 304 is responsible for directing traffic among the policy server 211, intelligence server 308, management server 212 and all policy enforcers 205, 207. The communication server 304 brokers communications between policy enforcers 205, 207, and other servers, including distribution of configuration profiles, policy deployments, and the transfer of log data to the intelligence server 308. The communication server 304 provides a scalable communication service such that the system can support a large number of workstations 204 and document servers 206.

2.21 Policy Server

Figure 4:
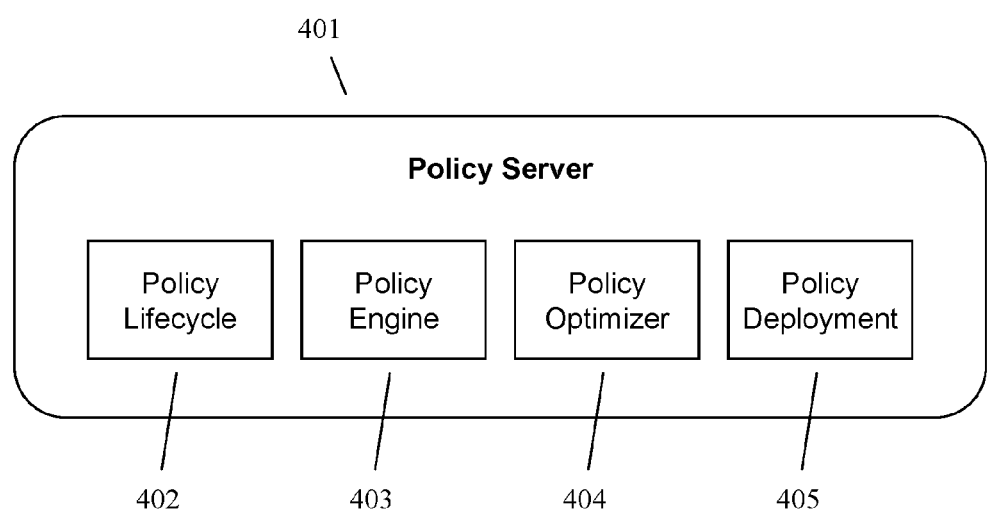
FIG. 4 is a block diagram that illustrates internal components of a policy server according to the invention.

Referring to FIG. 4, the internal components of the policy server 401 are shown. The policy server 401 is responsible for policy management, including policy authoring, life cycle, and deployment. The policy server 401 maintains a policy repository 203, 303 for storing policies. A system typically has at least one policy server 401 and can contain multiple policy servers in order to support a large number of policy builders 208 and policy enforcers 205, 207. The policy server 401 provides the following functions: policy authoring; policy access control; policy lifecycle management; policy management; and policy deployment.

Policy authors and policy administrators access the policy server 401 through the policy builder application 208 which provides a graphical user interface to author policies and manage the policy lifecycle from creation through retirement. Authored policies are stored in a central policy repository 203, 303.

The policy lifecycle module 402 provides policy lifecycle support that covers policy development, deployment and management. For example, policy development uses information about users, user groups, roles of users, user's business functions, actions, hosts, applications, and document resources being supported to compose or update a policy. An environment is also provided to support editing (composition), staging (testing) and deployment of policies.

The policy engine 403 is responsible for policy evaluation (or execution). It helps validate a policy and it is part of the staging environment. Additionally, the policy engine 403 can be set up to support proxy policy evaluation. A proxy policy evaluation request may be generated by a policy enforcer under two situations:

1) A workstation policy enforcer 205 (or document server policy enforcer 207) does not have a policy engine. A policy engine proxy in the policy enforcer relays policy evaluation requests from policy enforcers to a remote policy engine 403 in a policy server 401 or policy decision server (dedicated to make policy decisions) that offers policy evaluation services.

2) A workstation policy enforcer 205 (or document server policy enforcer 207) does have a policy engine, but the local policy engine decides that the local policy subset is not sufficient to make a policy decision and should delegate policy evaluation to a policy engine that has access to a wider policy scope, or access to relevant data. A proxy policy evaluation request is made by a local policy engine to a remote policy engine 403 in the policy server 401 or a policy decision server to complete the policy evaluation.

A policy optimizer 404 is responsible for optimizing the run-time performance of policies. It can be used to optimize policies prior to deploying to a policy enforcer 205, 207. The policy optimizer 404 is not required for a minimal system to operate.

The policy deployment module 405 handles deployment of policies to policy enforcers 205, 207, policy decision servers (not shown) and the location where a policy engine resides. During policy deployment, the policy deployment module may invoke a policy optimizer 404 to optimize a set of polices (the set of policies can be a full set or subset of policies on the policy server). The deployment function may be initiated by a policy server (e.g., via a push operation) or a policy enforcer or target (e.g., via a pull operation). In either operational mode, a full set or a subset of policies is transmitted to a target.

In a policy system architecture that distributes full sets of policies to all policy enforcers, the policy deployment module 405 takes a complete set of policies and sends it to a policy enforcer 205, 207.

In a policy system architecture that organizes policies based on the policy enforcer 205, 207 that the policies target, the policy deployment module 405 receives or locates a policy enforcer's information and delivers the set of policies defined for that policy enforcer 205, 207.

The deployment module can deploy policies in different forms depending on the capability of a policy engine at a target. For example, the set of policies that are transmitted from a policy server to a policy enforcer (or target) may comprise of combinations of the following forms:

(1) ASCII text.
(2) Binary (e.g., code or data).
(3) XML (e.g., in Extensible Access Control Markup Language—XACML format).
(4) Translated and/or compiled form including policies represented in binary form, polices translated into tables (in binary or text form) or policies translated into programming language (such as XML, Java, C#, Perl or Python in source code format or compiled binaries).

2.22 Intelligence Server

Figure 5:
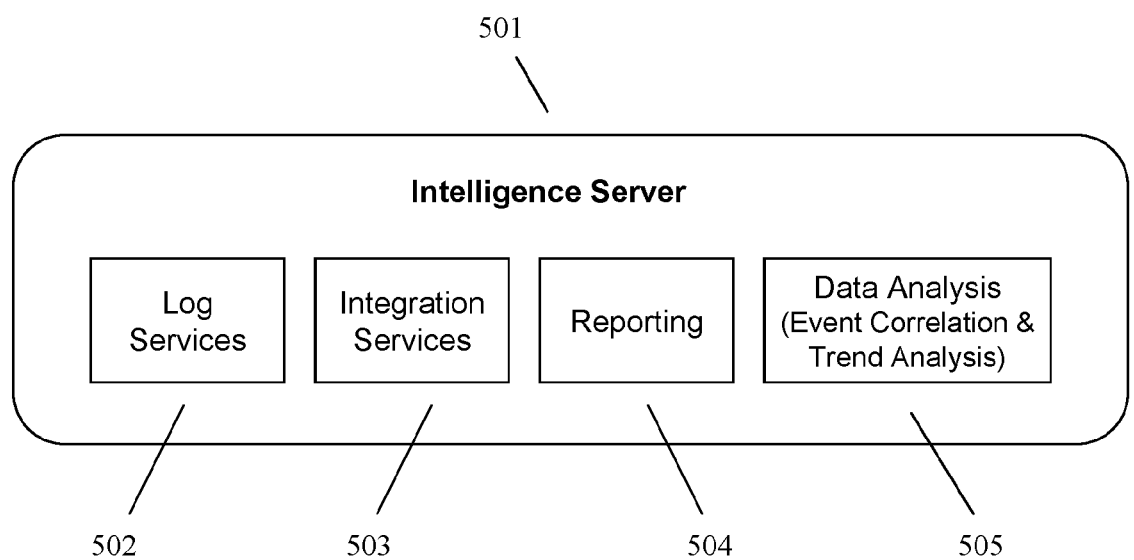
FIG. 5 is a block diagram that illustrates internal components of an intelligence server according to the invention.

Referring to FIG. 5, the internal components of the intelligence server 501 are shown. The intelligence server 501 provides summary, trend, and detailed analysis of document access activity, application usage activity and policy enforcement activity. The intelligence server is accessed using the reporting and analysis 307 software tool that allows business users to create graphical reports to demonstrate compliance, understand application usage, and investigate cases of information misuse. The intelligence server 501 analyzes comprehensive log data captured in a centralized repository, thereby providing insight and accountability for information handling. Policy authors can use data captured by the intelligence server 501 to analyze the effectiveness of a policy. Policy enforcers can utilize the log data and information derived from the log data to support policy evaluation.

The log services module 502 is responsible for collecting and managing log data coming from policy enforcers 205, 207. Log data is normally generated or collected by a policy enforcer or explicitly by a policy via a log handler (an obligation handler) in a policy enforcer 205, 207.

The integration services module 503 is responsible for capturing events that occur outside of the system and providing access to an external data sources when needed. It may collect data produced by other application programs outside of the system or import data stored outside the system into a log and intelligence repository 309. The integration services module can also export log and analysis data to application program or repository outside of the system. It allows the data analysis module 505 to correlate document access activities, application usage activities and policy enforcement activities with events that occur externally to the system.

The reporting module 504 is responsible for providing support to the reporting and analysis tool 307. Its main function is report generation.

The data analysis module 505 provides data analysis functions such as event (or log) correlation. For example, one of the functions of the event correlation engine in the data analysis module 505 is to correlate separate events that occur within a policy enforcer 205, 207 or across multiple policy enforcers 205, 207 to identify trends, repetitions, frauds, hacking attempts and other attacks, bad policy designs, and bad practices by users. The data analysis module 505 can provide several types of analyses:

1) Summary Analysis—document access activity, application usage activity or policy enforcement activity summarized by user, document, host, policy, location, time (e.g., day or week), organization, and more.

2) Trend Analysis—document access activity, application usage activity or policy enforcement activity for a given period of time.

3) Detailed Event Forensics—detailed listing of activities for specific user actions or policy enforcement actions. Detailed reports showing event-level details for document access activity, application usage activity or policy enforcement activity. Compliance officers can use event forensics to investigate specific incidents of information misuse.

2.3 Policy Enforcers

A policy enforcer provides three key functions: interception (or detection), decision, and enforcement.

Interception refers to a function of detecting certain operations (e.g., carried out through altering normal code execution that implements the operation) in an existing application program or operating system to allow the operations to be examined by a policy enforcer before the operation is carried out. Alternatively, interception may refer to a function in an application program or operating system (e.g., the logic is implemented at development time) where the function affects examination of an operation by a policy enforcer before the operation is carried out. For example, the function in an application program is a procedure call to a policy enforcer application program interface (API) library.

Decision refers to a process of evaluating zero or more policies (or rules) relevant to an intercepted (or detected) operation and determine if the operation should be carried out, and if additional action(s) need to be performed.

The enforcement function is responsible for implementing the outcome (sometimes called a policy effect) produced by the decision function. For example, if a policy effect is DENY, an operation is blocked.

Interception and enforcement are normally functions of a Policy Enforcement Point (PEP) and decision is a function of a policy engine (described below). Both the PEP and policy engine are components of a policy enforcer. In addition, a policy enforcer can carry out audit (or log) functions, and obligation and remediation tasks (described below).

There can be at least two types of policy enforcers that can exist in a system to provide a multi-layer approach to information control and compliance enforcement, such as: document server policy enforcers and workstation policy enforcers. Document server policy enforcers are designed to control access to and usage of documents on document servers. While workstation policy enforcers are designed to control end-user access to and usage of documents on workstations and document servers and application usage by end-users at a workstation. Combining both types of policy enforcers in an embodiment provides control over document accesses from a workstation controlled by a policy enforcer, from a workstation not controlled by a policy enforcer, to a document server controlled by a policy enforcer, to a document server not controlled by a policy enforcer, and control the usage of information by organization personnel.

Policy enforcers are responsible for both enforcing policy and collecting audit information (document access activities, application usage activities and policy enforcement activities) for their respective host systems. The policy enforcers intercept end-user or system events (or actions) or application usage (e.g., invoking a function in an application program and operating on data in an application) that may be subject to document access or application usage control policies. The context of each of these events is provided by a PEP to a policy engine that is responsible for evaluating policies relevant to the context of an event. The consequence determined by a policy evaluation is communicated back to the PEP which contains application-specific or system-specific logic to carry out the enforcement function. If the policy evaluation results in the requested event being denied, the PEP typically terminates the request and returns an error status that indicates access is denied or the requested action cannot be performed.

Since policy enforcers have access to information regarding document access and application usage, such activity information (or audit information) can be logged by a policy enforcer to a local or central database. The activity data collected by one or more policy enforcers can be correlated, analyzed, and applied to many applications including: 1) auditing or compliance; 2) investigation; 3) detecting information fraud; 4) detecting information misuse; 5) detecting anomalies; 6) understanding and optimizing resource utilization; and 7) understanding and improving workforce productivity.

The data that is collected by a policy enforcer typically includes a combination of: event(s) (or action(s)), attributes associated with the event, resources associated with the event, identification of the application in which the event occurred (or operation being invoked), under which user account the activity is being carried out, the host computer this event occurred on, and so forth.

Policy Enforcers for Document Servers

Document server policy enforcers are server (e.g., a file server) or server application program (e.g., a mail server) specific policy enforcers. For example, a file server policy enforcer (discussed below) is designed to protect file resources on (or managed by) the file server. In another example, an e-mail server policy enforcer, such as a Microsoft Exchange Server policy enforcer, controls access to and usage of e-mail and other Microsoft Exchange Server application objects on the server. In yet another example, a Document Management System (DMS) policy enforcer controls access to and usage of documents stored in a DMS repository and other DMS-specific application objects.

A document server policy enforcer is installed on a server computer (e.g., a file server) or on the computer where a server application program (e.g., a mail server) is installed. Alternatively, some policy enforcer functions including the policy engine can be distributed to a separate computer. The interception function carried out by a PEP is server and server application program specific and can occur inside a server application program or at the operating system level.

Policy Enforcers for File Servers

A file server policy enforcer is a type of document server policy enforcer. The file server policy enforcer controls access to and usage of (e.g., copy and print) files on file servers. It is installed on a file server machine and enforces document access and/or application usage policies as organization personnel interact with the file server. Document access policies control whether users or application programs are allowed to access files and folders on (or managed by) a file server including: create, read, write, delete, copy, move, and rename files; create, open, delete, and rename folders; access and change file or folder attributes; and create, access, change, rename, and delete links or shortcuts associate with files or folders. The policy enforcers also log accesses to files and folders, and information about each enforcement event.

The file server policy enforcer monitors network requests for files and also monitors file system requests. This architecture allows the policy enforcer to evaluate policies based on the greatest amount of context for each request, since it can use both network-level and file system-level information. Certain file access operations can also be intercepted inside a server application program (e.g., a NFS server) and at the operating system level.

In a specific file system implementation, both a file server policy enforcer and a workstation policy enforcer (described below) are typically needed to provide thorough protection to the resources managed by the file system. For example, Andrew File System (AFS) uses a client application program to cache file system objects on a workstation. With only an AFS server policy enforcer, file system objects cached on a workstation are not protected. In that case, a workstation policy enforcer can be combined with an AFS server policy enforcer to provide complete file system resource protection.

The file server policy enforcer is self-monitoring and self-protecting. When it is running, no user or process can modify, delete, or access the policy enforcer system files including the binaries, configuration files, log files, and policy files. If the policy enforcer is stopped unexpectedly, it is automatically restarted.

Policy enforcers can be installed on some or all file servers within an enterprise, depending on which file servers contain documents that the organization wants to enforce document access and/or application usage policies on. A file server policy enforcer affects only the file server where it is installed. Alternatively, the policy engine in a policy enforcer can run on a computer different from the server being managed.

The file server policy enforcer is responsible for controlling accesses to and usage of files stored on (or managed by) a file server. It can control accesses to and usage of files on a file server by workstations that are controlled or not controlled by policy enforcers.

Policy Enforcers for Workstations

The workstation policy enforcer controls end-user usage of documents on workstations. The policy enforcer is installed on a workstation and controls access to and usage of documents, whether those documents are stored on the workstation or remotely. The policy enforcer detects (or intercept) document access and application usage activity for each application running on the workstation. Detection can occur inside an application program or at the operating system level.

Usage policies control whether users of that workstation are allowed to perform various actions such as sending, printing, or copying documents. Usage policies can also apply to application data to control cut-and-paste, drag-and-drop, allowing only a particular group of users to modify a particular spreadsheet formula, restricting edits to macros or scripts by a user, restricting edits to a specific region in a document by a user, restricting certain application functions based on the type of connectivity (such as VPN), restricting a particular type of edit to a document based on time, and restricting screen capture functions to control any misappropriation of data in a document.

Policy enforcers also collect information about each enforcement event for an activity journal or report. The policy enforcer is self-monitoring and self-protecting. When it is running, no user or process can modify, delete, or access the policy enforcer's system files, including the binaries, configuration files, log files, and policy files.

Policy enforcers can be installed on any number of workstations within an enterprise. Each policy enforcer affects only the workstation where it is installed. Policy enforcers may be embedded into a computing device like PDA or smart phone. The policy enforcer can also be installed on a terminal server (e.g., Microsoft Terminal Server or Citrix MetaFrame Server) to control document access and application usage in each client session.

The workstation policy enforcer is responsible for document access and application usage control at the point-of-use. It has the ability to control application usage and access to documents stored locally on the workstation and remotely on document servers. The document servers may or may not be controlled by policy enforcers. The workstation policy enforcer can also control usage of information at a workstation.

Information Exchange

Policy enforcers have the ability to interact with one another and exchange information in order to perform document access and application usage control at their local levels. Information exchange refers to a first policy enforcer obtaining or collecting information gathered by a second policy enforcer to assist the first policy enforcer in performing a policy evaluation.

Collaborative policy evaluation through information exchange is a way for a policy enforcer to expand the pool of information available to it beyond its execution environment when it evaluates policies. Without the ability to exchange information with a second policy enforcer (or multiple policy enforcers), a first policy enforcer can only evaluate policies based on information available at the first policy enforcer's execution environment. Normally, the information at the execution environment is information collected at the time of interception, configuration parameters, and external information within the immediate operating environment (i.e., information obtainable from the operating system and other application programs).

For example, a server policy enforcer typically has no visibility to application usage information that is available at a client computer. The server policy enforcer may request the client policy enforcer to provide specific application usage information so the server policy enforcer can make its decision using that information.

A policy enforcer may have to implement a policy based on information available at another policy enforcer that is normally not available to the policy enforcer itself. With the information exchange capability, a policy enforcer can evaluate policies based on information available at other policy enforcers.

A policy enforcer's capabilities can be expanded significantly by working with other policy enforcers that can provide the information that the policy enforcer needs to complete a particular policy evaluation.

The following is a more detailed example illustrating how a file server policy enforcer implements point-of-use policies.

1) A file server policy enforcer intercepts a file open operation on a file on the file server:
   a) PROBLEM: The file server policy enforcer normally sees only low level file operations such as open, read, and write. It cannot derive from the intercepted data what a user intends to do with the file. In this case, the file server policy enforcer intercepts a network file operation. The file server policy enforcer identifies a request to open a file but has no idea whether a user opened the file for viewing, printing, editing, copying, or archiving.
   b) SOLUTION A: During policy evaluation, if a user's intended action is communicated to the file server policy enforcer, the file server policy enforcer can process policies specifying point-of-use actions such as COPY and PRINT. The ability to enforce point-of-use action-specific policies enables a document server policy enforcer to guarantee universal protection of its managed resources.
   c) SOLUTION B: A point-of-use policy enforcer provides a user's intended action to the file server policy enforcer prior to policy evaluation at the file server. With the information provided, the file server policy enforcer can evaluate policies that specify a point-of-use action such as COPY or PRINT. If a point-of-use action is not available at the file server during policy evaluation (e.g., the point-of-use has no policy enforcer), the file server policy enforcer may take a default action such as blocking the file open operation or evaluating a different set of policies to determine a policy effect.

For example, a document server may enforce an application usage policy such as "no printing of highly sensitive documents" by using a policy executed on the document server. The document server policy enforcer, during policy evaluation, can obtain application usage information from the workstation policy enforcer that initiated the operation that the document server intercepted. Alternatively, application usage information can be attached to a request that is intercepted by the document server policy enforcer so that application usage information is available to the document server policy enforcer during policy evaluation. Note that application usage information is normally unavailable to a document server policy enforcer because it is typically physically separate from the point-of-use. The application usage information is available only at the point-of-use.

In one implementation of information exchange, a document server policy enforcer requests application usage information from another policy enforcer located at the workstation that initiated the operation that was intercepted by the document server policy enforcer. In the case where a policy enforcer is installed on the workstation, the workstation policy enforcer responds with the application usage information related to the operation. In the case where a policy enforcer is not installed on the workstation or the document server policy enforcer fails to communicate with a policy enforcer on the workstation, policy evaluation at the document server policy enforcer may produce one of: a default effect, evaluating additional policy or policies, or evaluating a different set of policies.

In an implementation of information exchange, a policy enforcer stores information regarding whether another computer has a policy enforcer installed.

In another implementation of information exchange, a policy enforcer queries a server to determine if another computer has a policy enforcer installed.

In yet another implementation of information exchange, a point-of-use policy enforcer attaches application usage information associated with an operation to one or more messages (or network packets) destined to a document server that implements the operation. For example, the message can be a network protocol message (e.g., TCP or UDP).

In another example, the message is a network file share protocol message (e.g., CIFS or NFS). In yet another example, the message is an application protocol message or is encapsulated in an application programming interface (e.g., HTTP, SOAP, Microsoft Windows Messaging API (MAPI) or Java Messaging Service (JMS)). When a document server policy enforcer detects the existence of the application usage information attached to the one or more messages, it extracts the application usage information and applies it to a policy evaluation when appropriate.

The application usage information can be:
(1) attached to a message as one or more message headers;
(2) attached to the end of a message;
(3) stored in one or more custom fields (or custom record or custom entry) in a message; or
(4) stored in the data as one or more comments in a message.

Transfer of Control

When a user copies a document from a document server to a location outside the document server, the source document server loses control of the "copy" of a document. To avoid losing control of important document content after a document is copied a document server policy can block all copy operations unless a policy enforcer at the destination can be detected. What this means is that a document server allows the copying of a controlled document only if it is sure the control can be maintained after the document is copied to another location. A document server policy enforcer can further require that a destination policy enforcer provide certain types of protection and enforce certain set(s) and/or version of policies before the document server policy enforcer transfers control of a document.

Transfer of control refers to a policy enforcer in charge of protecting certain information does not relinquish control of the information (or a copy of it) until the policy enforcer is sure that there is a policy enforcer at the receiving end and that the receiving policy enforcer has sufficient capabilities to continue to protect such information.

To implement transfer of control policies, the following should be in place:
1) One or more directives or expressions in a policy to indicate that a policy enforcer will need to successfully implement the directives or expressions to satisfy the policy condition.
2) At least one policy enforcer that is capable of implementing such a transfer of control directives.
3) Facilities for policy enforcers to communicate so that a policy enforcer can detect the existence of another policy enforcer and exchange information when needed.

In order to implement such policy, a document server policy enforcer must be able to detect if a policy enforcer is running on the destination workstation (or document server). Note that the destination of a copy operation does not need to be the workstation that issues the command; it can be another computer including a workstation and document server. Communication between a policy enforcer at the source and a policy enforcer at the destination can be direct or indirect through a communication server.

For example, a user attempts to copy a sensitive document from his/her company's protected server to a laptop computer. Without a collaborative policy enforcer on the laptop computer, a document server policy enforcer that implements a transfer of control policy will have to block all copy operations to the laptop computer under all circumstances.

One approach used by document management systems allows any user who has access to a protected document to copy (or checkout) a document knowing that the system will lose control of the information once the document is checked out. It is important to note that at the point that a document is released from a document management system, document control no longer exists.

In this example, the server policy enforcer will not allow a file to be copied to a laptop unless there is a workstation policy enforcer running on the laptop. In a more elaborate implementation, the server policy enforcer may ask the workstation policy enforcer for its capability list and policy version number to make sure the workstation policy enforcer has the right capabilities to protect the information.

A similar example can be applied to the viewing of documents. For example, once a document is opened in a word processing software on a laptop, a user may be able to save it to another file, cut-and-paste part of the document, or make a screen capture of the document. A policy enforcer can disable such functions if they are not desirable.

Delegation

Delegation can occur in three ways:
1. A decision point delegates policy evaluation to one or more decision points at different locations.
2. A decision point instructs one or more policy enforcers at other locations to carry out a consequence produced by its current policy evaluation.
3. A decision point posts an event to one or more decision points that causes a policy evaluation at the target locations.

The decision point is a location where a policy engine is installed. For example, a policy engine can be located in a policy enforcer, a policy server, or a policy decision server (dedicated to making policy decisions). The delegation of a policy evaluation is initiated from a policy engine and the target may be the same policy engine (i.e., local delegation) or another policy engine (i.e., remote delegation). However, the delegation of a consequence application is carried out by a policy enforcer.

There are situations where the information required to support the evaluation of a certain policy is not available to a decision point at a particular location or a consequence produced by a policy evaluation needs to be carried out at one or more locations different from where the decision point is located.

For example, a decision point can delegate a policy evaluation to a decision point that has access to the proper information required to complete the policy evaluation so it can address the information availability issue. Note that in some situations, information availability issues can also be addressed using the information exchange technique described above.

When a policy consequence needs to be carried out at different location(s), it can be handled using the policy consequence delegation technique (2). Alternatively, the post event technique (3) can be used to implement the delegation of a policy consequence.

Delegation is a way for one decision point to ask another decision point to execute a policy on its behalf—one policy engine asks another policy engine to execute a set of policies. A policy engine does not need to be running inside a policy enforcer. It may be one of the policy engines in a policy decision server.

1) Policy evaluation: In the case where information that is available to other decision point(s) is required to complete a policy evaluation, there are two approaches that can be used: 1) use the information exchange technique to obtain the needed information to complete the policy evaluation; or 2) delegate the policy evaluation (complete or partial) to a decision point that has access to the information needed to complete the policy evaluation.

2) Consequence application: In the case that a consequence of a policy needs to be applied at one or more locations different from where the decision point is located, a decision point can complete the evaluation of a policy and delegate the consequence application to one or more policy enforcers. Delegation of a consequence application can be made synchronously (waiting from the helper policy enforcer to complete the consequence application) or asynchronously.

3) Posting an event: A decision point can post an event to one or more target decision point. A posted event is similar to an intercepted operation except the action specified is often an internal event rather than an intercepted action. For example, an intercepted action may be OPEN, SEND and COPY. An internal event may be user defined and can include: APPLY-DELETE, FLUSH-BROWSER-CACHE, or DISABLE-INSTANT-MESSENGER. The posted event becomes an action for the target decision point and the parameters submitted with the event become the resource, subject, and context attributes of the event (or request). The consequence application function discussed throughout can also be carried out using the event posting technique. In addition to the consequence application function, event posting can be used to trigger a policy evaluation at any number of decision points. The event posting operation can be made synchronous or asynchronous. An event to be posted is normally specified in the consequence portion of a policy. When posted, such an event will trigger a policy evaluation at the target location. Additional data is normally posted along with the event and may include: source action, context, resource, and subject information.

For example, in the case of delegating a policy evaluation, when a workstation policy enforcer does not have the information needed to complete the evaluation of a policy, it can delegate the policy evaluation to a server policy enforcer that has access to the information required to complete the policy evaluation. The consequence of a policy evaluation produced by the server policy enforcer is returned to the workstation policy enforcer so the policy consequence can be applied at the workstation.

In another example of delegated policy evaluation, a master decision point can delegate the evaluation of policies to more than one helper decision point. A master decision point can be a policy engine in the workstation policy enforcers or document server policy enforcers or a policy engine in a policy decision server (a centralize cluster of policy engines dedicated to perform policy evaluation). A helper decision point can be any one of the policy engines listed above other than the master policy engine. The master decision point can combine the consequences collected from the helper decision points and apply the combined consequences.

A master decision point (especially a policy enforcer) may not have the visibility to certain information that is required to evaluate a particular policy. By delegating the evaluation of that particular policy at a location where the required information is available or accessible, the master decision point and helper decision point(s) can operate collaboratively to process complex policies. The master decision point queries helper decision points to find out if the helper decision point exists and also whether the helper decision point has the ability to evaluate and/or enforce the policy.

A master decision point (especially a policy decision server) can act as a coordinator that coordinates policy evaluation at multiple locations. This type of function is often found in maintenance policies where a master policy executed at a central location distributes policy evaluation tasks to decision points at remote locations. For example, a master decision point may instruct policy enforcers on all mobile devices to implement a set of policies that clean up sensitive information on such devices.

In an example of delegating a consequence application, a document server policy enforcer evaluates a policy that controls deletion of a document by a manager on a document server. The policy requires that when the master copy of a document (i.e., the one that sits on a document server) is deleted, all copies of the same document distributed (or copied) to workstations must also be deleted. This document server policy requires distributed consequence application support to carry out document deletion at the workstations.

Policy Enforcer Software Architecture

Figure 6A:
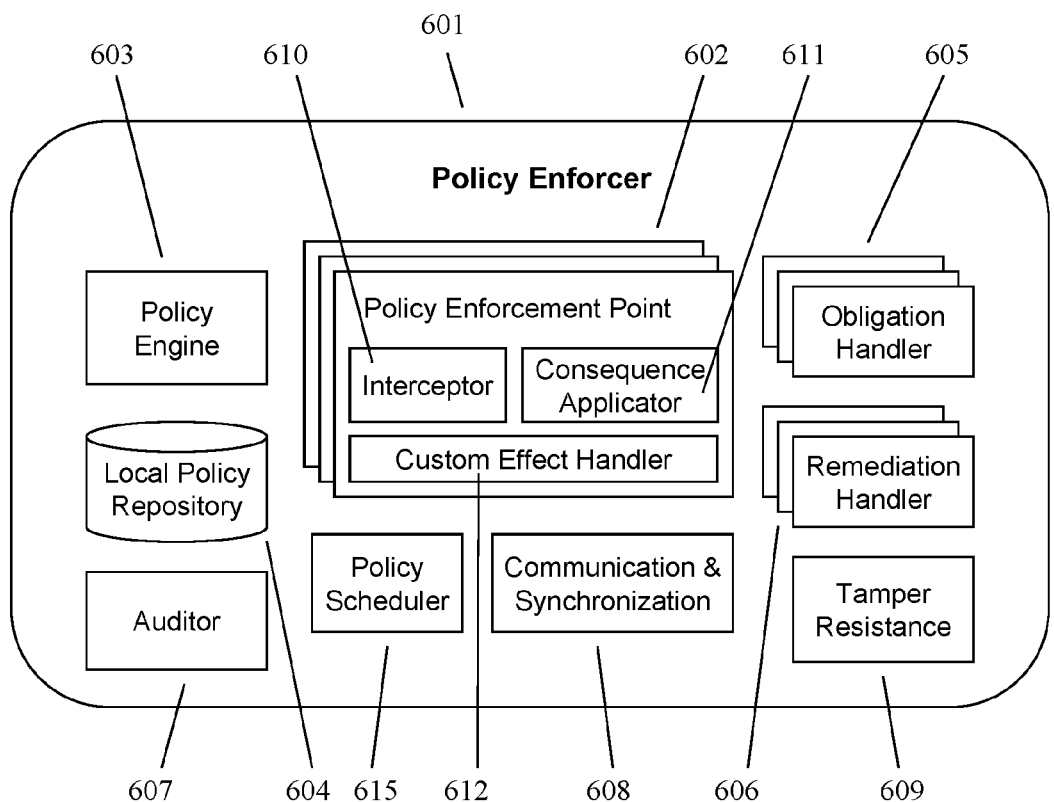
FIG. 6a is a block diagram that illustrates an interceptor and a consequence applicator in a Policy Enforcement Point (PEP) module according to the invention.
Figure 6B:
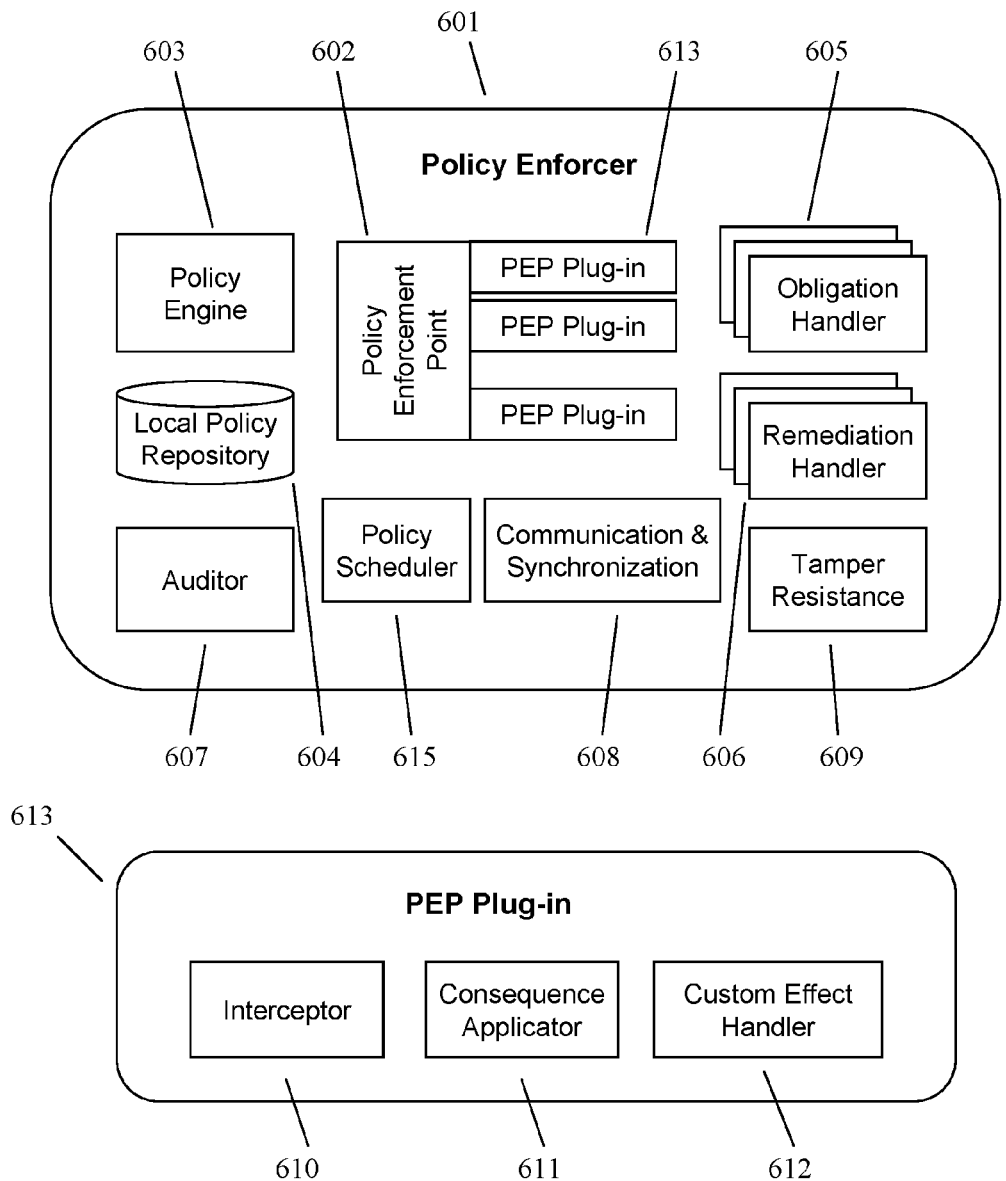
FIG. 6b is a block diagram that illustrates a policy enforcer that implements interception and enforcement functions using a PEP plug-in architecture according to the invention.
Figure 6C:
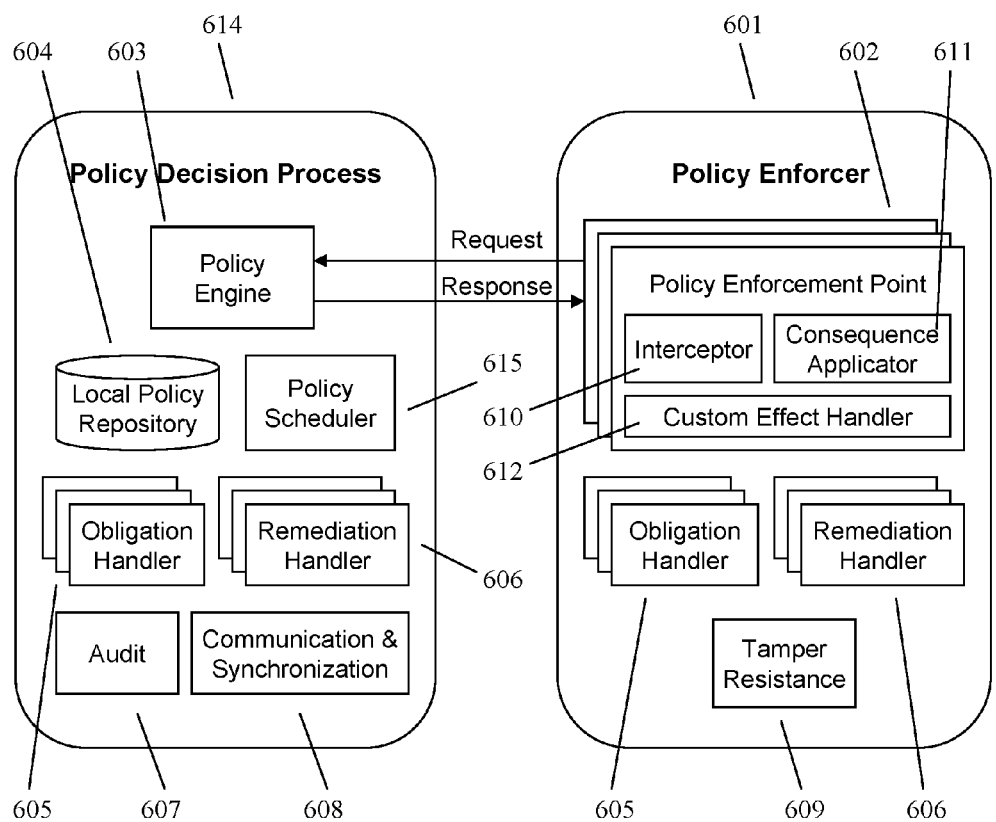
FIG. 6c is a block diagram that illustrates a policy engine running in a process separate from a policy enforcer according to the invention.

Referring to FIGS. 6a-c, policy enforcers 601 for document servers and workstations have a similar architecture. An interceptor 610 is responsible for intercepting (or detecting) application usage and document access operations (or actions), collecting information about an intercepted operation (e.g., type of action, document(s) associated with the action, and information about the application or module where interception occurred), and forwarding the data collected to a policy engine 603 for performing policy evaluation. The consequence of a policy evaluation is returned by a policy engine 603 to a consequence applicator 611. A consequence applicator 611 is responsible for applying any consequences of a policy evaluation that includes a policy effect and additional tasks.

FIG. 6a illustrates an embodiment where an interceptor 610 and a consequence applicator 611 are components of a Policy Enforcement Point (PEP) 602 module and the policy enforcer 601 consists of at least one PEP 602 and one policy engine 603.

FIG. 6b illustrates an embodiment where a policy enforcer 601 implements interception and enforcement functions using a PEP plug-in architecture. The policy enforcer consists of one PEP 602 and at least one PEP Plug-in module 613. Both interceptor 610 and consequence applicator 611 are components of a PEP Plug-in module 613.

FIG. 6c illustrates an embodiment where a policy engine 603 runs in a process separate from a policy enforcer 601. The policy decision process 614 and policy enforcer 601 can run on the same computer or on separate computers.

The interceptor 610 and consequence applicators 611 are functional entities where the implementation of the two functions varies from operating system to operating system and application to application. In some cases, the interceptor 610 and consequence applicator 611 functionalities are combined into one code module. In other cases, the interceptor 610 and consequence applicator 611 reside in separate code modules.

The interceptors 610 and consequence applicators 611 may function at the application program level or the operating system level in order to carry out the interception and consequence applicator functions. Application program level interceptors and consequence applicators are application program specific code modules which can be implemented as add-ins, plug-ins, scripts, macros, libraries and extension programs. Operating system level interceptors and consequence applicators are operating system specific code modules that can be implemented as libraries, filters and device drivers.

To control application usage, a policy enforcer effects control on application program operations (e.g., blocking an application program operation) and/or filters results generated by the application program operations (e.g., remove text or disable actionable object in the result). Using interceptors and consequence applicators, an application program operation is intercepted (or detected) and information about the application program operation is provided to a policy engine to make a policy decision, and if the policy decision specifies an enforcement action, the enforcement action is carried out effecting control on the application program operation or filtering of results generated by the application program operation.

A policy enforcer may use one or more methods to implement application usage control. The methods include: (a) blocking or altering an application program operating after it is invoked directly or indirectly by a user but before the application program operation is carried out; (b) disabling or hiding a user interface element responsible for invoking an application program operation so that a user cannot invoke the application program operation through the user interface element; and (c) removing, altering or obscuring a part or all of the result generated by an application program operation making certain information not available to a user. Note that the user interface element described in (b) may be an element of an application program (e.g., a menu item or a button) or an element of the result generated by an application program operation (e.g., a hypertext link, a check box or a list box).

In a graphical user interface environment, an application program operation may correspond to an operation associated with a user interface element. If a user interface element is a menu item, a corresponding application program operation is an operation that will be carried out when the menu item is selected (e.g., printing a document). If a user interface element is a hypertext link (such as a clickable word or phrase on a Web page), a corresponding application program operation is an operation that will be carried out when the hypertext link is clicked (e.g., loading a new Web page or jumping to another position on a Web page). Other common user interface elements include a: menu, button, list box, list item, check box, scroll bar, key (on the keyboard), and mouse button. An application program operation may also correspond to a command or function that is invoked by a user indirectly (e.g., through a macro or script) or by another application program.

To filter results generated by an application program operation, a consequence applicator may alter, substitute, remove, hide or obscure one or more portions (or all) of the result to be presented to a user. The consequence applicator may also alter, substitute, remove, hide, disable or obscure one or more actionable objects or fragments of text (e.g., menu, tab, buttons, check boxes, list boxes, or hypertext links).

To control document access, a policy enforcer effects control on document access operations. Common document access operations include: read (or open), write (or save), execute (for binary file or script), delete, read permission (or security setting), and change permission. Many document repositories (especially document management systems) support additional document access operations.

Typically, interceptors and consequence applicators intercept (or detect) a document access operation and information about the document access operation is provided to a policy engine to make a policy decision, and if the policy decision specifies an enforcement action, the enforcement action is carried out effecting control on the document access operation. Alternatively, the interceptors and consequence applicators may also integrate with an existing access control system provided by a document repository (e.g., document management system).

Interceptors and consequence applicators that control document access are document repository dependent. They may be installed in a document server application program (e.g., HTTP server, IBM Lotus Notes Server, Microsoft Exchange Server, or Microsoft Sharepoint Portal Server), at an application program interface (e.g., MAPI, JMS, ODBC, JDBC and Oracle SQL*NET), at an application protocol interface, or act as a application protocol proxy between a client and a server (e.g., HTTP, FTP or SOAP), at file system libraries, at network file share protocol driver (e.g., CIFS or NFS), or at file system device driver.

Some common document repositories include: file servers, mail servers, document management server, content management server, HTTP or Web servers, FTP servers, WebDAV servers, and database servers.

In one implementation of a policy enforcer, interceptors and consequence applications are installed in an existing application program or operating system to implement interception (or detection) and enforcement functions. The interceptors and consequence applicators are not native elements of the application program or operating system.

In another implementation of a policy enforcer, interceptors and consequence applicators are native elements of an application program or operating system. Interception and enforcement may be implemented through one or more calls to a policy enforcer application program interface (API). For example, a policy enforcer API is provided in the form of a software development kit (SDK).

A workstation policy enforcer installs a number of application program interceptors 610 and consequence applicators 611 to monitor document access and application usage operations (or actions) inside individual application programs and to apply enforcement actions. In addition, a workstation policy enforcer also installs operating system interceptors 610 and consequence applicators 611 to monitor file accesses from application programs and to apply enforcement actions. The operating system interceptors 610 can intercept operations from application programs that are or are not monitored by application program interceptors on the workstation.

Interceptors 610 and consequence applicators 611 can be setup during program installation time or anytime during a program's lifecycle. One method that can be used to setup an interceptor is to perform code analysis on an application program or library module and then modify the stored program code. Another method that can be used to setup an interceptor is through code injection at program startup time. Yet another method that can be used to setup an interceptor is to perform code injection after the program has been started. Code injection includes any method that modifies existing program code and/or inserts new code into an existing program code to implement an additional function. The existing program code can reside in volatile or nonvolatile memory.

The consequence applicator 611 implements the consequence (or outcome) called for by the policy engine 603. The consequence includes an effect of policy evaluation and optionally obligation and remediation tasks (described below) to be carried out. An effect includes whether an operation should be allowed or denied; querying a user for input; evaluating another set(s) of policies; and calling a custom effect handler (described below).

The local policy repository 604 holds a copy of policies applicable to a policy enforcer. Depending on the policy system architecture selected, the set of policies in the local policy repository 604 may be a full set of policies from the policy server or a subset. The local policy may be stored locally in a relational database, in one or more files, or in any form that convenient to the policy enforcer. By storing policies for a policy enforcer locally, a workstation policy enforcer can continue to function while the workstation is off-line and the policy server cannot be reached.

The custom effect handler 612 is a code module that implements custom effects and is optional in the policy enforcer 601.

An obligation handler 605 is a code module that carries out obligations supported by the policy system architecture. An obligation is a task that is related to the intercepted action that a policy enforcer is obligated to take. The tasks may include logging an action being intercepted, sending a notification to an administrator regarding the intercepted action, and archiving or encrypting the document associated with the intercepted action. For example, if a policy says "any e-mail sent to a patient should be maintained in the patient record database; and the obligation action is to send (or 'bcc') a copy of the e-mail to the record management system". In this case, a policy enforcer automatically applies the obligation action (i.e., archive) and sends a copy of an e-mail to a record management system.

In a second example, the obligation can be used to implement regulatory compliance requirements such as "all e-mail communications from an executive must be archived". A policy can be written to capture all send and forward actions on e-mail messages and to apply an archive obligation action automatically.

Some obligation handlers are executed inside a policy enforcer 601 process (e.g., the log handler) while others are implemented as PEP 602 components executing inside an application program (e.g., an e-mail delete handler) or an operating system. The obligation handler 605 is optional in the policy enforcer 601.

The remediation handler 606 is very similar in function to the obligation handler 605 except it performs different functions. Remediation means additional actions taken that are different from what is being intercepted. Such actions are introduced solely by policies defined to "remediate".

The tamper resistance module 609 is responsible for preventing, blocking, monitoring, and recovering from attempts to disable or alter the function of a policy enforcer. Many techniques can be used to protect program files and configurations from modifications and corruption. For example:

1) Multiple copies of files can be maintained and a missing or corrupted file can be restored from the backup copies.

2) Checksums or signatures can be generated on important files and stored in nonvolatile memory to enable detection of corrupted program and data files.

3) Access to policy enforcer program files and configurations can be restricted.

4) Changes to a policy enforcer's Windows registry entries can also be monitored, blocked and automatically restored.

The communication and synchronization module 608 is responsible for maintaining connection(s) to the policy server 211 and intelligence server 308, handling policy updates, and transferring log data to the log and intelligence repository 309.

The policy scheduler 615 implements maintenance policies set by the administrator or user. A maintenance policy tells the policy scheduler when to perform an action and what the action is. For example, the policy scheduler 615 can be given a maintenance policy that instructs it to perform a nightly scan of all e-mail messages and to delete any e-mail messages older than 90 days.

A maintenance policy uses the same format as a normal policy, but rather than being evaluated in response to an action by a user or application program, the maintenance policy is evaluated at a certain specified date and/or time. The policy scheduler 615 implements any specified obligation or remediation action specified in the maintenance policy.

Variations of implementations of a policy enforcer can take the form of:

1) The policy enforcer includes a policy engine 603, a local policy repository 604 and one or more policy enforcement points 602. The local policy repository may reside in volatile or nonvolatile memory of a host computer. The policy enforcer may optionally include any combination of: an auditor 607, a policy scheduler 615, obligation handlers 605, remediation handlers 606, or a tamper resistance module 609.

2) The policy enforcer includes a policy engine 603, a local policy repository 604, a policy enforcement point 602 and one or more PEP Plug-ins 613. The local policy repository may reside in volatile or nonvolatile memory of a host computer. The policy enforcer may optionally include any combination of: an auditor 607, a policy scheduler 615, obligation handlers 605, remediation handlers 606, or a tamper resistance module 609.

3) The policy enforcer includes a policy engine 603, a local policy repository 604 and an interface to policy enforcement points. The local policy repository may reside in volatile or nonvolatile memory of a host computer. The policy enforcement point interface provides a means to support additional policy enforcement points (e.g., policy enforcement points provided by a third-party). The policy enforcer may optionally include any combination of an auditor 607, a policy scheduler 615, obligation handlers 605, remediation handlers 606, or a tamper resistance module 609.

4) The policy enforcer implements a policy enforcement point plug-in architecture illustrated in FIG. 6b and the additional policy enforcement points are provided as PEP Plug-ins 613.

5) The policy enforcer is installed on a host computer without any policies (or rules). Upon startup of the policy enforcer, the policy enforcer communicates with a policy server and the policy server transmits a set of policies to the host computer. On successful transmission of the set of policies, the policy enforcer enforces the set of policies at the host computer.

6) The policy enforcer provides information (e.g., host name, IP address, type of computer or operating system) to the policy server to help determine the set of policies to be transmitted. The set of policies may be a subset of policies managed by the policy server.

7) The policy enforcer is installed on a host computer with a set of default policies (or rules). The set of default policies is enforced by the policy enforcer until a second set of policies is received by the host computer.

8) A set of policies on the host computer (e.g., the set of default policies) is replaced by the second set of policies and the policy enforcer enforces the second set of policies at the host computer.

9) A set of policies on the host computer (e.g., the set of default policies) is combined with the second set of policies and the policy enforcer enforces the combined set of policies at the host computer.

10) The policy enforcer is installed on a host computer with a set of preinstalled policies (or rules). The set of preinstalled policies is enforced by the policy enforcer until a second set of policies is received by the host computer. Upon successful reception of the second set of policies, the policy enforcer enforces both the set of preinstalled policies and the second set of policies at the host computer.

11) A policy enforcer is installed on a host computer with a set of configurable policies (or rules) and a default policy configuration. The configurable policies are enforced by the policy enforcer at the host computer according to the default configuration until a second policy configuration is received by the host computer.

12) A policy configuration on the host computer (e.g., the default policy configuration) is replaced by the second policy configuration and the policy enforcer enforces the configurable policies at the host computer according to the second policy configuration.

13) A policy configuration on the host computer (e.g., the default policy configuration) is combined with the second policy configuration and the policy enforcer enforces the configurable policies at the host computer according to the combined policy configuration.

Policy Engine

A policy engine 603 is an execution unit that processes and executes rules (or policies). The policy engine 603 takes the data collected by an interceptor 610 (and any other pertinent data such as historical data from prior interceptions and configuration and environment data) and applies the policy rules supplied by the policy server to the data to produce a consequence. A consequence may include an effect (e.g., ALLOW, DENY, evaluate another policy or set(s) of policies, query user, or call a custom effect handler) and optionally one or more obligation and remediation tasks. The use of historical data in a policy evaluation is optional. As part of the policy evaluation process, a policy engine may decide that it needs to obtain input form a user before it can proceed with (or complete) policy evaluation. At that time, a policy engine can invoke user interface elements to query the user for input. For example, such input is related to classifying a document (which produces document attribute values) that is required to complete policy evaluation.

Also, as part of the policy evaluation process, a policy engine may decide that it needs to obtain document classification information in order to complete policy evaluation. The process of obtaining document classification information may involve retrieving stored document classification data or dynamically invoking a document classification engine to classify a document.

The policy engine 603 optionally performs a list of obligation and remediation tasks and/or invokes a custom effect handler if one is defined in a policy. An implementation of the policy engine is policy system architecture specific. Depending on what policy system architecture is selected, the implementation of the policy engine can vary significantly. The policy deployment module 405 described in this application can support different types of policy engine design, allowing the appropriate policy engine design to be selected for an individual device. For example, a smart phone policy enforcer may be limited by the device's computing power and memory available. A policy engine inside the smart phone policy enforcer can be designed to execute precompiled and preoptimized polices that exist in binary form. The policy optimization and compilation steps are performed on the policy server prior to transmitting (the subset of policies) to the smart phone policy enforcer. In this case, the smart phone policy enforcer receives and evaluates policies that exist in binary form which are a semantic equivalent of the original policies that reside on the policy server.

A number of design options are available in the design of the policy engine 603, the options include:

1) Support distribution of full sets of policies to policy enforcers.
2) Support preoptimized policies at the policy enforcer.
3) Support policies transmitted to a policy enforcer in XACML format.
4) Support policies transmitted to a policy enforcer in Blue Jungle's Open Policy Language (OPAL) format.
5) Support policies compiled into ASCII or binary format.
6) Support policies translated into programming language (e.g., XML, Java, C#, Perl, and Python—in source code or binary format).
7) Support policies translated into lookup tables.
8) Support preinstalled, configurable policies and alter preinstalled policies' behavior through configuration changes.
9) Support built-in, configurable policies and alter built-in policies' behavior through configuration changes.

In an implementation of a policy engine, a policy evaluation process can be invoked by an interceptor 610, a policy scheduler 615, an internal event generated by a policy enforcer or policy server, or an external event generated by another application program.

An internal event is similar to an intercepted user or application program action except that it is generated by a policy engine or other components of a policy enforcement system. An internal event can provide additional information relevant to the event similar to that of intercepted action. In fact, an internal event often includes the information provided by an intercepted action which results in the generation of the internal event. An internal event may be generated as a result of a policy evaluation request or a result of an activity data analysis operation.

An external event is an event generated by another application program outside of a policy enforcement system. This type of application program is typically a third party application integrated with a policy enforcement system (e.g., through a software development kit). Third-party application integration can be extremely useful because in a specific implementation where policy enforcers are deployed company-wide, managing all types of information, the management system has access to information in a distributed environment without having to go through additional authentication and authorization processes. For example, a customer relationship management (CRM) application may instruct a policy enforcement system through an external event to archive all documents related to a customer on the closing of an account. The handling of such an external event may include rolling up: files on file servers and desktop and laptop computers, e-mail messages on mail servers and all mail clients, and documents in document management systems.

Figure 7:
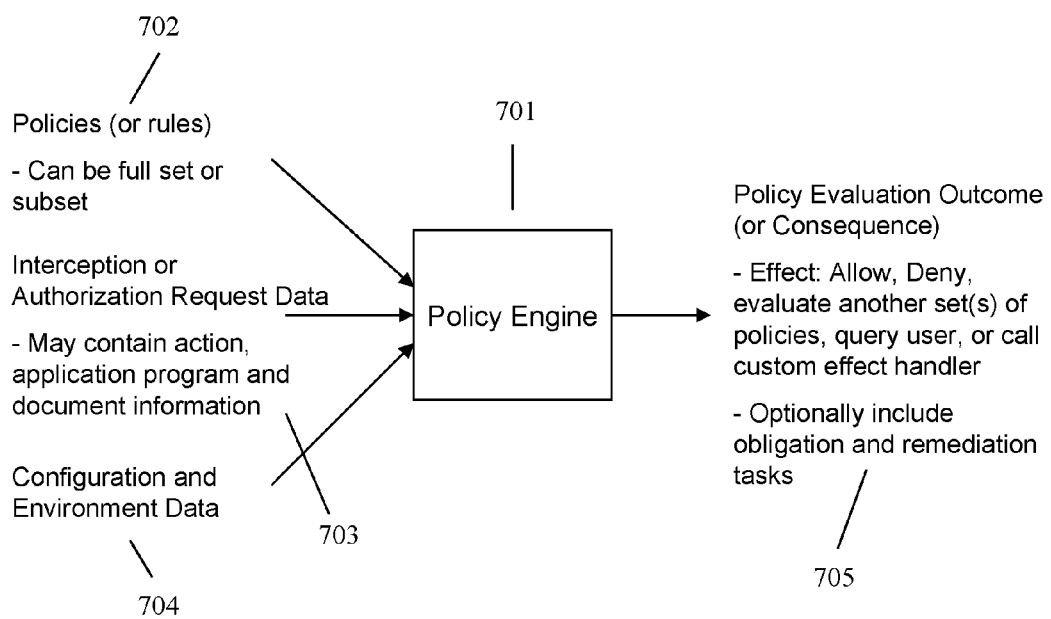
FIG. 7 is a block diagram that illustrates a policy engine module's policy input and evaluation output according to the invention.

Referring to FIG. 7, the policy engine 701 can evaluate policies received 702 from the policy server using the following steps:

Step 1: Receive data collected by an interceptor 703 or provided by an integrated application program module. The data collected by an interceptor may include an action (or operation) being intercepted, information on the document(s) that is associated with the action (this is optional because some actions like cut-and-paste do not involve a document), information on the thread, process, and application within which the action was taken, and other information which may be useful in policy evaluation.

Step 2: Inspect data provided by the interceptor or the integrated application program module and select policies that are applicable. The selection may be based on the type of action, who is the user, what is the application, and so on.

In some policy system architectures, this policy selection step may not be necessary. In that case, all policies or a predefined set of policies will be evaluated.

Step 3: Based on the policies selected and data provided by an interceptor or an integrated application program module, obtain additional information that is needed to complete policy evaluation. The additional information may include configuration setting and environment data 704.

Step 4: Pass the selected policies and data collected through policy evaluation logic to produce a consequence 705 (or outcome). The consequence includes one of the valid policy effects (e.g., ALLOW, DENY, evaluate another set(s) of policies, query user, and call a custom effect handler), and perform any obligation and remediation tasks.

Step 5: If the policy evaluation consequence 705 includes any obligation or remediation tasks, call the corresponding obligation or remediation handlers to carry out the obligations and/or remediation tasks.

Step 6: If the policy evaluation consequence 705 includes a custom effect, call the corresponding custom effect handler to generate or apply an effect.

The policy engine 701 can reside in a policy enforcer 205, 207, a policy server 211, a dedicated policy decision server, or any process or server that is assigned the policy decision function. Note that the policy engine 603 is an optional module in the policy enforcer 601 (refer to FIG. 6c).

In an embodiment of the invention, the policy engine 701 can evaluate policies received 702 from the policy server, data provided by a scheduler 615 associated with a scheduled event, data associated with an internal event generated by a policy enforcer or a policy server, or data accompanying an external event generated by a different application program.

2.4 Example Scenarios

In the following scenarios, a pseudo language is used to define the parameters of a policy rule. The basic language structure is: Policy=premise+consequence. Any language that support the above structure can be used, e.g., the OASIS eXtensible Access Control Markup Language (XACML) and Blue Jungle's Open Policy Language (OPAL).

The policy rule format used in the text below is:

```
policy :=
  FOR <resource expression>
  ON <event expression>
  BY <subject expression>
  WHERE <context expression>
  DO <positive consequence> OTHERS <negative consequence>
  positive consequence := effect AND <obligation tasks> AND
  <remediation tasks>
  negative consequence := effect AND <obligation tasks> AND
  <remediation tasks>
```

The policy rule format includes a number of elements. The FOR element (or resource element) in the policy rule format specifies a logical expression that describes one or more document attributes and corresponding matching patterns (e.g., 'document.category="Confidential" AND document.name="//server1/user/**"', or 'messagefrom=NOT Employee OR message.to <>"*@partner-company.com"').

The ON element (or action element) specifies a list of document access and/or application usage actions that this policy applies to (e.g., OPEN, SAVE, SEND, and ATTACH).

The BY element (or subject element) specifies a logical expression that describes one or more: users, user groups, the role of a user, a user's business function, computers (or hosts), groups of computers (e.g., "file server" or "finance department"), types of computers (e.g., laptop or PDA), application programs (e.g., "Microsoft Word"), groups of application programs (e.g., "Microsoft Office"), types of application programs (e.g., spreadsheet), and more.

The WHERE element (or context element) is a logical expression (or context expression) that describes the context this policy applies to. The context expression can compose of any logical combination of: resource elements, action elements, subject elements, time (e.g., point in time, time of day, or day in the week), location (e.g., "Main Office", "London Office", "Building H" or "Home"), connectivity (including access mechanism and bandwidth; e.g., WLAN, LAN, VPN, ISDN, Internet, DSL, Bluetooth, dialup, Remote Desktop Protocol (RDP), Virtual Network Computing (VNC) protocol, latency, 56 k, broadband, 100 Mb, and 1 Gb), policy directive (e.g., POLICY-ENFORCER-AT-POU or MSEXCHANGE-5.5), historical data, statistical data, data produced by analyzing events, data provided by an external data source, and more.

A context element describes a circumstance that a policy is intended for (or a positive policy consequence (described below) should apply). It works in conjunction with a resource element, action element, and subject element to define a policy premise (or condition). For example, a context element may describe a time period in which a policy should be applied (i.e., adopting a positive policy consequence when other logical policy elements are evaluated to true). In another example, a context element describes a policy that should be applied only if a workstation accesses a server through a virtual private network (VPN).

In a more complex example, a context element describes the logical combination of: (1) a user who is an employee; (2) a workstation connected to a network at a branch office; (3) the user is using a browser to access a secure server via secure sockets layer (SSL) VPN; (4) the access occurs during office hours; (5) the access occurs within a silent period before his (or her) company's quarterly financial results are published; and (6) there is at most three users connected to the secure server. This example illustrates that a context element can be used to describe a complicated circumstance. In some cases, a context element may specify one or more policy engine directives including POLICY-ENFORCER-AT-DESTINATION.

A positive consequence element (or DO element) consists of a positive consequence statement. A positive consequence statement contains a policy effect (e.g., ALLOW, DENY, query user, custom effect handler, or DELEGATE), optionally one or more obligation tasks, and optionally one or more remediation tasks. A positive consequence is adopted during policy evaluation when a policy's premise is satisfied.

A negative consequence element (or OTHERS element) consists of a negative consequence statement. A negative consequence element has the same structure as the positive consequence statement. A negative consequence is adopted during a policy evaluation when a policy's premise is not satisfied. A negative consequence is optional in a policy. When a negative consequence is not specified, a default negative consequence is used which contains a policy effect that is the negation of the positive policy effect found in the policy.

In addition, a policy rule can also contain directives that provide instructions to a policy engine (e.g., a policy engine in a policy enforcer or a policy engine in a policy decision server) to assist in policy evaluation, and provide instructions to policy deployment module (typically a part of a policy server) to assist in policy deployment. Policy directives can appear in any one of the policy elements described above. For example, a policy can contain one or more collaborative directives (e.g., POU:<action> which describes action information available at a point-of-use policy enforcer associated with a policy evaluation request, or POLICY-ENFORCER-AT-DESTINATION).

For the purpose of illustration, the following examples show the evaluation of only one policy in the policy evaluation step (by a policy engine). In practice, a policy engine can select one or more policies relevant to an intercepted action or integrated application program module and the policy evaluation may involve more than one policy. When more than one policy is evaluated by a policy engine in response to an intercepted action or integrated application program module, the policy consequences in the evaluated policies must be combined to form one final policy consequence using one or more combining algorithms (e.g., deny override or permit override). The final policy consequence is then returned to an interceptor and consequence applicator or an authorization process that invokes policy evaluation. This final policy consequence normally contains a policy effect and optionally one or more obligation tasks and remediation tasks.

The policy evaluation steps outlined in this application are provided for illustrative purposes only. Different policy evaluation techniques may be applied to achieve the same or other results.

Figure 8:
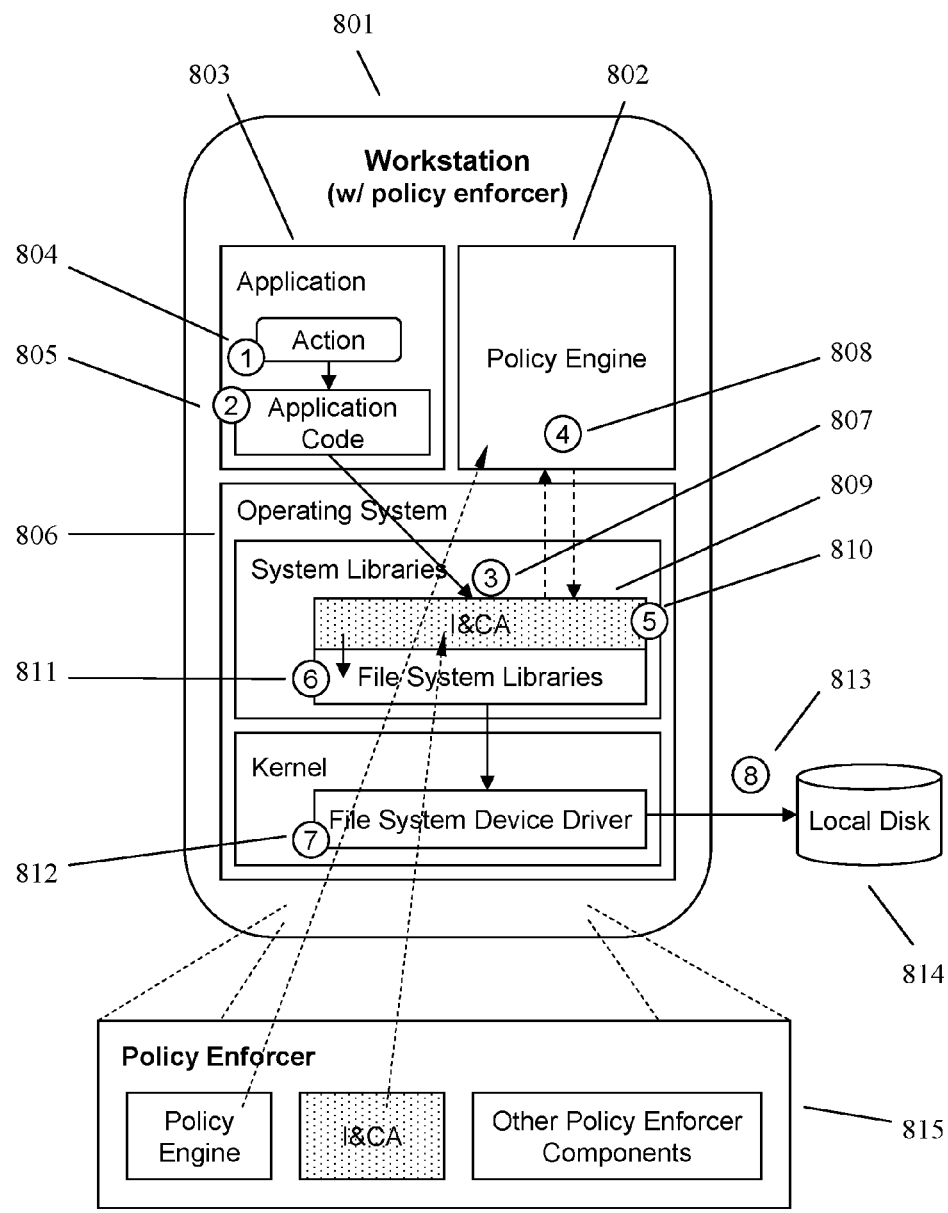
FIG. 8 is a block diagram that illustrates a policy enforcer installed on a workstation that controls access to files on the workstation according to the invention.

FIG. 8 illustrates an example embodiment of a policy enforcer 815 is installed on a workstation 801 where a user's (or application's) OPEN action triggers a file operation (e.g., open( )) on a local disk file. Note that file system objects are handled differently from other documents that are nonfile system objects which are illustrated below.

The policy definition is:

```
FOR document.name = "*.doc"
ON OPEN
BY user = NOT Employees
DO DENY
```

The following describes a normal (i.e., ALLOW) execution path when a user accesses a file and the policy engine 802 interprets, and the interceptor and consequence applicator 809 implements the above rule. Note that, as shown in FIG. 6, the policy enforcer 815 is comprised of several components. For the ease of explanation, the policy enforcer is not illustrated in full in the following examples. In this example, the policy engine 802 and the interceptor and consequence applicator 809 components of the policy enforcer 815 are described.

Step 1 (804): A user or application program 803 performs an action. An action can include opening a file, saving a file, moving a file, deleting a file, renaming a file and so forth. In this case, the action is OPEN.

Step 2 (805): The user or application action causes some application code to be executed which results in calls to operating system libraries to manipulate a file. For action OPEN, the system call that application code makes includes open( ), fopen( ), FileOpen( ), OpenFile( ) and CreateFile ( ).

Step 3 (807): The workstation policy enforcer 815 is capable of intercepting calls to operating system libraries. The file operation calls (e.g., open( ), fopen( ), etc.) are intercepted. The interceptor and consequence applicator 809 that intercepts a system call collects information about the file operation, calling application, and user, and forwards that information to the policy engine 802 for further processing. The information collection may include the file name, directory, file path, application's process id, and program name.

Step 4 (808): The policy engine 802 takes the information received from the interceptor and consequence applicator 809 and other configuration and environment data, and applies relevant rules distributed to it by a policy server. Note that depending on what policy language is used, one or more rules can be relevant to a current action. The policy evaluation can result in an ALLOW, DENY, or DELEGATE policy effect and it may also introduce obligation and/or remediation actions. Delegation is when the policy engine 802 evaluates another policy or another set of policies locally or remotely.

(a) An obligation action refers to additional action(s) that is related to the intercepted action that a workstation policy enforcer 815 is obliged to perform when certain condition(s) is met. For example, an obligation action includes logging an action or sending a notification message to an administrator. An obligation can depend (or not depend) on the ALLOW and DENY state.

(b) A remediation action refers to additional action(s) that is unrelated to the intercepted action that a workstation policy enforcer 815 must take when certain condition(s) is met. Remediation actions may include deleting a copy of a backup file because only one copy of a particular file is allowed or cleaning up a user's home directory because the user's assigned privilege has changed due to a recent job change.

Step 5 (810): The policy evaluation decision (i.e., effect) is returned to the interceptor and consequence applicator 809 (in this case, the interceptor is also acting as a consequence applicator). The interceptor and consequence applicator 809 takes appropriate enforcement action. In some cases, the interceptor and the consequence applicator can be separate code modules (e.g., when communication between the Policy Engine and PEP is asynchronous). FIG. 8 shows the execution path of an ALLOW effect. In the case where the policy evaluation effect is DENY, then steps 6-8 should be eliminated. For the action OPEN, if the effect is DENY, then the interceptor and consequence applicator 809 terminates the open( ) call immediately with an error status.

Step 6 (811): The interceptor and consequence applicator 809 forwards the system call made by the application code to an appropriate operating system library and the normal operation is carried out.

Step 7-8 (812, 813): Depending on what system called is made it may involve a file system device driver and access to physical disk 814.

Figure 9:
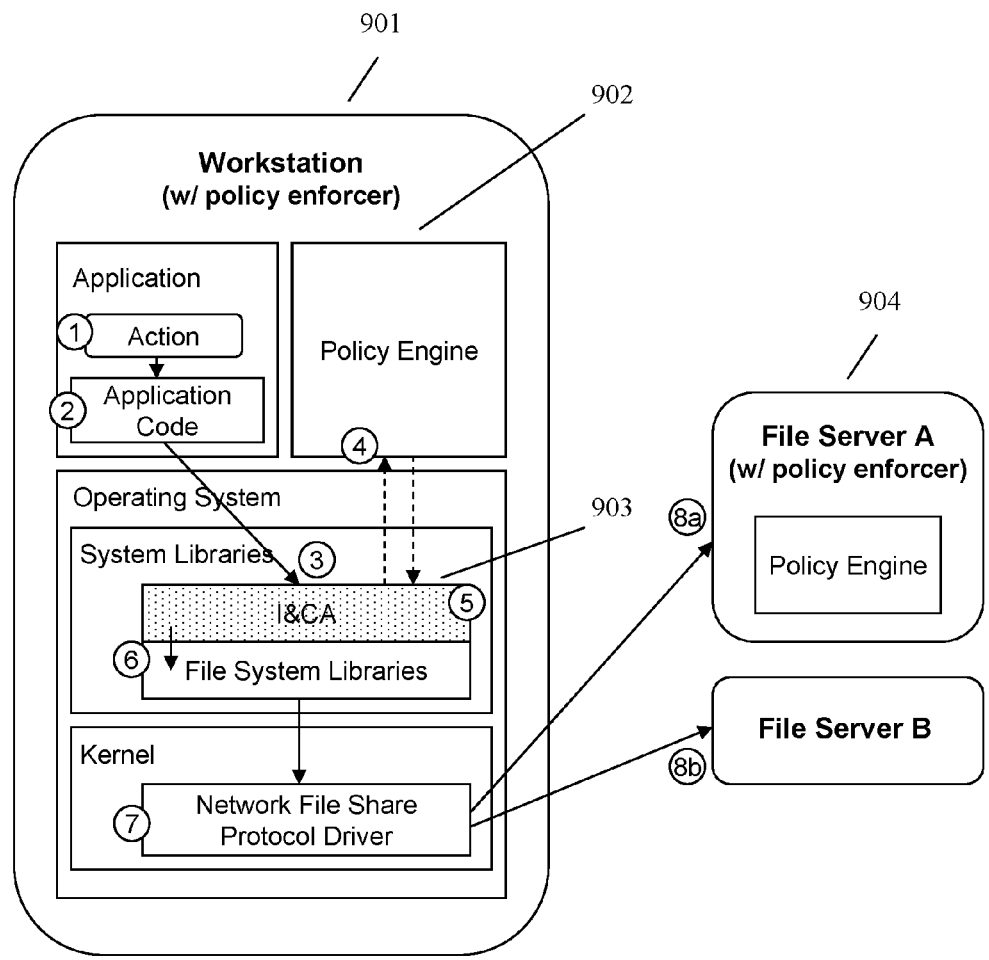
FIG. 9 is a block diagram that illustrates a policy enforcer on a client computer that controls the client computer's access to files on a file server according to the invention.

FIG. 9 illustrates an embodiment where a policy enforcer on a client computer controls access to files on a file server. The policy definition is:

```
FOR document.name = "//server1/docs/**"
ON OPEN
BY user = Employees
WHERE (CURRENT_TIME > "8:00 AM" AND CURRENT_TIME < "6:00 PM")
DO ALLOW
```

This scenario demonstrates the situation where a user (or application) action in workstation 901 triggers an operation on a file residing on a file server 904. FIG. 9 shows a normal (i.e., ALLOW) execution path when a workstation policy enforcer is installed.

Processing for this scenario is very similar to the scenario of FIG. 8. Additional processing in this case is attributed to the policy engine 902 evaluating the time constraints attached to the rule. Since application programs use the same system call to open a file on local disk and a file on a file server, the same system call interceptor and consequence applicator 809 described above works in the same manner as the interceptor and consequence applicator 903. Workstation policy engine 902, while processing the intercepted data from interceptor and consequence applicator 903, detects a file being accessed is on a server 904 and performs path normalization to avoid control being bypassed when more than one path exists to the same file. The policy rules distributed to a workstation policy enforcer can control access from the workstation to any file server. The control function is applied regardless of whether a file server is protected by a file server policy enforcer.

Figure 10A:
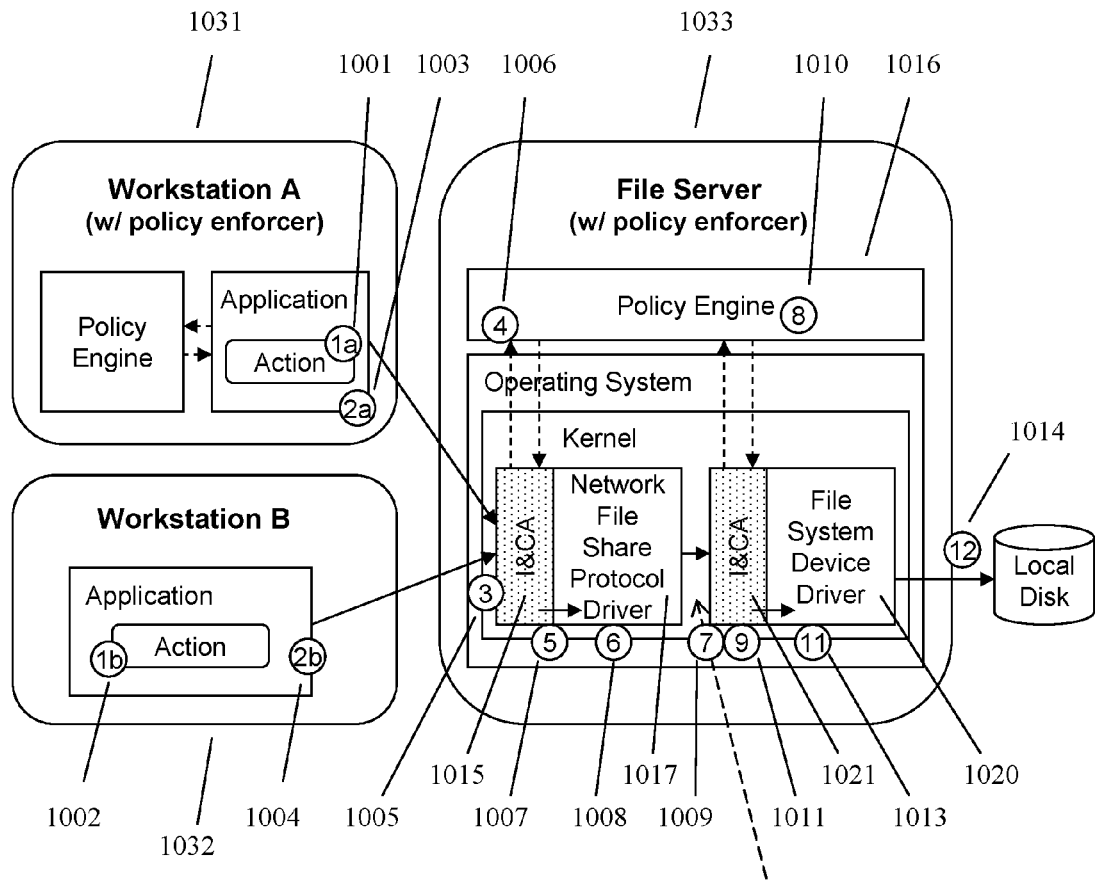
FIG. 10a is a block diagram that illustrates a policy enforcer on a file server implemented in operating system kernel that controls access to files on the file server according to the invention.
Figure 10B:
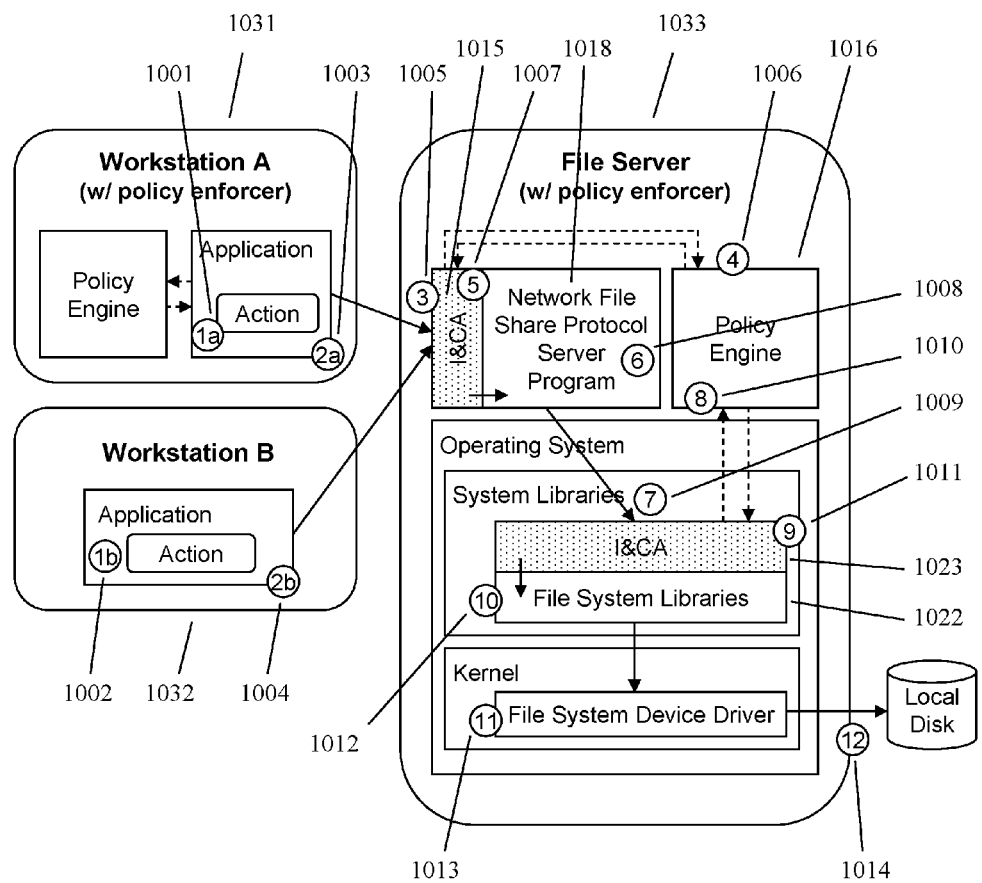
FIG. 10b is a block diagram that illustrates a policy enforcer on a file server that controls access to files on the file server according to the invention.
Figure 10C:
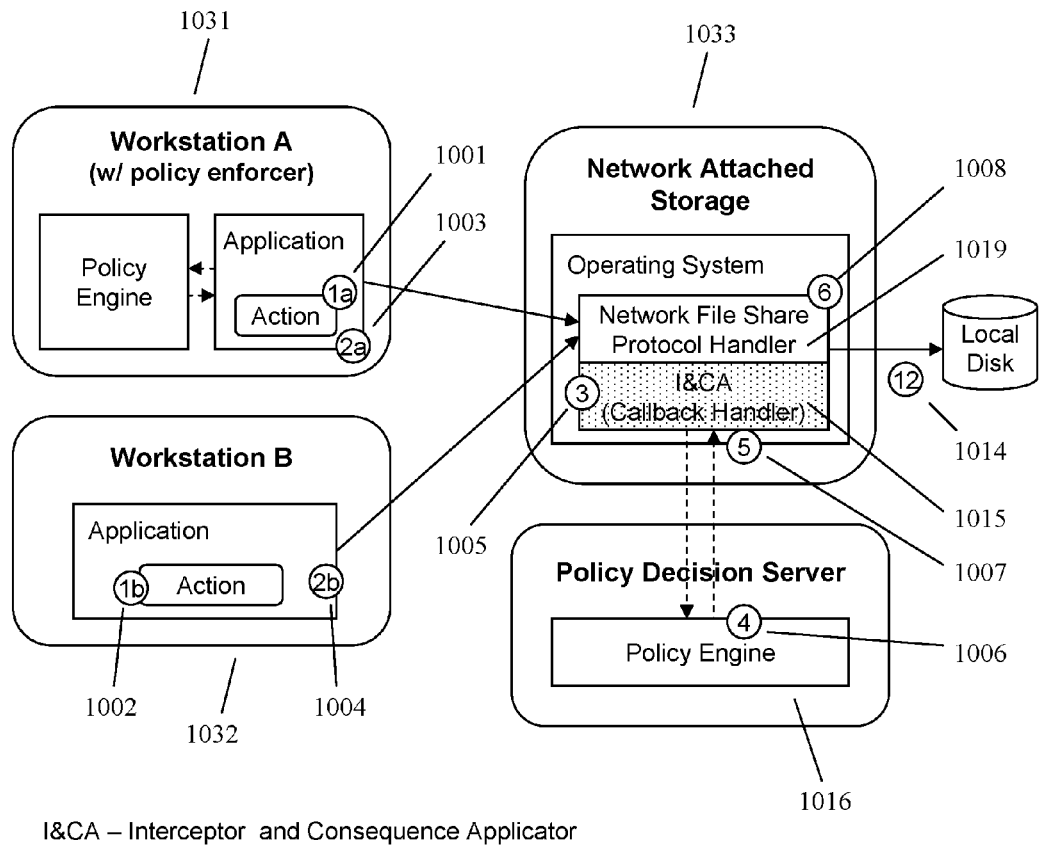
FIG. 10c is a block diagram that illustrates a policy enforcer on a file server with a policy engine running on a separate computer that controls access to files on the file server according to the invention.

FIGS. 10a-c illustrate an embodiment where a policy enforcer on a file server protects files on a file server. The policy definition is:

```
FOR document.owner = ProjectA-Team
   OR document.name = "//server1/share1/docs/projectA/**"
ON OPEN, EDIT, CREATE, RENAME
BY user = ProjectA-Team
WHERE NOT (device = LAPTOP AND location = BOSTON-OFFICE
   AND connection <> VPN)
DO ALLOW
```

This scenario demonstrates the situation where a user (or application) action triggers an operation on a file residing on a file server. The user or application action can be performed on any workstation including one that is controlled by a workstation policy enforcer or one that is not. FIGS. 10a-c show a normal (i.e., ALLOW) execution path when a file server policy enforcer is installed.

Step 1 (1001, 1002): User or application initiates an action. The action triggers a file operation on a file resided on a file server 1033. The workstation 1031, 1032 where the action is initiated can be controlled by a workstation policy enforcer 1031 or not controlled by a workstation policy enforcer 1032.

Step 2 (1003, 1004): Since the file of interest resides on a remote server, a file operation normally makes its way to a file share protocol client such as Common Internet File System (CIFS) or Network File System (NFS) client before reaching a network device driver on a workstation. A network device driver sends a file operation to the target file server. A network file share protocol client may be implemented as a device driver (e.g., CIFS) or an application program or combination of both.

Step 3 (1005): The network device driver (not shown) on the target file server 1033 receives a file operation request and forwards it to the network file share protocol server 1017, 1018, 1019. A network file share protocol server may be implemented as a device driver 1017 (e.g., CIFS) or server application program 1018 (e.g., NFS) or combination of the two (e.g., Andrew File System—AFS). An interceptor and consequence applicator 1015 is installed on a network file share protocol server 1017, 1018, and 1019 to intercept function calls (or messages) to the network file share protocol server 1017, 1018, and 1019. In the case of a Network Attached Storage (NAS) device, installing an interceptor and consequence applicator 1015 may involve the installation of one or more callback handlers. The interceptor and consequence applicator 1015 collects information about the function call (or message) being intercepted and forwards that information to a policy engine 1016 running on the file server (or in the case of a NAS, the policy engine runs on a separate computer).

Step 4 (1006): Using the rules distributed by a policy server, information collected by an interceptor and consequence applicator 1015, and other environment and configuration data, the policy engine 1016 determines if the function call (or message) should be allowed or denied. The file server policy engine 1016 will also carry out any obligation and remediation operations deemed necessary. The file server policy engine may also decide to store information to help process future function calls (or messages).

Step 5 (1007): The interceptor and consequence applicator 1015 receives a return status (i.e., effect) from the policy engine 1016. Based on the status, the interceptor and consequence applicator 1015 may allow a function call to network file share protocol server 1017, 1018, and 1019 to proceed (or a message to be processed).

Step 6 (1008): The network file share protocol server 1017, 1018, and 1019 performs its normal processing. Depending on the type of file operation being requested and whether such operation can be completed with file data cached in network file share protocol server 1017, 1018, 1019, network file share protocol server may or may not access the file system to fulfill a request.

Step 7 (1009): In case the file system access is required to complete the processing of a request, a network file share protocol server 1017, 1018 will perform one of the steps described here depending on its implementation:

(a) For a network file share protocol driver 1017 implementation (referring to FIG. 10a), a network file share protocol driver 1017 makes calls into a file system device driver 1020. In this case, an interceptor and consequence applicator 1021 is installed to intercept calls into the file system device driver 1020. Information is collected by the interceptor and consequence applicator 1021 and forwarded to a policy engine 1016 on the same file server 1033.

(b) For network file share protocol server program 1018 implementation (referring to FIG. 10b), a server program 1018 makes operating system file operation calls to access a file. Similar to client side operating system libraries interceptor and consequence applicator, such file operation system calls are intercepted 1011 and reported to a policy engine 1016 on the file server 1033.

Note that interception is performed at both network file share protocol driver 1017 and file system device driver 1020 (or network file share protocol server program 1018 and operating system libraries 1022). Interception at network file share protocol driver 1017 (or network file share protocol server program 1018) provides high-level file operation information and avoids problems created by caching (i.e., the file system is not accessed to complete a request because file data is in cache). Interception at the file system device driver 1020 (or operating system libraries 1022) provides complete protection to files on a file server. If file system access is generated indirectly through some complex protocol driver 1017 (or server program 1018) logic, it may not be appropriate to enforce policy at protocol driver interceptor and consequence applicator (or server program interceptor and consequence applicator) 1015. An interceptor and consequence applicator 1021, 1023 at file system device driver 1020 (or operating system library 1022) level ensures all file operations are intercepted and the above situation can be handled. Interception at both the protocol driver 1017 (or server program 1018) and the file system device driver 1020 (or operating system library 1022) can function collaboratively to assist policy evaluation.

Step 8 (1010): Processing in step 8 is similar to step 4 (in the description of FIGS. 10*a* and 10*b*). The policy engine 1016 may use information collected from previous interception(s) 1005 in policy evaluation.

Step 9 (1011): Using the return status from step 8, an interceptor and consequence applicator 1021, 1023 can either allow or deny the requested file operation.

Step 10-12 (1012-1014): Normal processing steps similar to those described in the other scenarios above.

In a common CIFS server implementation, a file access operation may come in through a network device driver, then a CIFS driver, then optionally a Distribute File System (DFS) server, followed by a Server Message Block (SMB) server and finally a file system device driver. In current Microsoft implementations, all the above operations are performed in kernel mode.

In a common NFS server implementation, a file operation comes through a network device driver to a NFS server program. The NFS server program then accesses local files through operating system libraries which may in turn access file system device driver. The NFS server is normally a user mode application, but there also exists kernel model implementations.

In a Network Attached Storage (NAS) implementation, a policy engine may run on a separate computer rather than the NAS operating system. It is common to find on a NAS operating system, a network-based callback interface which provides similar functions to other file server interceptor and consequence applicators. Note that this type of callback solution is not limited to NAS devices. The policy engine can leverage similar techniques that are also available in different server application software.

Referring to FIG. 10*a*, another design option that may be added is one where a network file share protocol driver interceptor and consequence applicator 1015 communicates with a file system device driver interceptor and consequence applicator 1021 directly. Depending on the implementation, a network file share protocol driver interceptor and consequence applicator 1015 may or may not need to communicate with the policy engine 1016. Similarly (referring to FIG. 10*b*), a network file share protocol server program interceptor and consequence applicator 1015 can also communicate with an operating system library interceptor and consequence applicator 1023 and it may or may not communicate with the policy engine 1016. What this means is that information collected at a high-level interception 1015 can be used to assist in interpreting what is happening at a lower-level 1021, 1023. Such an interpretation can occur inside a low-level interceptor and consequence applicator 1021, 1023 or policy engine 1016 depending on how the software is designed.

Figure 11:
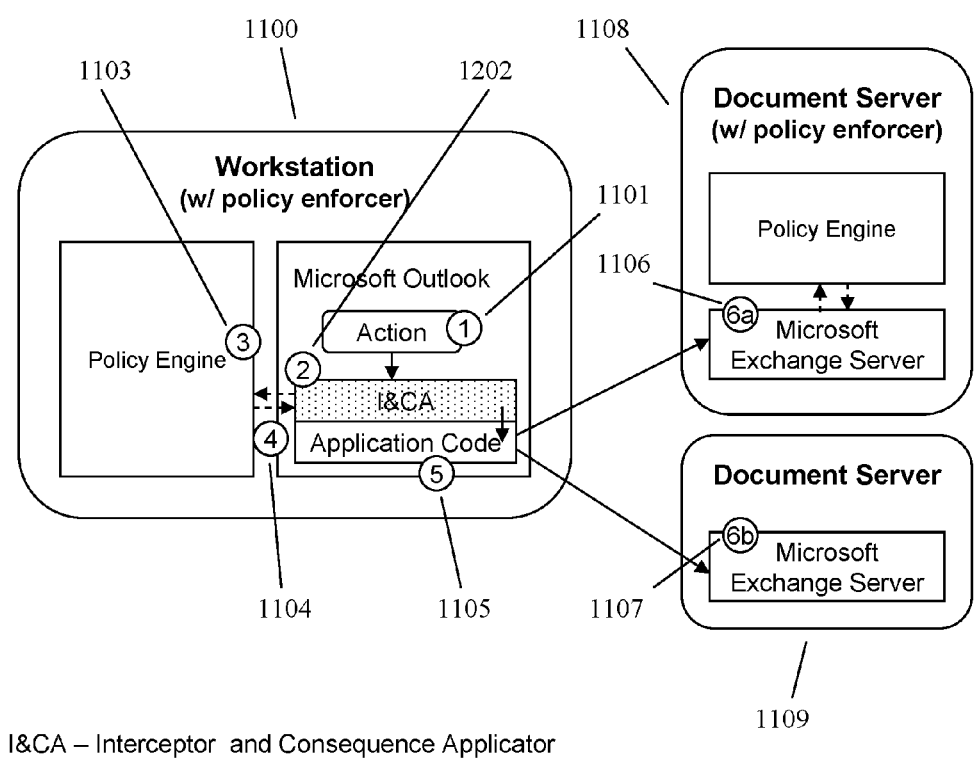
FIG. 11 is a block diagram that illustrates a policy enforcer on a workstation enforcing access control to a nonfile system object according to the invention.

FIG. 11 illustrates an embodiment where access control to a nonfile system object (e.g., e-mail) is being enforced on a workstation.

The policy definition is:

```
FOR message.from = Legal AND message.createDate < TODAY - 90
ON OPEN
DO DENY
```

Since a nonfile system object (or document) access is application specific, interception is typically performed inside an application, at an application program interface (API), or at a communication protocol interface, instead of being performed in operating system libraries or device drivers. In addition, interception of communication protocol can also be performed using a proxy (or gateway) application that is placed between a client application and a server. An example of an application program interface includes Microsoft Messaging API, Oracle SQL*NET or Java Message Service (JMS). An example of a communication protocol includes HTTP, FTP, WebDAV, SMTP, POP3 or IMAP4.

The processing steps are basically the same as illustrated in FIGS. 8 and 9, except that interception and enforcement are performed differently. There are two methods for handling the interceptor and consequence applicator on nonfile system objects. In the first method, a policy enforcement point (PEP) containing the interceptor and consequence applicator functions is built into an application program. With this approach, interceptor and consequence applicator functions are provided as an integral part of an application program and the application program provides means to communicate with an external policy engine.

The second method requires a PEP to be installed by instrumenting an existing application program to provide interceptor and consequence applicator functions. This second method allows application programs that are not released with document access and application usage control capabilities to be retrofitted to provide such capabilities. Besides interceptor and consequence applicator functions, a PEP may also implement obligation and remediation task handling capabilities.

Adapting an application program to provide interceptor and consequence applicator functionalities requires application of one or more instrumentation techniques. The following are a few exemplary instrumentation techniques available for retrofitting application programs to provide document access and application usage control capabilities:

1) Using application program interfaces (APIs) available to implement interceptor and consequence applicator functionalities.

2) Implementing interceptors and consequence applicators in an in-process add-on (or plug-in) module or extension library.

3) Implementing interceptors and consequence applicators in a callback module.

4) Implementing interceptors and consequence applicators in a device driver.

5) Performing function (or method), class (or object), library, program, and device driver wrapping either statically or dynamically so that an interceptor has a chance to examine an application program operation before the actual operation is carried out.

6) Installing (or registering) a message filter, message hook, message handler, event filter, event hook, event handler, preprocessing callback, post-processing callback, device driver, and device driver filter at the application program installation time, application startup time, or after an application program has started up, so that an application program operation can be intercepted and examined by an interceptor.

7) Performing program code analysis and modifying application program code statically or dynamically to install interceptors and consequence applicators.

A nonfile system object (or application data object) can be any data that can be uniquely identified. For example, a nonfile system object can be an e-mail message, a discussion thread, a result set created by a database query, a Web page, an electronic form, a contact object, a calendar entry, etc.

Again, a workstation policy enforcer provides access and usage control. It controls what user can view, edit, send and so forth. The workstation policy enforcer also addresses problems created by caching and off-line operations. For example, Microsoft Outlook can cache e-mail messages on a client computer and a Microsoft Exchange Server policy enforcer cannot control accesses to those cached e-mail messages.

The workstation policy enforcer and document server policy enforcer can individually provide different "use" control and access protection.

Figure 12:
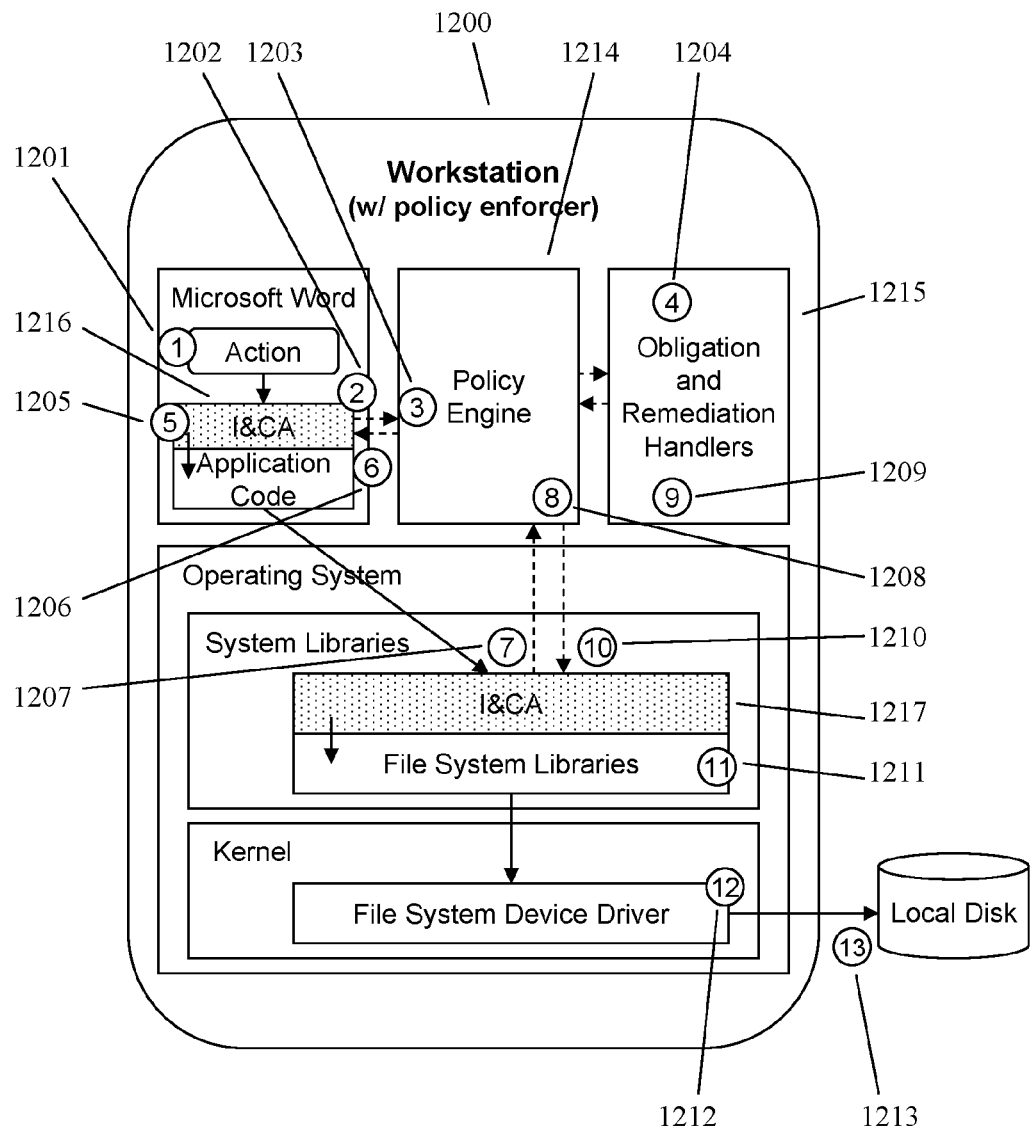
FIG. 12 is a block diagram that illustrates a policy enforcer on a workstation applying an obligation action for a file access operation according to the invention.

FIG. 12 illustrates an embodiment where a policy enforcer on a workstation 1200 applies an obligation action for a file open operation. An obligation is typically used to implement notification and log functions.

The policy definition is:

```
FOR document.category = "Highly-Sensitive"
ON OPEN
BY user = Executives, Legal
DO ALLOW AND LOG
   OTHERS DENY AND NOTIFY Administrator AND LOG
```

The policy restricts access to documents categorized as "Highly-Sensitive" to users in the Executives and Legal groups. In addition, the document administrator is notified when a user (or application) is denied access to one of these documents and the action is logged every time a user (or application) attempts to open one of these documents.

Step 1 (1201): A user who is a member of the Executives group, opens an M&A document categorized as "Highly Sensitive" using Microsoft Word.

Step 2 (1202): The file open operation is intercepted. The interceptor and consequence applicator 1216 collects information about the action, document, and application and forwards that information to a policy engine 1214.

Step 3 (1203): The policy engine 1214 receives the information collected by the interceptor and consequence applicator 1216 and performs a policy evaluation. The intercepted action in this example is OPEN which matches the policy and the policy is then evaluated. In the process of evaluating the above policy, policy engine 1214 compares the document category against "Highly-Sensitive", checks if the user is in the Executives group, and determines that the action should be allowed. The policy engine 1214 returns an ALLOW effect to the interceptor and consequence applicator 1216.

Step 4 (1204): The policy engine 1214 also recognizes that obligation tasks are assigned to the policy and calls the associated obligation handler 1215 to carry out the obligation tasks. The notify obligation handler 1215 is called to send a notification to the administrator. In addition, the log obligation handler 1215 is called to log the action and any associated information of interest. Note that the obligation tasks shown in this example are standard obligation tasks that are handled by obligation handlers 1215 and the obligation handlers are invoked by policy engine 1214. A policy enforcer can also support custom obligation tasks. Custom obligation tasks can be invoked by policy engine or passed to an interceptor and consequence applicator in a policy consequence along with policy effect. If a custom obligation task is passed to an interceptor and consequence applicator, the interceptor and consequence applicator is responsible for performing the custom obligation task.

Step 5 (1205): The interceptor and consequence applicator 1216 receives the ALLOW effect and calls the application code that it had intercepted.

Step 6 (1206): The normal file open application code is executed and results in a call to a file operation in the operating system library.

Step 7 (1207): The file open operation system call is intercepted. The interceptor and consequence applicator 1217 collects information about the action, document, and application, among other information. The collected information is forwarded to policy engine 1214.

Step 8 (1208): The policy engine 1214 receives the information collected by the interceptor and consequence applicator 1217. Before performing the policy evaluation, policy engine 1214 looks up in its cache to find the ALLOW effect produced by the evaluation of the policies on the same application operation. The policy engine 1214 returns an ALLOW effect to the interceptor and consequence applicator 1217.

Step 9 (1209): This step is not invoked because obligations have been carried out in step 4 after the policy evaluation in step 3. The policy engine maintains sufficient information to identify that the two interceptors are related and to ensure that an obligation or remediation task is not carried out more than once.

Step 10 (1210): The interceptor and consequence applicator 1217 receives an ALLOW effect from policy engine 1214 and proceeds to call the file open function in the operating system library.

Step 11-13 (1211-1213): The normal file open operation is carried out.

FIG. 12 also illustrates how a policy enforcer applies the policy to carry out both application usage control and document access control. The interceptor and consequence applicator 1216 intercepts an application operation and causes the policy to be evaluated at policy engine 1214. In an example that the application operation being intercepted is a menu selection operation such as "File|Open", the interception, decision and enforcement steps carry out by a policy enforcer controls the usage of the application program (i.e., Microsoft Word) and the policy enforcer implements application usage control at a first functional level.

Based on the policy, a policy enforcer may allow or deny an intercepted application operation. When policy effect associated with an interception at interceptor and consequence applicator 1216 is ALLOW, the application operation will be carried out resulting in further program code execution. Program code execution that implements document access operation may be intercepted again at interceptor and consequence applicator 1217 causing the policy to be evaluated at the policy engine. The evaluation step can be optimized using information gathered in earlier evaluation step of the same application operation. In an example where the intercepted operation is a document access operation fopen( ), the interception, decision and enforcement steps of the policy enforcer controls document access and therefore implements document access control at a second functional level.

In the case that an application program different from Microsoft Word is running on the same computer system and the application program is not instrumented with an interceptor and consequence applicator similar to that of 1216, an application operation such as "File|Open" cannot be intercepted in the application program. As a result, application usage control at the first functional level cannot be carries out on the application program. Nevertheless, when the application operation causes an invocation of a fopen( )

operating system library function, the fopen( ) call will be intercepted by interceptor and consequence applicator 1217. The intercepted operation is forwarded to the policy engine 1214 and the policy is evaluated where implementing document access control at a second functional level.

In another example, a policy may comprise of two or more expressions where at least one of the expressions controls application usage and at least one of the expressions controls document access.

A policy definition includes of two expressions is:

```
(FOR message.class = Confidential AND message.to =
Unauthorized-Destination
  ON SAVE
  BY user = Executive) OR
(FOR message.class = Confidential AND message.to =
Unauthorized-Destination
  ON SEND
  BY user = Executive)
DO DENY AND ARCHIVE
```

An alternative policy definition includes of two policies is:

```
# First policy (or first rule)
FOR message.class = Confidential AND message.to =
Unauthorized-Destination
ON SAVE
BY user = Executive
DO DENY AND ARCHIVE
# Second policy (or second rule)
FOR message.class = Confidential AND message.to =
Unauthorized-Destination
ON SEND
BY user = Executive
DO DENY AND ARCHIVE
```

Yet another policy definition that combines two expressions is:

```
FOR message.class = Confidential AND message.to =
Unauthorized-Destination
ON SAVE, SEND
BY user = Executive
DO DENY AND ARCHIVE
```

The first expression of the policy including two expression is "FOR message.class=Confidential AND message.to =Unauthorized-Destination; ON SAVE; BY user=Executive" and the second expression is "FOR message.class=Confidential AND message.to =Unauthorized-Destination; ON SEND; BY user=Executive". The first expression controls saving of a message and interception is typically carried out at the second function level when the save operation accesses to a message store. The second expression controls sending of a message which is normally carried out in a mail client application where implementing application usage control at the first functional level.

With the two policies policy definition, the first policy specifies a SAVE action where implementing document access control, and the second policy specifies a SEND action where implementing application usage control.

Figure 13:
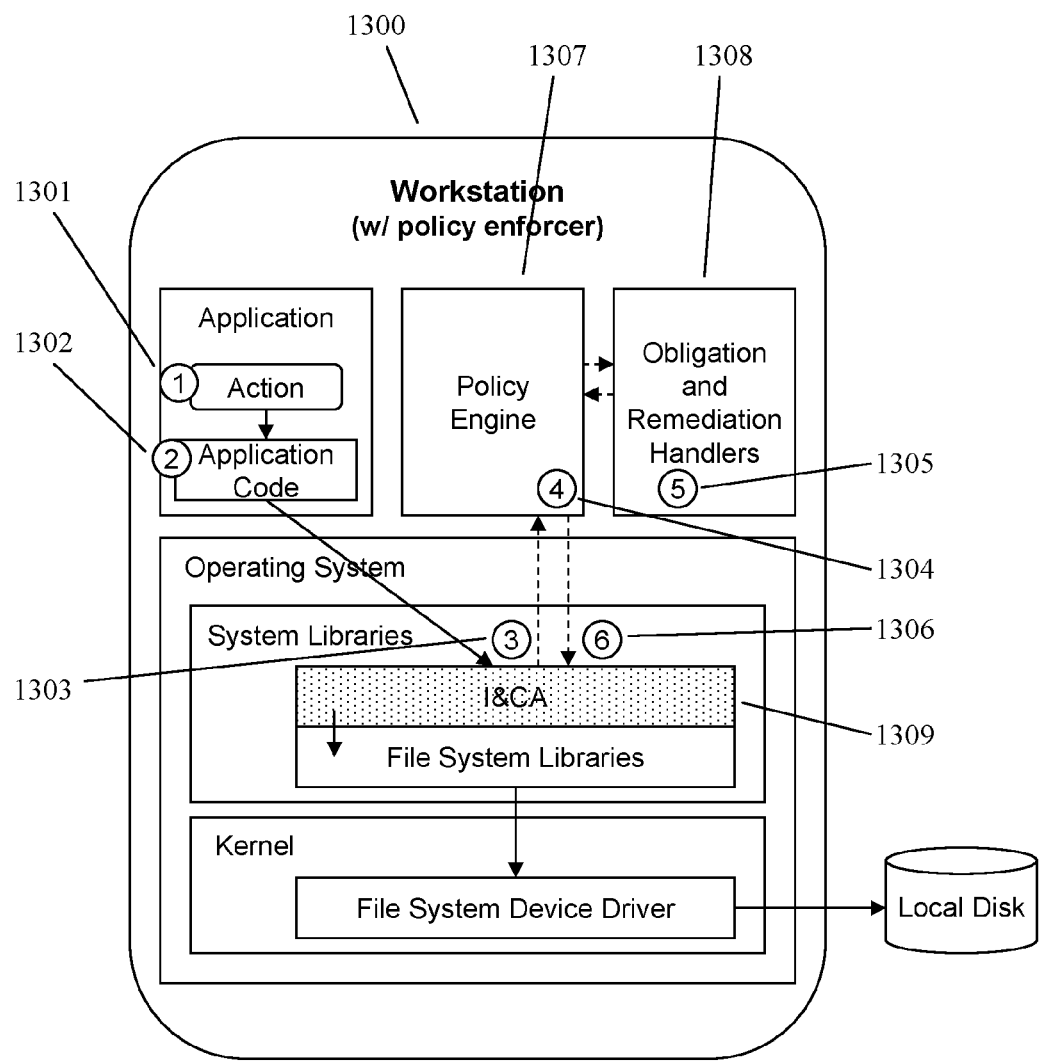
FIG. 13 is a block diagram that illustrates a policy enforcer on a workstation applying a remediation action for a file access operation according to the invention.

FIG. 13 illustrates an embodiment where a policy enforcer on a workstation 1300 applies a remediation action for a file access operation.

The policy definition is:

```
FOR document.name = "C:/secure/marketing/**"
ON OPEN
BY user = Marketing
DO ALLOW
  OTHERS DENY AND DELETE-ALL "C:/secure/marketing/**"
```

The policy protects data on desktop and laptop computers by deleting all sensitive files in "C:/secure/marketing/" the first time an unauthorized user tries to access such files. The operation that deletes sensitive files is specified as a remediation action in the policy.

Step 1 (1301): A user that is a member of the Engineering group tries to open a file in "C:/secure/marketing/" which is left over by a previous user of a laptop computer.

Step 2 (1302): A normal file open application code is executed and results in a call to a file operation in the operating system library.

Step 3 (1303): The file open operation system call is intercepted by the interceptor and consequence applicator 1309. The interceptor and consequence applicator 1309 collects information about the action, document, and application, among other information. The collected information is forwarded to the policy engine 1307.

Step 4 (1304): The policy engine 1307 receives the information collected by the interceptor and consequence applicator 1309 and performs policy evaluation. The intercepted action is OPEN which matches the policy and the policy is then evaluated. The policy engine 1307 compares the document name and path against "C:/secure/marketing/", checks if the user is in the Marketing group, and determines that the action should be denied. In addition, there is a remediation task associate with the policy that the policy engine 1307 needs to carry out. The policy engine 1307 returns a DENY effect to the interceptor and consequence applicator 1309.

Step 5 (1305): The policy engine 1307 calls a delete remediation handler 1308 to carry out the remediation task specified in the policy. In this example, the delete remediation handler 1308 deletes all files under "C:/secure/marketing/".

Step 6 (1306): The interceptor and consequence applicator 1309 receives a DENY effect from policy engine 1307 and terminates the file open operation.

Figure 14:
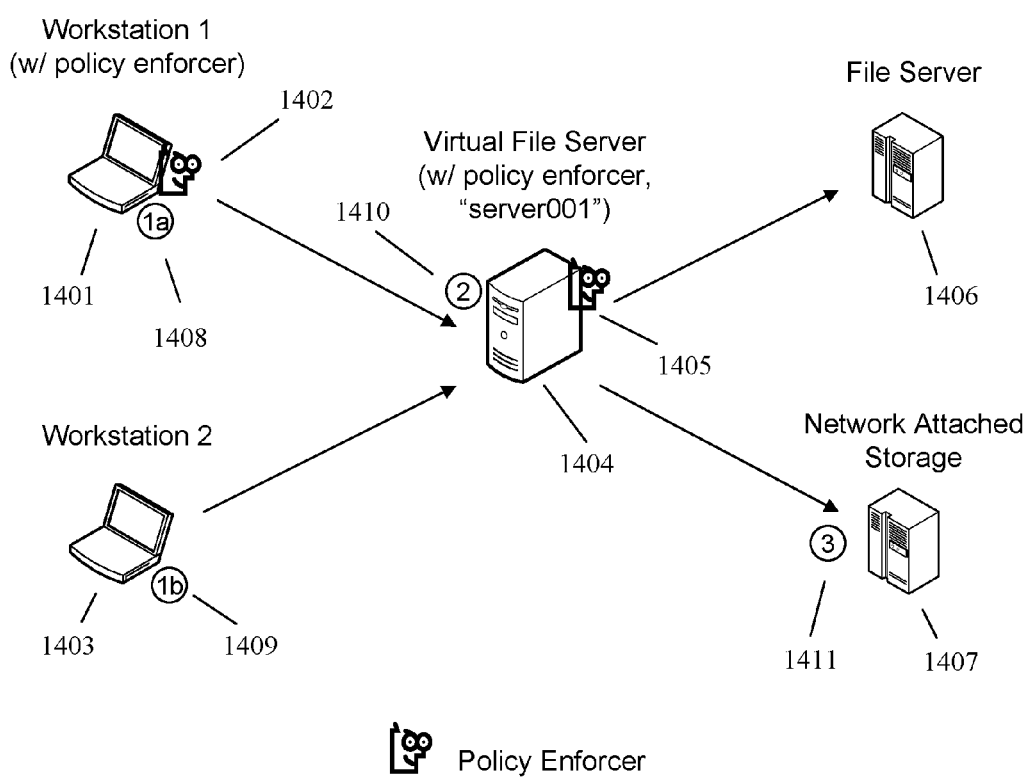
FIG. 14 is a diagram that illustrates a policy enforcer on a virtual file server that controls a client computer's access to files on a file server or a network attached storage device behind a virtual file server according to the invention.

FIG. 14 illustrates an embodiment where a policy enforcer on a virtual file server (e.g., a virtual network attached storage (NAS) device such as Acopia Adaptive Resource Switch, NeoPath File Director, or Rainfinity RainStorage) protects files served by the virtual file server.

The policy definition is:

```
FOR document.name = "//server001/engineering/projectA/**"
ON OPEN
BY user = ProjectA-Team
DO ALLOW
```

This scenario demonstrates a situation where a user (or application) action triggers an operation on a file residing on a network attached storage (NAS) device 1407 and the file is accessed through a virtual file server 1404 and policy-based authorization (or policy enforcement) occurs at the virtual file server 1404. The user or application action can be performed on any workstation including one that is controlled by a workstation policy enforcer 1401 or one that is not 1403. FIG. 14 illustrates a topological diagram containing two workstations 1401, 1403, a virtual file server 1404, a file server 1406 and a NAS device 1407. The workstations 1401, 1403 access files residing on the file server 1406 and the NAS device 1407 through virtual file server 1404.

Step 1 (1408, 1409): A user or application initiates an action. The action triggers a file operation on a file residing on the NAS device 1407. Since the file path associated with the file operation refers to a file on virtual file server "server001" 1404 (even though the file is on the NAS device 1407), a file operation request is made to virtual file server 1404. The workstation 1401 or 1403 where the action is initiated can be controlled by a workstation policy enforcer or not controlled by a workstation policy enforcer.

Step 2 (1410): The virtual file server 1404 receives the file operation request. The request is run through an authorization process initiated by an interceptor installed on the virtual file server 1404 (where the interceptor intercepts the file operation request) or an authorization step built into the virtual file server 1404 (where interception is an integral part of the virtual file server's program logic). The authorization process involves collecting information about the file operation request and forwards that information to a policy engine running on the virtual file server 1404.

Using rules distributed by a policy server, information collected by the authorization process, and other environment and configuration data, the policy engine determines if the file operation request should be allowed or denied. The policy engine will also carry out any obligation and remediation operations deemed necessary. The policy engine may also decide to store information to help process future file operation requests.

The authorization processing program logic receives a return status (i.e., effect) from the policy engine. Based on the status, the authorization processing program logic may allow a file operation request to a file on the NAS device 1407 to be processed; or deny the file operation request. If a file operation request is allowed, the virtual file server 1404 performs its normal processing and forwards the file operation request to the NAS device 1407.

Step 3 (1411): The NAS device 1407 serves the file operation request and returns a response back to the workstation 1401 through the virtual file server 1404.

Figure 15:
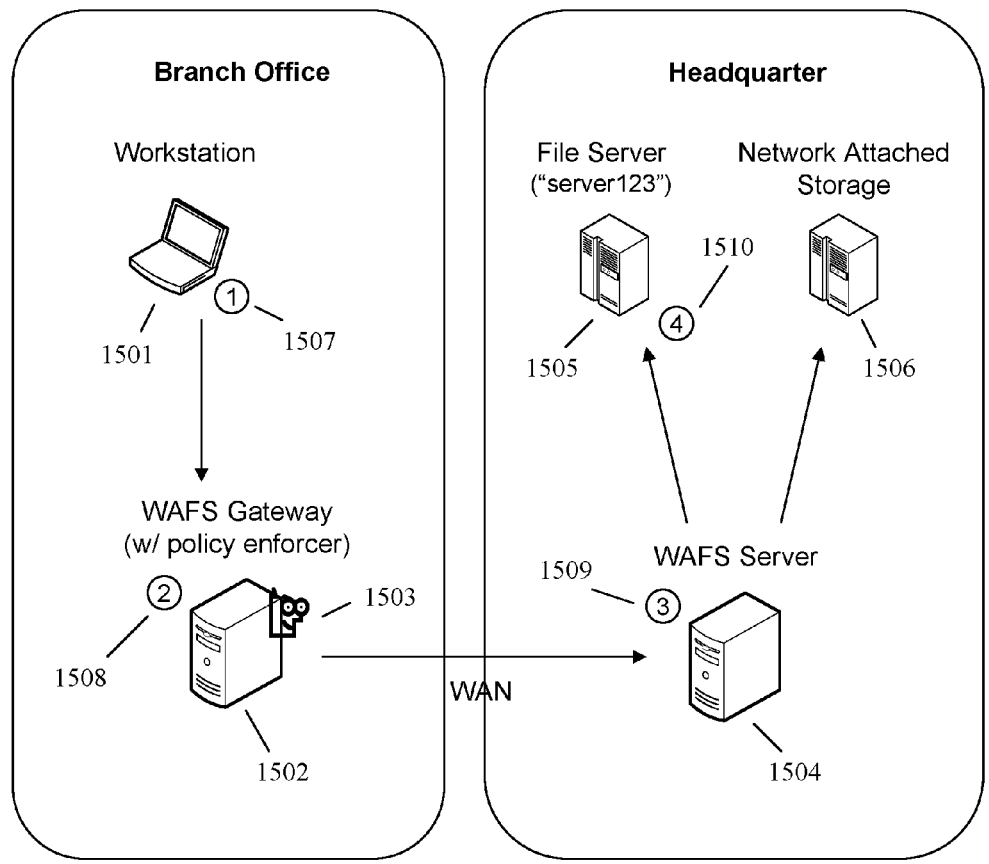
FIG. 15 is a diagram that illustrates a policy enforcer on a file gateway that controls the client computer's access to files on a file server or a network attached storage device across the wide area network according to the invention.

FIG. 15 illustrates an embodiment where a policy enforcer on a file gateway (e.g., a wide area network file services (WAFS) gateway such as Cisco File Engine series appliances or Tacit IShared products or Riverbed Steelhead appliances) protects files accessed through the file gateway.

The policy definition is:

```
FOR document.name = "//server123/marketing/products/**"
ON OPEN
BY user = Marketing
DO ALLOW
```

This scenario demonstrates the situation where a user (or application) action triggers an operation on a file residing on a file server that is being accessed through a file gateway 1502 and policy-based authorization (or policy enforcement) occurs at the file gateway 1502. FIG. 15 shows a topological diagram containing a workstation 1501, a file gateway (e.g., a WAFS gateway) 1502, a WAFS server 1504, a file server 1505 and a network attached storage (NAS) device 1506. The workstation 1501 access files residing on the file server 1505 and the NAS device 1506 through the file gateway 1502.

Step 1 (1507): User or application initiates an action. The action triggers a file operation on a file resided on a file server "server123" 1505. The workstation 1501, where the action is initiated can be controlled by a workstation policy enforcer or not controlled by a workstation policy enforcer. Since the workstation 1501 is connected to the file server 1505 through a file gateway 1502, the file operation request first reaches the file gateway 1502.2)

Step 2 (1508): The file gateway 1502 receives the file operation request. The request is run through an authorization process initiated by an interceptor installed on the file gateway 1502 (where the interceptor intercepts the file operation request) or an authorization step built into the file gateway 1502 (where interception is an integral part of the file gateway's program logic). The authorization process involves collecting information about the file operation request and forwards that information to a policy engine running on the file gateway 1502.

Using rules distributed by a policy server, information collected by the authorization process, and other environment and configuration data, the policy engine determines if the file operation request should be allowed or denied. The policy engine will also carry out any obligation and remediation operations deemed necessary. The policy engine may also decide to store information to help process future file operation requests.

The authorization processing program logic receives a return status (i.e., effect) from the policy engine. Based on the status, the authorization processing program logic may allow a file operation request to a file on the file server 1505 to be processed; or deny the file operation request.

By controlling file access at file gateway 1502, a file gateway policy enforcer protects files stored on file server 1505, NAS device 1506, and files cached on the file gateway 1502.

Step 3-4 (1509, 1510): If a file operation request is allowed, the file gateway 1502 performs its normal processing and forwards the file operation request to the WAFS server 1504 and finally to the file server 1505. The file server 1505 serves the file operation request and returns a response back to the workstation 1501 through the WAFS server 1504 and the file gateway 1502.

Figure 16:
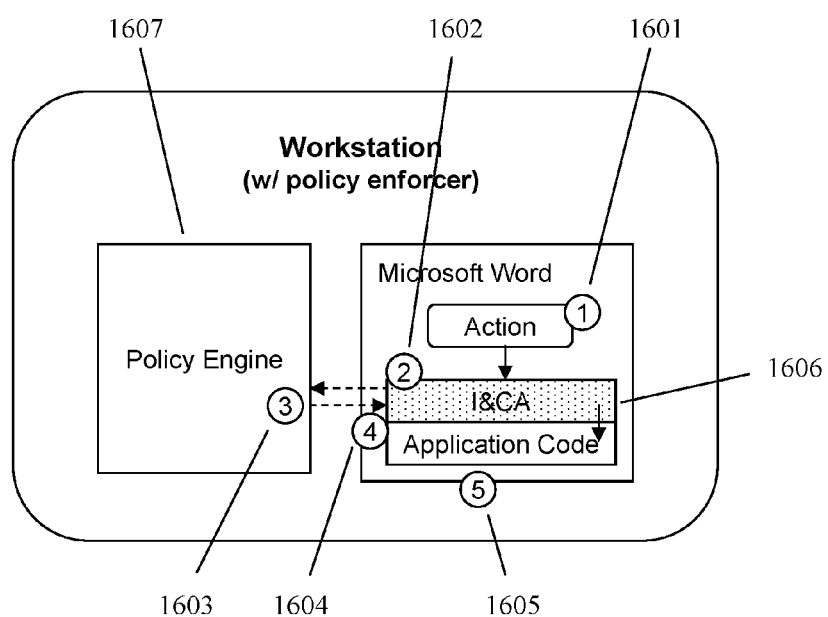
FIG. 16 is a block diagram that illustrates a policy enforcer on a workstation that controls application usage on the workstation according to the invention.

FIG. 16 illustrates an embodiment that controls application usage on a workstation. The policy definition is:

```
FOR document.name = "*.doc"
ON PRINT
BY user = Guests AND application = "Microsoft Word"
DO DENY OTHERS ALLOW
```

The policy specifies that printing a file from Microsoft Word by a user who is logged into a guest account is not allowed.

Step 1 (1601): A user has a document opened in Microsoft Word. The user tries to print the document in Microsoft Word by selecting menu item "File|Print" or pressing a print button on a toolbar.

Step 2 (1602): The user action is being intercepted by an application program interceptor and consequence applicator 1606 before reaching the code that implements the print function. Interception in Microsoft Word can be implemented as a Microsoft Office add-in module. The interceptor collects information about the action (e.g., print), the document and the application program (i.e., Microsoft Word); and forwards the information to a policy engine 1607 on the workstation.

Step 3 (1603): The policy engine 1607 receives data collected by the interceptor and consequence applicator 1606 and selects policies relevant to the data received. It then evaluates the relevant policies using the data received along with any applicable configuration and environmental data. In this example, assume only the above policy is selected.

The file name of the document to be printed is compared with the "*.doc" pattern in the policy. The action collected by the interceptor is compared with the "PRINT" specified in the action element of the policy. The application program information collected by the interceptor is compared with "Microsoft Word" specified in the subject element of the policy and the current user information is compared with a LDAP group, "Guests", specified in the subject element of the policy.

The outcome of the policy evaluation process is a policy consequence. The policy consequence contains a policy effect (this value is normally ALLOW or DENY) and any optional obligation and remediation tasks to be performed. If the condition specified in the above policy is satisfied, the positive policy effect specified in the policy consequence element is applied (DENY in the above policy). If the condition in a policy is not satisfied, the negative policy effect specified after the OTHERS keyword is applied. In the case where the OTHERS keyword is not specified, a negation of the positive policy effect is applied.

Step 4 (1604): Policy engine returns a policy consequence to the interceptor and consequence applicator 1606 which contains a policy effect. If the policy effect is ALLOW, the consequence applicator allows the print operation to be carried out. If policy effect is DENY, the consequence applicator terminates the print operation.

Step 5 (1605): When the print action is allowed, application code is called to carry out the action.

Figure 17:
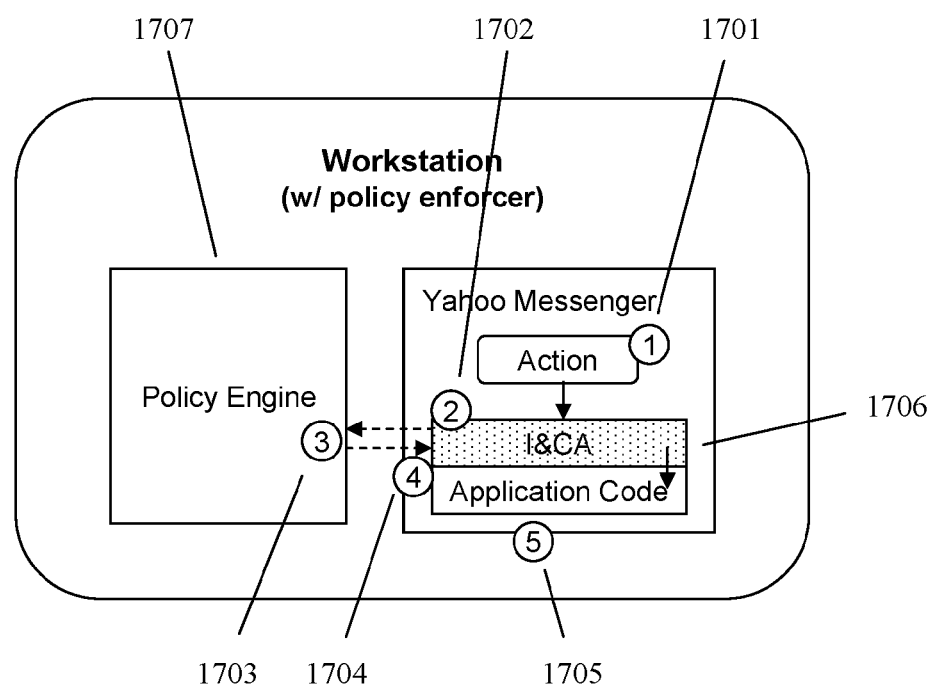
FIG. 17 is a block diagram that illustrates a policy enforcer on a workstation that controls application usage on the workstation according to the invention.

FIG. 17 illustrates an embodiment that controls application usage on a workstation. The policy definition is:

```
ON PASTE
BY user = Guest AND application = Instant-Messenger
DO DENY
```

The above policy prevents a user that is logged in as Guest from copying data into an Instant Messenger program. The policy does not involve any file and nonfile system objects. Application usage control is applied to the paste command on application data only.

Step 1 (1701): A user performs a "Paste" operation in Yahoo Messenger. The paste action can be invoked through "Edit|Paste" or accelerator keys <Ctrl>+V in Microsoft Windows.

Step 2 (1702): An interceptor and consequence applicator 1706 installed in Yahoo Messenger intercepts the application program operation (e.g., paste). The interceptor collects information regarding the action and the application program (here, Yahoo Messenger) and forwards the data collected to a policy engine 1707 on the workstation.

Step 3 (1703): The policy engine 1707 receives the data collected by the interceptor and consequence applicator 1706 and selects policies relevant to the data received. In this example, assume only the above policy is selected. If the data received contains action PASTE, the user is a member of Guests, and the application program is a member of the Instant-Messenger group, then the condition of the above policy is satisfied and the effect specified in the policy is returned in the policy consequence. In this case, the policy evaluation produces the policy effect of DENY.

Step 4 (1704): The interceptor and consequence applicator 1706 receives the policy consequence returned by the policy engine. Since the policy effect contained in the policy consequence is DENY, the consequence applicator blocks the paste operation.

Step 5 (1705): If the policy consequence returned in step 3 contained the policy effect ALLOW, then the application code would be executed to complete the paste operation.

Figure 18:
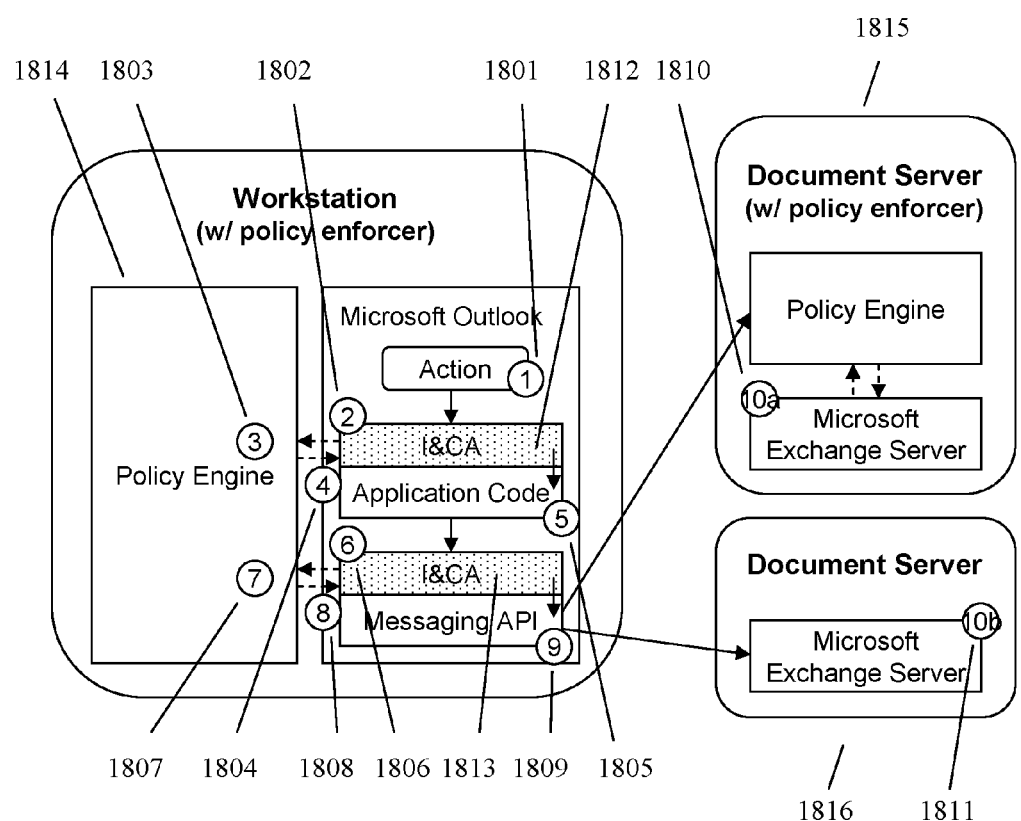
FIG. 18 is a block diagram that illustrates a policy enforcer on a workstation that controls application usage on nonfile system objects at the workstation according to the invention.

FIG. 18 illustrates an embodiment that controls application usage on nonfile system objects at a client computer. The policy definition is:

```
FOR message.from = CEO AND message.to <> "*@ourcompany.com"
ON FORWARD
BY user <> CEO
DO DENY
```

The policy above prevents the forwarding of e-mail messages from a company's CEO to anyone outside the company unless the sender is the CEO himself/herself. This policy can be evaluated at a workstation or a document server (i.e., e-mail server).

Step 1 (1801): A user forwards an e-mail message in Microsoft Outlook to a friend outside the company.

Step 2 (1802): An interceptor and consequence applicator 1812 installed in Microsoft Outlook intercepts the forward operation. The interceptor collects information about the action, the message and the application program (here, Microsoft Outlook) and forwards that information to a policy engine 1814 on the workstation.

Step 3 (1803): The policy engine 1814 receives the data collected by the Microsoft Outlook interceptor and consequence applicator 1812 and selects policies relevant to the data received. In this example, assume only the above policy is selected. The policy engine performs the policy evaluation and performs comparisons on the action, the source of the message, the recipients, and the user. If action is FORWARD, the message is from the CEO, the user is not the CEO, and the message is sent to a person outside the company, then the policy consequence returned contains a policy effect of DENY.

Step 4 (1804): The interceptor and consequence applicator 1812 receives a policy consequence containing the policy effect of DENY. The consequence applicator applies the policy effect of blocking the forward operation.

Step 5-10 (1805-1811): In the case where the policy consequence returned to the interceptor and consequence applicator 1812 contains the policy effect of ALLOW, the consequence applicator will not block the forward operation. The application code that implements the forward operation is executed. The operation may be intercepted again in step 6 (1806) at the messaging API level 1813. Policy evaluation occurs and in this case the policy engine returns a policy consequence with the policy effect of ALLOW. The messaging API completes delivery of the message to a mail server (i.e., Microsoft Exchange Server) which may have a policy enforcer installed 1815, or may not have a policy enforcer installed 1816. Once the mail reaches a mail server, the mail server will be responsible for delivering it to the final destination.

Figure 19:
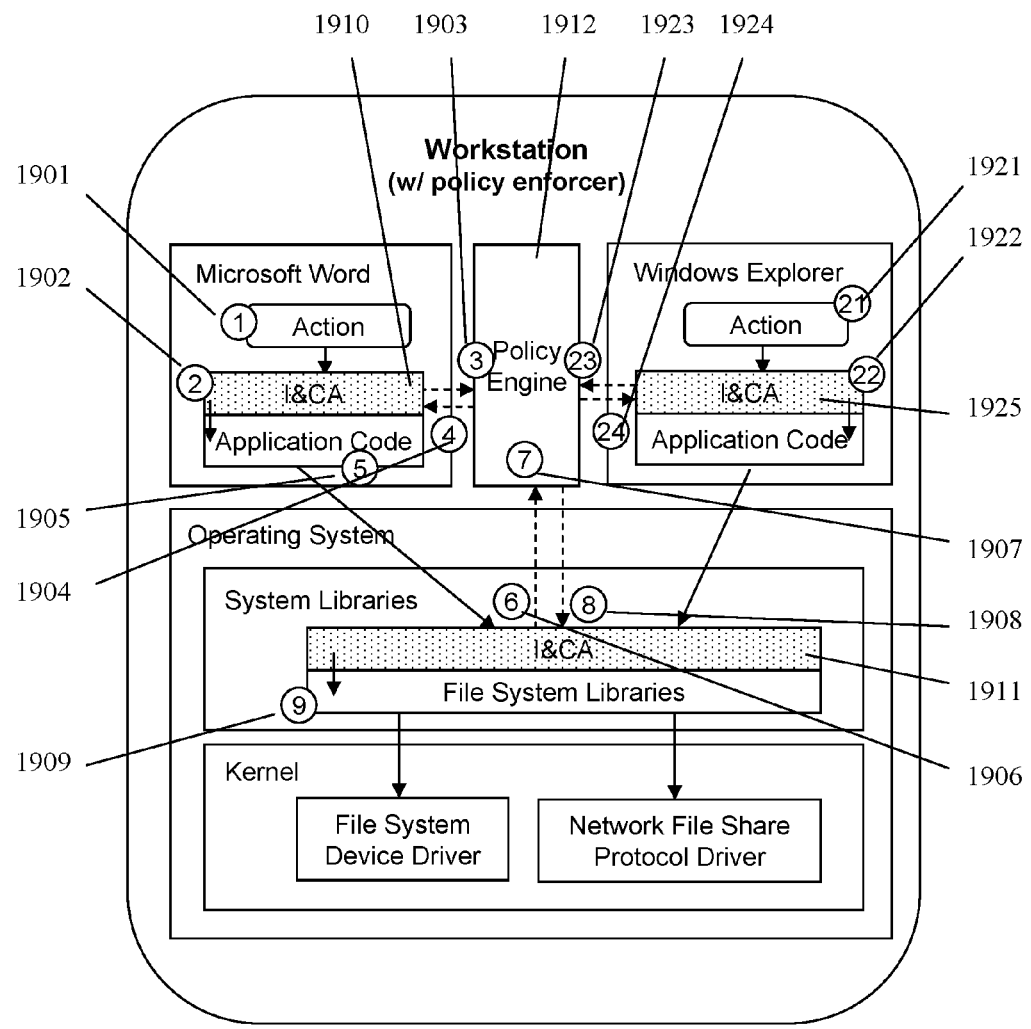
FIG. 19 is a block diagram that illustrates a policy enforcer on a workstation that combines application usage and document access control on files at the workstation according to the invention.

FIG. 19 illustrates an embodiment that combines application usage and document access control on files at a client computer. The policy definition is:

```
/* File access control */
FOR document.name = "//server1/EarningReports/*"
ON OPEN
BY user = Executives
DO ALLOW OTHERS DENY
/* Application usage control */
FOR document.name = "//server1/EarningReports/*"
ON PRINT, COPY
BY user = Audit-Committee
DO ALLOW OTHERS DENY
```

The above policies are designed to implement fine-grained control on the documents residing within "//server1/EarningReports/" directory. The first policy is designed to implement access control allowing only executives to view these documents. The second policy controls usage that only audit committee members who are subset of executives can copy or print such documents.

FIG. 19 shows a typical workstation policy enforcer configuration with a policy engine, at least one application program interceptor and consequence applicator 1910, and an operating system library interceptor and consequence applicator 1911. The application program interceptor and consequence applicator 1910 is responsible for intercepting application program operations—which represents usage. Usage includes copying and printing. Usage information is generally available inside an application program. For example, by intercepting copying and printing inside Windows Explorer, the system can prevent users from copying and printing a file. In addition, copy operations can also be blocked by intercepting "Save As" operations with file names different from the name of the currently opened file in an application program.

The operating system library interceptor and consequence applicator 1911 intercepts all types of accesses to a file. For example, a simple text file in "//server1/EarningReports/balancesheet.txt" can be viewed using Microsoft Notepad, Microsoft Word, Microsoft Wordpad, DOS command "type" and "edit", and any application program that can open a text file. A common thread among these application programs are the need to open a file before the contents of a file can be read and displayed. By intercepting file operation system calls such as open( ), fopen( ), and CreateFile( ), a policy enforcer can prevent unauthorized access from all application programs including those that are instrumented with interceptors and consequence applicators and those that are not instrumented.

In the current example, the objective is to limit document access to a group of users and further limit usage to an even smaller group of users. Implementing such a policy requires the ability to control both access and usage. Controlling access at the operating system library level only, cannot distinguish the intended usage of an open( ) file operation call, i.e., whether the content will be viewed or printed.

On the other hand, controlling usage at the application program level only cannot provide comprehensive access control because an interceptor in an application program has a limited ability to intercept document accesses. Further, a newly installed program without instrumentation can bypass such control.

Operation: OPEN

Step 1 (1901): A user who is designated an executive opens a file in "//server1/EarningReports/" using Microsoft Word.

Step 2 (1902): The open operation is intercepted by a Microsoft Word interceptor and consequence applicator 1910. The interceptor collects information about the action (OPEN), the document and the application program (here, Microsoft Word) and forwards the data collected to a policy engine 1912 on the workstation.

Step 3 (1903): The policy engine 1912 receives data collected by the interceptor and consequence applicator 1910 and selects policies relevant to the data received. Since the current action is OPEN, the first policy above is selected. The second policy is not selected in this case. The policy engine evaluates the relevant policies with information provided by the interceptor and other environmental and configuration data available to the policy engine. To evaluate the first policy, the policy enforcer compares the intercepted document name and path against "//server1/Earning Reports/*", the action compared with OPEN, and checks if the user is in the Executives group. The action in the second policy, above, is associated with COPY and PRINT and is thus not evaluated. When a policy condition is satisfied, the policy effect (ALLOW) specified in the first policy is returned in a policy consequence. In this case, the policy effect produced by the policy engine is ALLOW.

Step 4 (1904): The interceptor and consequence applicator 1910 receives the policy consequence containing policy effect ALLOW. The file open operation is allowed to continue. If the policy effect returned by policy engine 1912 was DENY, the consequence applicator blocks the file open operation.

Step 5 (1905): The application code in Microsoft Word for handling the file open operation is executed and results in an open( ) file operation system call.

Step 6 (1906): The open( ) call is intercepted by an operating system library interceptor and consequence applicator 1911. The interceptor collects information regarding the intercepted operation as in step 2 (1902) and forwards the data collected to the policy engine 1912.

Step 7 (1907): The policy engine 1912 receives the data collected by the interceptor and performs policy selection and evaluation similar to that in step 3 (1903). Alternatively, as an optimization step the policy engine may determine that the interception that occurred at step 6 (1906) belongs to same operation intercepted recently in step 2 (1902) and that the same policy consequence should be returned. In either case, the policy evaluation produces an ALLOW policy effect for the first policy above.

Step 8 (1908): The interceptor and consequence applicator 1911 receives a policy consequence from the policy engine 1912 containing the policy effect of ALLOW. The consequence applicator then allows the call to the open( )function in the operating system library to continue.

Step 9 (1909): The operating system library code for implementing the file open operation is executed.

Operation: PRINT

Step 1 (1901): A user who is designated an executive and a member of the audit committee tries to print a file in "//server1/EarningReports/" using Microsoft Word.

Step 2 (1902): The print operation is intercepted by a Microsoft Word interceptor and consequence applicator 1910. The interceptor collects information about the action (PRINT), the document, and the application program (here, Microsoft Word), and forwards the data collected to a policy engine 1912 at the workstation.

Step 3 (1903): The policy engine receives data collected by the interceptor and consequence applicator 1910 and selects policies relevant to the data received. Since the current action is PRINT, the second policy is selected. The policy engine evaluates the relevant policies with information provided by the interceptor and other environmental and configuration data available to the policy engine. In this case, assume a policy condition is satisfied and a policy effect of ALLOW is returned in a policy consequence.

Step 4 (1904): The interceptor and consequence applicator 1910 receives the policy consequence containing a policy effect of ALLOW. The file print operation is allowed to continue. If the policy effect returned by the policy engine is DENY, the consequence applicator blocks the file print operation.

Step 5 (1905): Application code in Microsoft Word for handling the file print operation is executed and the document is successfully printed. Since normal print operation in Microsoft Word does not access the file associated an open document, steps 6-9 (1906-1909) are not required.

Operation: COPY

Step 21 (1921): A user who is designated an executive but not a member of the audit committee tries to copy a file in "//server1/EarningReports/" using Windows Explorer.

Step 22 (1922): The copy operation is intercepted by a Windows Explorer interceptor and consequence applicator 1925. The interceptor collects information about the action (COPY), the document, and the application program (here, Windows Explorer), and forwards the data collected to a policy engine 1912 on the workstation.

Step 23 (1923): The policy engine receives data collected by the interceptor and consequence applicator 1925 and selects policies relevant to the data received. Since the current action is COPY, the second policy is selected. The policy engine evaluates the relevant policies with information provided by the interceptor and other environmental and configuration data available to the policy engine. In this case, assume a policy condition is not satisfied and a policy effect DENY is returned in a policy consequence.

Step 24 (1924): The interceptor and consequence applicator 1925 receives the policy consequence containing a policy effect DENY and the file copy operation is blocked.

Figure 20:
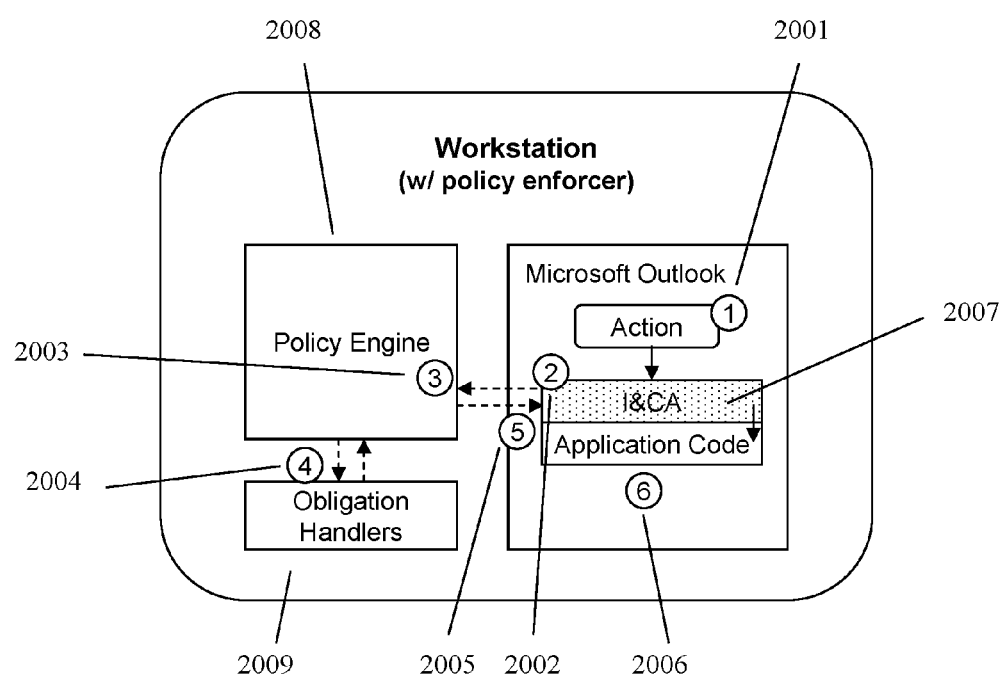
FIG. 20 is a block diagram that illustrates a policy enforcer on a workstation that uses an obligation to implement a regulatory compliance requirement according to the invention.

FIG. 20 illustrates an embodiment that uses an obligation to implement a regulatory compliance requirement. The policy definition is:

```
FOR message.subject = "*"
ON SEND
BY user = Executives
DO ALLOW AND ARCHIVE OTHERS ALLOW
```

The main objective of the above policy is not controlling access instead it is designed to carry out an obligation. Note that the system can have policies that apply to both control and obligation. The above policy is used to implement a regulatory compliance requirement that all e-mail messages sent by an executive in a public company must be archived for 7 years.

Step 1 (2001): A user who is designated an executive sends an e-mail message using Microsoft Outlook.

Step 2 (2002): An interceptor and consequence applicator 2007 installed in Microsoft Outlook intercepts the send operation. The interceptor collects information about the action (SEND), the message and the application program (here, Microsoft Outlook) and forwards the data collected to a policy engine 2008 on the workstation.

Step 3 (2003): The policy engine 2008 receives the data collected by the interceptor and consequence applicator 2007 and selects policies relevant to the data received. The policy engine performs the policy evaluation on the relevant policies. In this example, assume only the above policy is selected. When the conditions of the above policy are satisfied, the policy consequence specified in the policy is adopted. In this case, the policy evaluation produces a policy effect of ALLOW and an obligation of ARCHIVE. The policy engine calls an obligation handler 2009 to implement the ARCHIVE obligation and returns the policy effect to the interceptor and consequence applicator 2007.

Step 4 (2004): An obligation handler 2009 responsible for carrying out ARCHIVE obligation is called along with the message to be sent. In this case, the archive obligation handler sends a copy of the message to a message archive server.

Step 5 (2005): The interceptor and consequence applicator 2007 receives the policy consequence from the policy engine 2008 containing the policy effect of ALLOW. The consequence applicator allows the send operation to continue.

Step 6 (2006): The application code in Microsoft Outlook that implements the send operation is executed.

Figure 21:
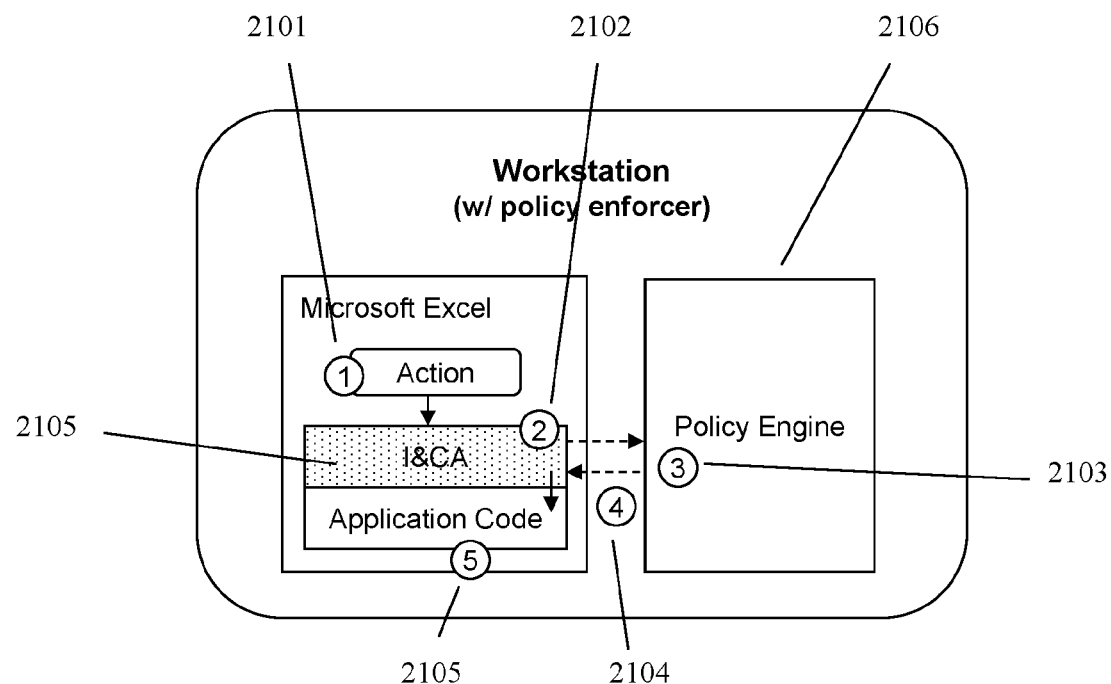
FIG. 21 is a block diagram that illustrates a policy enforcer on a workstation that controls application usage on nonfile system objects at the workstation according to the invention.

FIG. 21 illustrates an embodiment that controls application usage on nonfile system objects at a client computer. The policy definition is:

```
FOR document.name = "\\server3\finance\storesales-weekly.xls"
ON OPEN
BY user = Finance-Staff AND application = Excel
DO ALLOW AND EXCEL:PROTECT(FORMULA)
```

This policy implements control over application functions. In this example, a finance department manager wants to prevent unauthorized changes to formulas in a spreadsheet. The above policy is written to enable blocking of changes to spreadsheet formulas whenever a staff in the finance department opens the controlled spreadsheet. In this case, the blocking operation is implemented as a Microsoft Excel add-on module that monitors and blocks edit operations on a formula. In other cases, the protection may be implemented by simply making sure that the built-in protection feature in Microsoft Excel is turned on at the time a spreadsheet is opened.

The steps involved in carrying out the above protection mechanism are the following:

Step 1 (2101): A user in the finance department tries to open a sales report spreadsheet using Microsoft Excel.

Step 2 (2102): An interceptor and consequence applicator 2105 installed in Microsoft Excel intercepts the open operation. The interceptor collects information about the action (OPEN), the document, and the application program (Microsoft Excel) and forwards the data collected to a policy engine 2106 on the workstation.

Step 3 (2103): The policy engine 2106 receives the data collected by the interceptor and consequence applicator 2105 and selects policies relevant to the data received. The policy engine evaluates all relevant policies. In this example, assume only the above policy is selected. When the conditions of the above policy are satisfied, the policy consequence specified in the policy is adopted. In this case, the policy evaluation produces a policy effect of ALLOW and an obligation task of EXCEL:PROTECT. The policy consequence is returned to the interceptor and consequence applicator 2105.

Step 4 (2104): The interceptor and consequence applicator 2105 receives a policy consequence from the policy engine 2106 containing the policy effect ALLOW and the obligation task EXCEL:PROTECT. The consequence applicator first allows the open operation to be carried out. Once the spreadsheet is opened, the EXCEL:PROTECT obligation handler in the interceptor and consequence applicator 2105 is invoked with the parameter FORMULA to enable the protection function.

Note that the obligation handling task is implemented by the interceptor and consequence applicator 2105 in this example. In other examples, standard obligation tasks such as LOG, ARCHIVE, NOTIFY and ENCRYPT are handled by the policy engine. In addition, the obligation task in this example is implemented after the application program operation is carried out. Some obligation handlers are invoked by the policy engine at the end of policy evaluation. Other obligation handlers are invoked by a consequence applicator. Also, some obligation tasks may be carried out before the application program operation while others happens afterward.

Step 5 (2105): The application code in Microsoft Excel is executed to complete the open operation.

```
FOR document.name = "\\server3\finance\storesales-weekly.xls"
ON EDIT-FORMULA
BY user = Finance-Staff AND application = Excel
DO DENY
```

The example described above in FIG. 21 can also be implemented using an alternative method. The example above uses a combination of policy obligation and an add-in module that carries out the obligation of protecting formulas from being edited. The task of enabling such an obligation function is carried out every time a user opens the controlled spreadsheet. On the other hand, the policy above intercepts cell edit operations. If a user attempts to edit a formula, the above policy is evaluated which results in the operation being blocked.

The difference between the two examples is that first does not perform policy evaluation on every edit operation while the policy above requires policy evaluation on every edit operation (or formula edit operation) being intercepted.

Figure 22A:
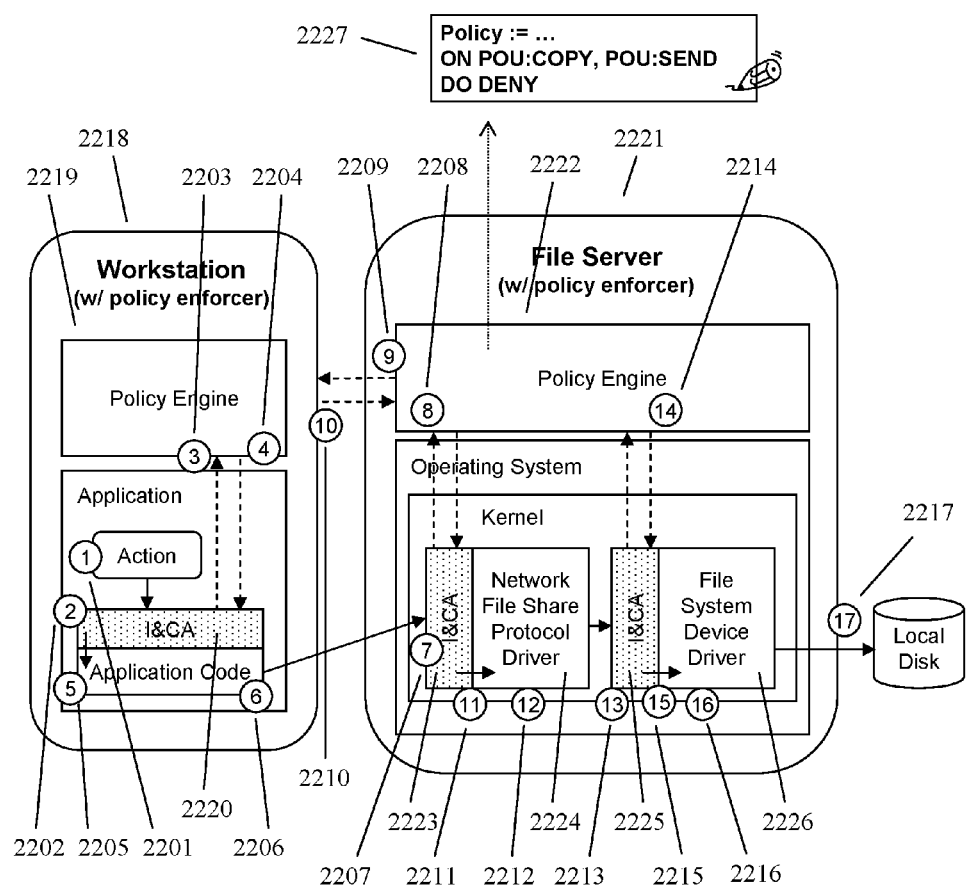
FIG. 22a is a block diagram that illustrates a document server policy specifying information to be obtained from a point-of-use policy enforcer during policy evaluation according to the invention.

FIG. 22a illustrates an embodiment where a document server policy specifies information to be obtained from a point-of-use policy enforcer during policy evaluation.

The policy definition is:

```
FOR document.category = "Highly-sensitive"
ON POU:COPY, POU:SEND
DO DENY OTHERS ALLOW
```

The prefix "POU:" in POU:COPY and POU:SEND is an information exchange directive which instructs a policy engine that evaluates the policy to perform evaluation based on information (here, an action) about the operation gathered at a point-of-use. In this case, the point-of-use is a workstation that initiated the operation.

An alternative syntax:

```
FOR document.category = "Highly-sensitive"
ON OPEN
WHERE NOT POLICY-ENFORCER-AT-POU
   OR POU-POLICY-ENFORCER(ACTION = {COPY, SEND})
DO DENY OTHERS ALLOW
```

The above policy specification uses information exchanges directives to instruct a policy engine evaluating the policy to perform two prescribed functions. The first directive POLICY-ENFORCER-AT-POU instructs a policy engine to check if there is a policy enforcer at a point-of-use where the point-of-use being a workstation that initiated the operation being intercepted at a document server where the policy is being evaluated. If a document server policy enforcer detects the presence of a policy enforcer at the point-of-use, the directive evaluates to true, and otherwise false. The second directive POU-POLICY-ENFORCER instructs a policy engine to check if an action associated with the operation is associated with action COPY or SEND at the point-of-use. Point-of-use action information is normally collected by a workstation policy enforcer.

Another alternative syntax:

```
FOR document.category = "Highly-sensitive"
ON OPEN
WHERE NOT pou.hasPolicyEnforcer
   OR pou.policyEnforcer.action = {COPY, SEND}
DO DENY OTHERS ALLOW
```

The information exchange directives pou.hasPolicyEnforcer and pou.policyEnforcer.action in the above policy are functional equivalents of the directives POLICY-ENFORCER-AT-POU and POU-POLICY-ENFORCER discussed above.

This example illustrates a collaborative policy evaluation that relies on information exchange between two policy enforcers. It shows a file server policy enforcer trying to enforce a policy that requires user action information captured at a point-of-use (by a workstation policy enforcer). In order to evaluate such a policy, a file server policy enforcer initiates a conversation with a workstation policy enforcer (on the workstation that initiates the file request). If the file server policy enforcer cannot find a policy enforcer on the workstation that makes the file request, the file server policy evaluates to an effect of DENY. If workstation policy enforcer tells the file server policy enforcer the action it intercepts is OPEN (operation for viewing a file), the file server policy evaluates to an effect of ALLOW. On the other hand, if the workstation policy enforcer tells the file server policy enforcer that the intercepted action is COPY, the document server policy will evaluate to an effect of DENY.

The following example details a sequence of events that occur during the evaluation of a document server policy that requires information exchange.

Step 1 (2201): A user at a workstation 2218 tries to open a file for viewing.

Step 2 (2202): An application program interceptor and consequence applicator 2220 on the workstation intercepts the file open operation. The interceptor collects information about the interception which includes the action (e.g., OPEN), the file name, and other application program information and sends the collected data to the policy engine 2219.

Step 3 (2203): The policy engine 2219 receives the data collected by the interceptor and consequence applicator 2220 and selects policies relevant to the intercepted action and collected data. In this example, assume only the above policy is selected. The policy engine evaluates the selected policies using the collected data along with other data available to the policy engine such as current user and operating environment data. The policy evaluation results in a consequence. Assume in this example that the policy evaluation produces the policy effect of ALLOW.

Step 4 (2204): The consequence produced by the policy engine is returned to the interceptor and consequence applicator 2220. The interceptor and consequence applicator component (I&CA) is composed of two functional parts:

interceptor, and consequence applicator. The interceptor is responsible of intercepting application program actions and the consequence applicator is responsible for applying decisions (or consequences) made by the policy engine. Since the consequence produced by the policy evaluation in this example contains a policy effect of ALLOW, the operation is not blocked by the consequence applicator.

Step 5 (2205): The application program logic required to carry out the file open operation is executed.

Step 6 (2206): Execution of the application program logic results in a file open request at the file server 2221.

Step 7 (2207): The file open request is intercepted by a network file share protocol interceptor and consequence applicator 2223 at the file server. The interceptor collects information about the file open request and forwards the collected data to a policy engine 2222 on the file server.

Step 8 (2208): The policy engine 2222 receives the data collected by the interceptor and consequence applicator 2223 and selects relevant policies based on the data received. Among the policies selected, one policy (here, the above policy 2227) contains information exchange directives that specify information to be obtained from the point-of-use (i.e., the workstation 2218 that initiated the file open request). Note that when the POU:COPY policy syntax is used, the policy enforcer implicitly maps the POU:COPY action to a local OPEN action.

Step 9 (2209): The policy engine 2222 attempts to detect the presence of a policy enforcer at the point-of-use 2228. If a policy enforcer cannot be detected at the point-of-use or communication to the policy enforcer fails, the policy engine will produce a consequence with a policy effect of DENY according to the above policy. If a policy enforcer at the point-of-use can be contacted, the policy engine at the file server requests the originating interception data from the workstation policy enforcer. In this case, assume the policy engine 2222 has successfully connected to the policy enforcer on workstation 2218.

Step 10 (2210): The workstation policy enforcer returns the originating interception data to the file server policy engine 2222. In this case, the action intercepted at the point-of-use is OPEN. The policy engine evaluates the relevant policies using the data collected by the local interceptor, data requested from the workstation policy enforcer, and data available to the file server policy enforcer. Assume the policy evaluation process produces a consequence that contains a policy effect of ALLOW.

Step 11 (2211): The policy consequence is returned to the interceptor and consequence applicator 2223. Since the consequence contains a policy effect of ALLOW, the consequence applicator does not block the file open request.

Step 12 (2212): The file open request is processed by the network file share protocol driver 2224.

Steps 13-17 (2213-2217): The steps between step 13 and step 17 as shown in the diagram may or may not be carried out depending on policy enforcer and file server implementations. The following outlines one of the possible scenarios:

(a) In step 12 (2212), the network file share protocol driver 2224 logic results in a call to the file system device driver 2226. The call is intercepted at step 13 (2213) by an interceptor and consequence applicator 2225. The interceptor collects information about the intercepted operation and forwards that data to the policy engine 2222. Policy engine evaluates relevant policies in step 14 (2214) and returns a policy effect of ALLOW to the interceptor and consequence applicator 2225. In step 15 (2215), the interceptor and consequence applicator allows the call to be carried out. In step 16 and 17 (2216, 2217), file system device driver logic is executed to serve the file open request which involves accessing data on a local disk.

Figure 22B:
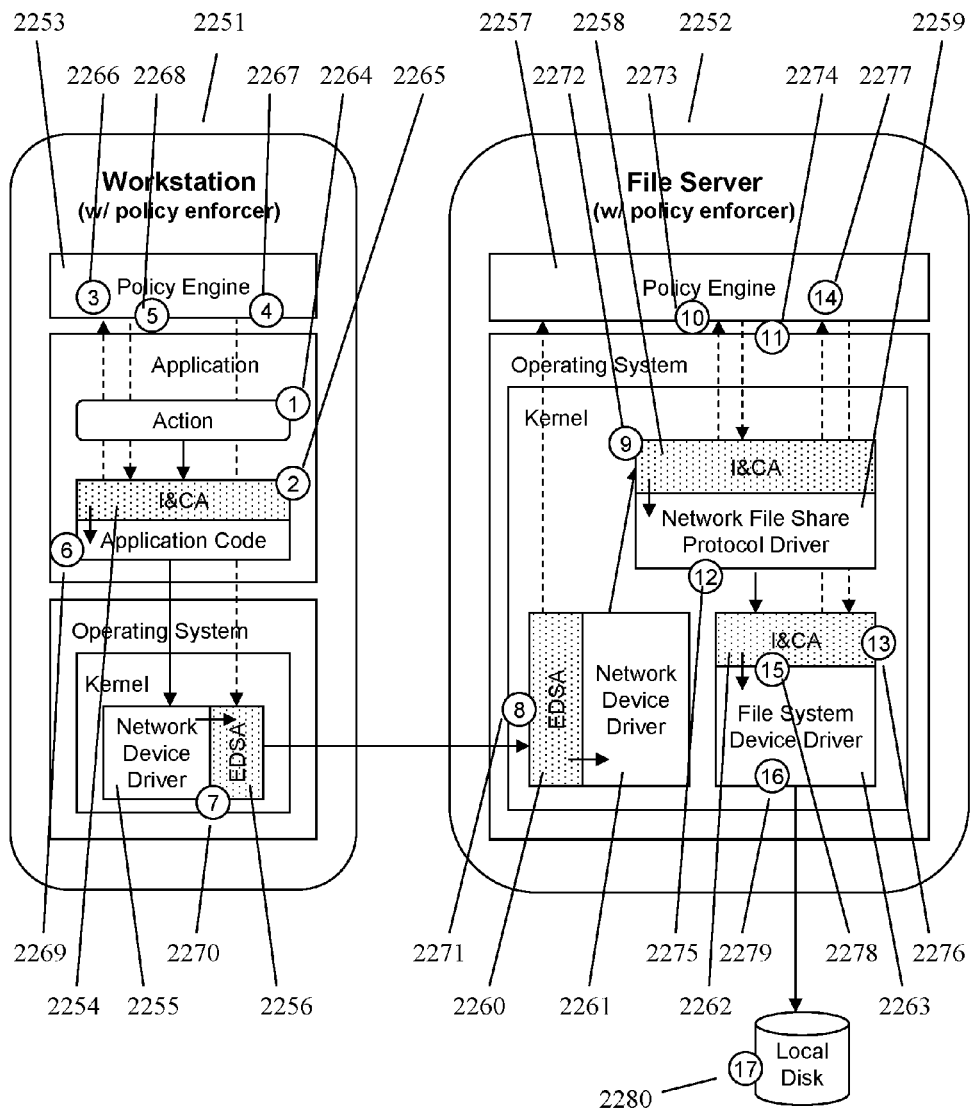
FIG. 22b is a block diagram that illustrates a workstation policy enforcer transmitting information obtained at a point-of-use to a document server policy enforcer according to the invention.

FIG. 22*b* illustrates an embodiment where a workstation policy enforcer transmits information obtained at a workstation to a file server policy enforcer to support policy evaluation at the file server policy enforcer.

The definition of the policy of interest that is evaluated at the file server is:

```
FOR document.category = "Private"
ON POU:COPY
DO DENY OTHERS ALLOW
```

The prefix "POU:" in POU:COPY is an information exchange directive that instructs a policy engine that evaluates the policy to perform an evaluation based on information (here, an action) related to the operation gathered at a point-of-use. In this case, the point-of-use is a workstation that initiated the operation.

An alternative syntax is:

```
FOR document.category = "Private"
ON OPEN
WHERE POU-POLICY-ENFORCER(ACTION = {COPY})
DO DENY OTHERS ALLOW
```

The above policy specification uses information exchange directives to instruct a policy engine that evaluates the policy to perform a prescribed function. The directive POU-POLICY-ENFORCER instructs the policy engine to check if an action intercepted at a point-of-use by a policy enforcer that is associated with the operation is COPY.

In other words, the policy describes if a file server policy enforcer does not have information to enforce a policy on a copy action, it should acquire the information needed to enforce the policy. In this case, to examine a request message for information attached by a workstation policy enforcer that initiated the request.

This example illustrates a collaborative policy evaluation that relies on information exchange between two policy enforcers. It shows a file server policy enforcer trying to enforce a policy that requires user action information captured at a point-of-use (by a workstation policy enforcer). In order to evaluate the policy at a file server, a workstation policy enforcer attaches information it has gathered about an operation to one or more messages it sends to the file server. A file server policy enforcer examines the messages it receives for such attached information and uses the information in policy evaluation. If a file server policy enforcer cannot find such attached information, a policy that specifies point-of-use information (such as the above policy) may evaluate to an effect DENY.

A message where a workstation policy enforcer may attach point-of-use information includes: Internet Protocol message (e.g., User Datagram Protocol (UDP) or Transmission Control Protocol (TCP) message), network file share protocol message (e.g., CIFS or NFS message), or application protocol message (e.g., HTTP, SOAP, XML-RPC, SMTP, POP3, IMAP4, FTP or WebDAV message).

According to the above policy, if a workstation policy enforcer tells a file server policy enforcer that an action it has intercepted was OPEN (an action OPEN intercepted at a point-of-use may correspond to a user action of viewing a file), the above policy should evaluate to a policy effect of ALLOW at the file server. On the other hand, if the workstation policy enforcer tells the file server policy enforcer that the intercepted action was COPY, the above policy should evaluate to a policy effect DENY.

The following example details a sequence of events that occur during the evaluation of a file server policy that requires information exchange.

Step 1 (2264): A user at a workstation 2251 tries to open a file for viewing.

Step 2 (2265): An application program interceptor and consequence applicator 2254 on the workstation intercepts the file open operation. The interceptor collects information about the interception which includes the action (e.g., OPEN), the file name, and other application program information and sends the collected data to a policy engine 2253.

Step 3 (2266): The policy engine 2253 receives the data collected by the interceptor and consequence applicator 2254 and selects policies relevant to the intercepted action and collected data. In this example, assume only the above policy is selected. The policy engine evaluates the selected policies using the collected data along with other data available to the policy engine such as current user and operating environment data. The policy evaluation results in a consequence. Assume in this example that the policy evaluation produces a policy effect of ALLOW.

Step 4 (2267): The policy engine 2253 makes available all or part of the information collected by the interceptor and consequence applicator 2254 and any additional information needed to evaluate policy at a file server (together called point-of-use information below) to the enforcer data service adaptor 2256 for transmission to the file server.

Step 5 (2268): The consequence produced by the policy engine 2253 is returned to the interceptor and consequence applicator 2254. The interceptor and consequence applicator component is composed of two functional parts: interceptor, and consequence applicator. The interceptor is responsible of intercepting application program actions and the consequence applicator is responsible for applying decisions (or consequences) made by the policy engine. Since the consequence produced by the policy evaluation in this example contains a policy effect of ALLOW, the operation is not blocked by the consequence applicator.

Step 6 (2269): The application program logic required to carry out the file open operation is executed.

Step 7 (2270): The file open application program logic resulted in one or more network packets being sent through a network device driver 2255. The network packets are intercepted by the enforcer data service adaptor 2256 and the point-of-use information is placed on at least one network packets being intercepted.

In an alternative implementation, the point-of-use information may be provided by the interceptor and consequence applicator 2254 in step 2 (2265). In this case, if no other information needs to be furnished by the policy engine 2253, step 4 (2267) may be eliminated.

Step 8 (2271): Network packets originated from the workstation found its way to a file server 2252. The enforcer data service adaptor 2260 at the file server intercepts network packets arrived at the file server and extract the point-of-use information attached in step 7 (2270). The point-of-use information extracted is made available to a policy engine 2257 at the file server. The enforcer data service adaptor 2260 passes network packets to a network device driver 2261 to continue normal processing of network traffic.

Step 9 (2272): For network file share protocol traffic, the network device driver 2261 at the file server passes network packets (or messages) it receives to a network file share protocol driver 2259 for further processing. Before the network packets reach the network file share protocol driver, they are intercepted by an interceptor and consequence applicator 2258 at the file server. The interceptor collects information about an operation (e.g., a file open request) and forwards the collected data to a policy engine 2257 at the file server.

Step 10 (2273): The policy engine 2257 receives the data collected by the interceptor and consequence applicator 2258 and selects relevant policies based on the data received. Among the policies, one policy (here, the above policy) contains information exchange directives that specify information to be obtained from the point-of-use (i.e., the workstation 2251 that initiated the file open request).

Note that POU:COPY policy syntax implicitly maps to a local OPEN action making the policy relevant to an OPEN operation that is intercepted locally.

Policy engine 2257 attempts to locate point-of-use information provided by the workstation that initiated the operation. In this case, an attempt to locate point-of-use information is successful and the point-of-use information provided in step 8 (2271) is found. The point-of-use information contains an action OPEN. As a result, the above policy is not selected (the policy applies if an action contains in the point-of-use information is COPY).

The policy engine determines a set of relevant policies and evaluates the relevant policies using the data collected by the local interceptor, the point-of-use information, and data available to the file server policy enforcer. In this case, assume the policy evaluation process produces a consequence that contains a policy effect of ALLOW.

In a specific implementation, the above policy is selected even though the point-of-use action is OPEN (not COPY) and evaluation of the policy produce an effect ALLOW.

Step 11 (2274): The policy consequence is returned to the interceptor and consequence applicator 2258. Since the policy consequence contains a policy effect of ALLOW, the consequence applicator does not block the file open request.

Step 12 (2275): The file open request is processed by the network file share protocol driver 2259.

Steps 13-17 (2276-2280): The steps between step 13 and step 17 as shown in the diagram may or may not be carried out depending on policy enforcer and file server implementations. The following outlines one of the possible scenarios:

(a) In step 12 (2275), the network file share protocol driver logic results in a call to the file system device driver 2263. The call is intercepted at step 13 (2276) by an interceptor and consequence applicator 2262. The interceptor collects information about the intercepted operation and forwards that data to the policy engine 2257. The policy engine evaluates relevant policies in step 14 (2277) and returns a policy effect of ALLOW to the interceptor and consequence applicator 2262. In step 15 (2278), the interceptor and consequence applicator allows the call to be carried out. In step 16 and 17 (2279, 2280), file system device driver logic is executed to serve the file open request which involves accessing data on a local disk.

The enforcer data service adaptors 2256 and 2260 illustrated in this example are associated with network device drivers and attach data to and extract data from network packets respectively. In another implementation of information exchange, the enforcer data service adaptor 2256 at the workstation creates one or more custom data packets containing point-of-use information and sends them to the file server 2252. These custom data packets are processed by enforcer data service adaptor 2260 at the file server which extracts point-of-use information from the custom data packets and make the point-of-use information available to the policy engine 2257.

In another implementation of information exchange, at workstation 2252, an enforcer data service adaptor 2256 attaches control information to regular network packets and creates custom network packets to hold point-of-use information and sends them to a file server 2252. At the file server, an enforcer data service adaptor 2260 extracts control information from regular network packets and extracts point-of-use information from custom data packets making the point-of-use information available to a policy engine 2257.

In a specific implementation, the control information attached to a regular network packet contains a flag to indicate point-of-use information is available on request and the enforcer data service adaptor 2260 at the file server sends a request to the workstation to request point-of-use information. In response to the request, the enforcer data service adaptor 2256 at the workstation sends the above custom network packets to the file server.

In another implementation of information exchange, a first enforcer data service adaptor is associated with a network file share protocol client (e.g., CIFS or NFS client) at a workstation and a second enforcer data service adaptor is associated with a network file share protocol driver (such as 2259) at a file server. The first enforcer data service adaptor attaches point-of-use information collected at the workstation to one or more network file share protocol messages and the second enforcer data service adaptor extracts the point-of-use information attached. The point-of-use information extracted is made available to a policy engine at a file server.

In another implementation of information exchange, a first enforcer data service adaptor is associated with a network file share protocol client (e.g., CIFS or NFS client) at a workstation and a second enforcer data service adaptor is associated with a network file share protocol driver (such as 2259) at a file server. The first enforcer data service adaptor sends point-of-use information collected at the workstation in one or more custom messages to the file server and the second enforcer data service adaptor extracts point-of-use information from the one or more custom messages. The point-of-use information is made available to a policy engine at the file server.

In another implementation of information exchange, a point-of-use enforcer data service adaptor is associated with network file share protocol client (e.g., CIFS or NFS) and a file server enforcer data service adaptor is associated with a network file share protocol driver (such as 2259). The point-of-use enforcer data service adaptor attaches information collected at the point-of-use to network files protocol messages and sends enforcer specific messages to a file server. The file server enforcer data service adaptor extracts information attached to network file share protocol messages and process enforcer specific messages sent by a point-of-use enforcer data service adaptor.

In another implementation of information exchange, a first enforcer data service adaptor is associated with a client application program on a workstation and a second enforcer data service adaptor is associated with a server application program (e.g., HTTP server) on a document server. The first enforcer data service adaptor attaches point-of-use information collected at the workstation by inserting one or more message headers into a message (e.g., HTTP GET or POST).

The second enforcer data service adaptor extracts the point-of-use information from the one or more message headers. The point-of-use information is made available to a policy engine at the document server.

Figure 23:
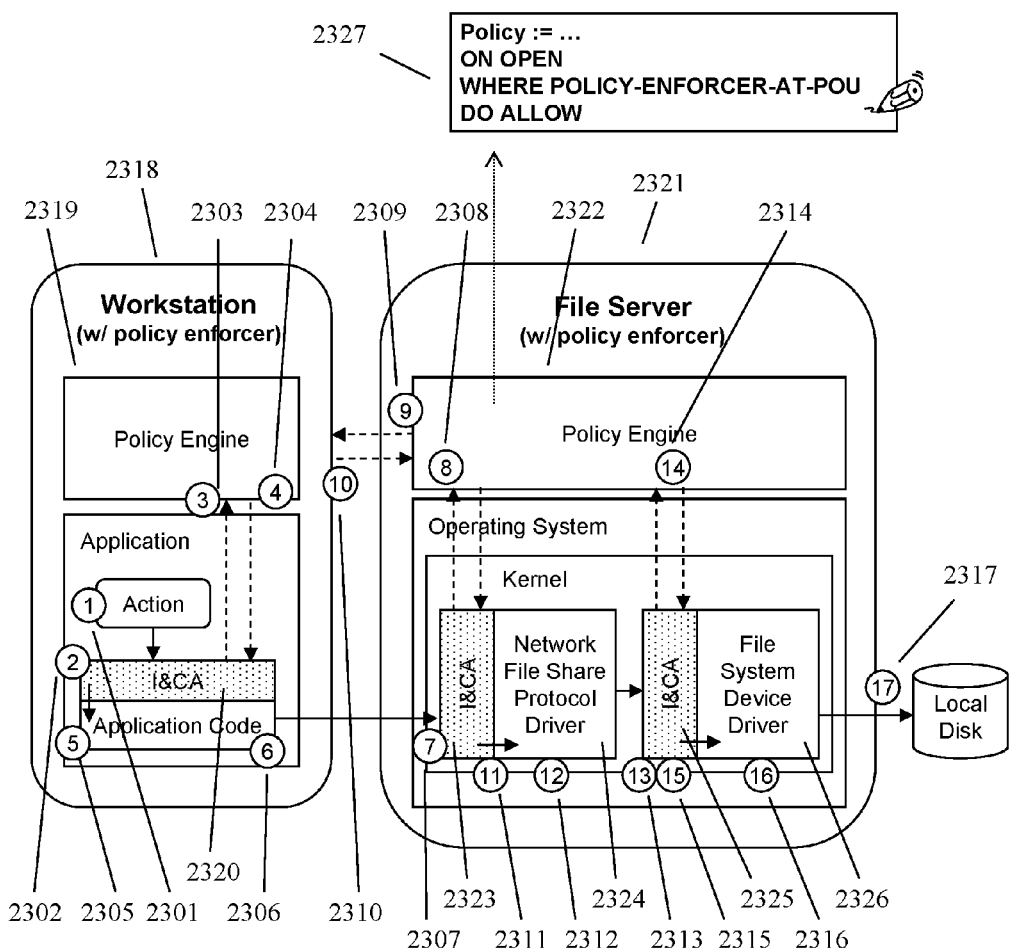
FIG. 23 is a block diagram that illustrates a file server policy enforcer allows access to a file only if a workstation policy enforcer is detected on a client computer that requested the file according to the invention.

FIG. 23 illustrates an embodiment where a file server policy enforcer allows access to a file only if a workstation policy enforcer is detected on a client computer that requested the file.

The policy definition is:

```
FOR document.name = "//server1/legal/**"
ON OPEN
BY user = Legal, M&A-Team
WHERE POLICY-ENFORCER-AT-POU
DO ALLOW AND OTHERS DENY
```

An alternative syntax:

```
FOR document.name = "//server1/legal/**"
ON OPEN
BY user = Legal, M&A-Team
WHERE pou.hasPolicyEnforcer
DO ALLOW AND OTHERS DENY
```

The following policy includes additional information on point-of-use policy enforcer capabilities.

```
FOR document.name = "//server1/legal/**"
ON OPEN
BY user = Legal, M&A-Team
WHERE POLICY-ENFORCER-AT-POU AND
POU-POLICY-ENFORCER(
 CAPABILITY = {SAVE, CUT-AND-PASTE}; POLICY-VERSION
 >= {1.32})
DO ALLOW AND OTHERS DENY
```

The transfer-of-control directives specified in the above policies instruct a policy engine to perform one or more prescribed functions. The directive POLICY-ENFORCER-AT-POU (or pou.hasPolicyEnforcer) instructs a policy engine that evaluates the policy (that specifies the directive) to check if there is a policy enforcer at a point-of-use where the point-of-use is a workstation that initiated the operation intercepted at a document server. The directive POU-POLICY-ENFORCER instructs a policy engine to verify if a policy enforcer at a point-of-use (e.g., a workstation policy enforcer) can enforce SAVE and CUT-AND-PASTE capabilities and policies being enforced at the point-of-use is at least version 1.32 or newer.

The function of the policy is to make sure a controlled document does not become uncontrolled once the document is loaded into an application. Consider that a user in an M&A-Team opens a legal document in "//server1/legal/" in Microsoft Word. The operation is successful because users in M&A-Team are allowed to open such file. Now, the user performs "File|Save As" with a local file path. If the save operation is successful, the newly saved copy of the controlled document becomes uncontrolled unless the workstation the user is using is controlled by a workstation policy enforcer that is capable of providing equivalent level of protection to the newly created copy of the document.

A document server policy enforcer protects (or controls) documents when a document is retrieved from a document server or a repository protected by the document server policy enforcer. Once a document server policy enforcer grants access to a document on a document server to a workstation requesting the document, it can no long control reproduction (e.g., copy or print) or distribution (e.g., send by e-mail or transfer using FTP) of the document. To prevent a controlled document from becoming uncontrolled, a document server policy enforcer only grants document access to a workstation that has the ability to continue the same level of control provided by the document server policy enforcer. Document server policy enforcer accomplishes this objective by verifying if a workstation requesting access to a document has a policy enforcer installed on it.

For example, a user in the M&A-Team can open a file in "//server1/legal/" when the user is logged on to a computer with a workstation policy enforcer running. When the same user logs on to a computer that does not have a workstation policy enforcer installed, the file open operation fails.

The following is a description of a policy enforcement process:

Step 1 (2301): A user at a workstation 2318 tries to open a file for viewing.

Step 2 (2302): An application program interceptor and consequence applicator component 2320 on the workstation intercepts the file open operation. The interceptor collects information about the interception which includes the action (OPEN), the file name, and other application program information, and sends the collected data to the policy engine 2319.

Step 3 (2303): The policy engine 2319 receives the data collected by the interceptor and consequence applicator 2320 and selects policies relevant to the intercepted action and collected data. In this example, assume only the above policy is selected. The policy engine evaluates the selected policies using the collected data along with other data available to the policy engine such as the current user and operating environment data. The policy evaluation results in a consequence. In this example the policy evaluation produces a policy effect of ALLOW.

Step 4 (2304): The consequence produced by the policy engine 2319 is returned to the interceptor and consequence applicator. The interceptor and consequence applicator component (I&CA) is composed of two functional parts: interceptor, and consequence applicator 2320. The interceptor is responsible of intercepting application program actions and the consequence applicator is responsible for applying decisions (or consequences) made by the policy engine. Since the consequence produced by the policy evaluation in this example contains a policy effect of ALLOW, the operation is not blocked by the consequence applicator.

Step 5 (2305): The application program logic required to carry out the file open operation is executed.

Step 6 (2306): Execution of the application program logic results in a file open request at the file server 2321.

Step 7 (2307): The file open request is intercepted by a network file share protocol interceptor and consequence applicator 2323 at the file server. The interceptor collects information about the file open request and forwards the collected data to a policy engine 2322 on the file server.

Step 8 (2308): The policy engine 2322 receives the data collected by the interceptor and consequence applicator 2323 and selects relevant policies based on the data received. Among the policies selected, one policy (here, assume one of the above policies or 2327) contains a transfer-of-control directive that requires the presence of a point-of-use policy enforcer (i.e., a workstation 2318 that initiates the file open request).

Step 9 (2309): The policy engine 2322 attempts to detect the presence of a policy enforcer at the point-of-use. If a policy enforcer cannot be detected at the point-of-use or communication to the policy enforcer fails, the policy engine will produce a consequence with a policy effect of DENY according to the above policy. In this case, assume a policy enforcer at the point-of-use can be contacted and the policy condition is satisfied, a consequence containing a policy effect of ALLOW is created.

Step 10 (2310): Optionally, if a policy enforcer at the point-of-use can be contacted and a policy containing a transfer-of-control directive (referred to as "transfer-of-control policy" below) requests that the point-of-use policy enforcer capabilities be communicated to the file server policy enforcer, the policy engine 2322 at the file server makes a request to the workstation policy enforcer. The workstation policy enforcer returns the requested information to the file server policy engine. If the workstation policy enforcer capabilities do not match that required by the transfer-of-control policy, the policy evaluation produces a consequence that contains a policy effect of DENY. Alternatively, the request to the workstation policy enforcer can be a query that inquires if the workstation policy enforcer supports the requested capabilities specified in the policy.

Step 11 (2311): The policy consequence is returned to interceptor and consequence applicator component 2323. Since the consequence contains the policy effect ALLOW, the consequence applicator does not block the file open request.

Step 12 (2312): The file open request is processed by the network file share protocol driver 2324.

Steps 13-17 (2313-2317): The steps between step 13 and step 17 as shown in the figure may or may not be carried out depending on policy enforcer and file server implementations. The following outlines one of the possible scenarios:

(a) In step 12 (2312), the network file share protocol driver 2324 logic results in a call to the file system device driver 2326. The call is intercepted at step 13 (2313) by an interceptor and consequence applicator component 2325. The interceptor collects information about the intercepted operation and forwards that data to the policy engine 2322. Policy engine evaluates relevant policies in step 14 (2314) and returns a policy effect of ALLOW to the consequence applicator. In step 15 (2315), the interceptor and consequence applicator allows the call to be carried out. In steps 16 and 17 (2316, 2317) the file system device driver logic is executed to serve the file open request which involves accessing data on a local disk.

Figure 24:
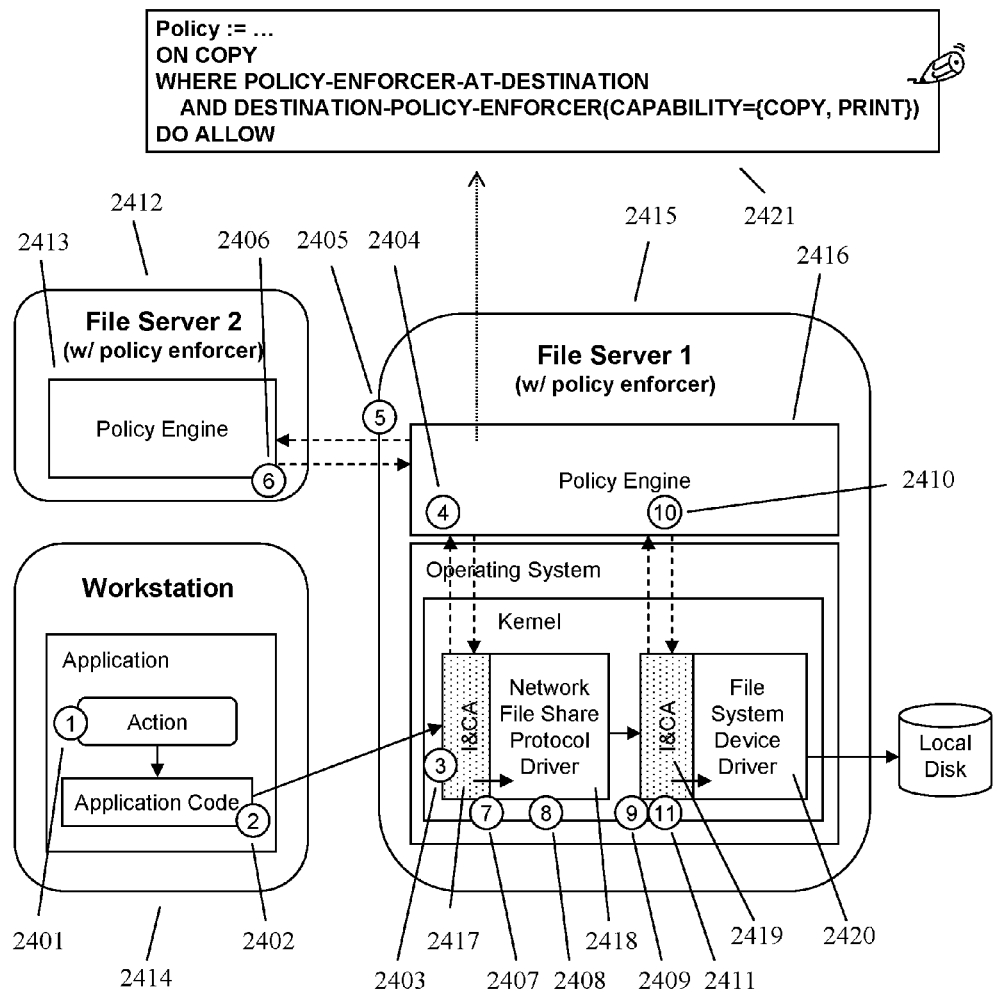
FIG. 24 is a block diagram that illustrates an embodiment where a copy operation is performed from a file server to a destination file server and the destination file server does not have a policy enforcer which results in a denial of the operation according to the invention.

FIG. 24 illustrates an embodiment where a copy operation is performed from a file server to a destination workstation and the destination workstation does not have a policy enforcer which results in a denial of the operation.

The policy definition is:

```
FOR document.name = "//server1/legal/**"
ON COPY
BY user = Legal
WHERE POLICY-ENFORCER-AT-DESTINATION
DO ALLOW AND OTHERS DENY
```

An alternative syntax:

```
FOR document.name = "//server1/legal/**"
ON COPY
BY user = Legal
WHERE destination.hasPolicyEnforcer
DO ALLOW AND OTHERS DENY
```

Below is an alternative policy that implements the same transfer-of-control function but with an additional list of required capabilities.

```
FOR document.name = "//server1/legal/**"
ON COPY
BY user = Legal
WHERE POLICY-ENFORCER-AT-DESTINATION
 AND DESTINATION-POLICY-ENFORCER(CAPABILITY=
 {COPY,PRINT})
DO ALLOW AND OTHERS DENY
```

The transfer-of-control directives specified in the above policies instruct a policy engine to perform one or more prescribed functions. The directive POLICY-ENFORCER-AT-DESTINATION (or destination.hasPolicyEnforcer) instructs a policy engine that evaluates the policy containing the directive to check if there is a policy enforcer at the destination of the operation. In this case, the destination is a workstation or server where the document(s) are copied to. The directive DESTINATION-POLICY-ENFORCER instructs a policy engine to verify if a destination policy enforcer (e.g., a workstation policy enforcer or a document server policy enforcer) has the capabilities and/or policies to enforce COPY and PRINT actions.

The above policy specifies that files in "//server1/legal/" can be copied only to a workstation or document server with a policy enforcer running. This policy can be enforced at a document server which guarantees that protected files on the document server are not copied to unprotected workstations (or document servers). The function of this policy is to prevent a protected document from becoming unprotected once it leaves the protected environment.

Step 1 (2401): A user (or an application program) takes an action to copy a file on a file server 2415 to a workstation's local disk 2414 (the following works the same if a copy is attempted between file servers and the destination of a copy operation is different from the point-of-use).

Step 2 (2402): Application program code is executed on the workstation 2414 to implement the user (or application program) action mentioned in step 1. Execution of the application program code results in a file request at the file server 2415.

Step 3 (2403): File request is intercepted at the file server's network file share protocol driver by an interceptor and consequence applicator 2417. The interceptor collects information associated with the interception (i.e., action, document identifier, client IP address, etc.) and sends it to a policy engine 2416 running on the file server.

Step 4 (2404): The policy engine 2416 takes the information collected by the interceptor and consequence applicator 2417 and selects policies relevant to the intercepted data. Among the selected policies, at least one policy (here, assume one of the above policies or 2421) contains a transfer-of-control directive that requires a policy enforcer to be present at the destination.

Step 5 (2405): The policy engine 2416 attempts to communicate with a policy enforcer at the destination 2414. Since there is no policy enforcer at the destination, the policy containing a transfer-of-control directive (referred to as "transfer-of-control policy" below) produces a consequence that contains a policy effect of DENY. In the case where the copy operation's destination is a file server 2412 with a policy enforcer installed and policy conditions are satisfied, a policy effect ALLOW is produced.

Step 6 (2406): If a policy enforcer at the destination can be contacted and a transfer-of-control policy requests that the destination policy enforcer capabilities be communicated to the file server policy enforcer, the policy engine 2416 at "File Server 1" 2415 makes a request to the policy enforcer at "File Server 2" 2412. The policy enforcer at "File Server 2" 2412 returns the requested information to the policy engine 2416. If the destination policy enforcer capabilities do not match those required by the transfer-of-control policy, the policy evaluation produces a consequence that contains a policy effect of DENY. Alternatively, the request to the destination policy enforcer can be a query that inquires if the destination policy enforcer supports the requested capabilities specified in the policy.

Step 7 (2407): The interceptor and consequence applicator 2417 receives the consequence from the policy evaluation. The policy effect of DENY in the consequence results in blocking the file operation at the file server 2415.

Steps 8-11 (2408-2411): Depending on the policy enforcer implementation, the implementation of the policy effect in step 6 may be delayed to step 11 (2411). Discussions on different server interception techniques are described above (refer to descriptions for FIG. 10).

(a) In a slightly different scenario, the policy engine 2416 may decide that step 4 is just an information collection step and defer the policy evaluation to step 10 and the COPY action is terminated at step 11 (2411) in file system device driver interceptor and consequence applicator 2419.

(b) In yet another embodiment, the interceptor and consequence applicator 2417 at step 3 does not communicate with the policy enforcer but communicates with the second interceptor and consequence applicator 2419 (or stores collected data in shared memory). The information collected at step 3 is made available to step 9 (2409). In this case, the policy evaluation is deferred to step 10 (2410) and the COPY action is terminated at step 11 (2411).

(c) Some implementations may use only one interceptor and consequence applicator (rather than two). For example, an implementation may use only file system device driver interceptors but not network file sharing protocol interceptors.

Figure 25:
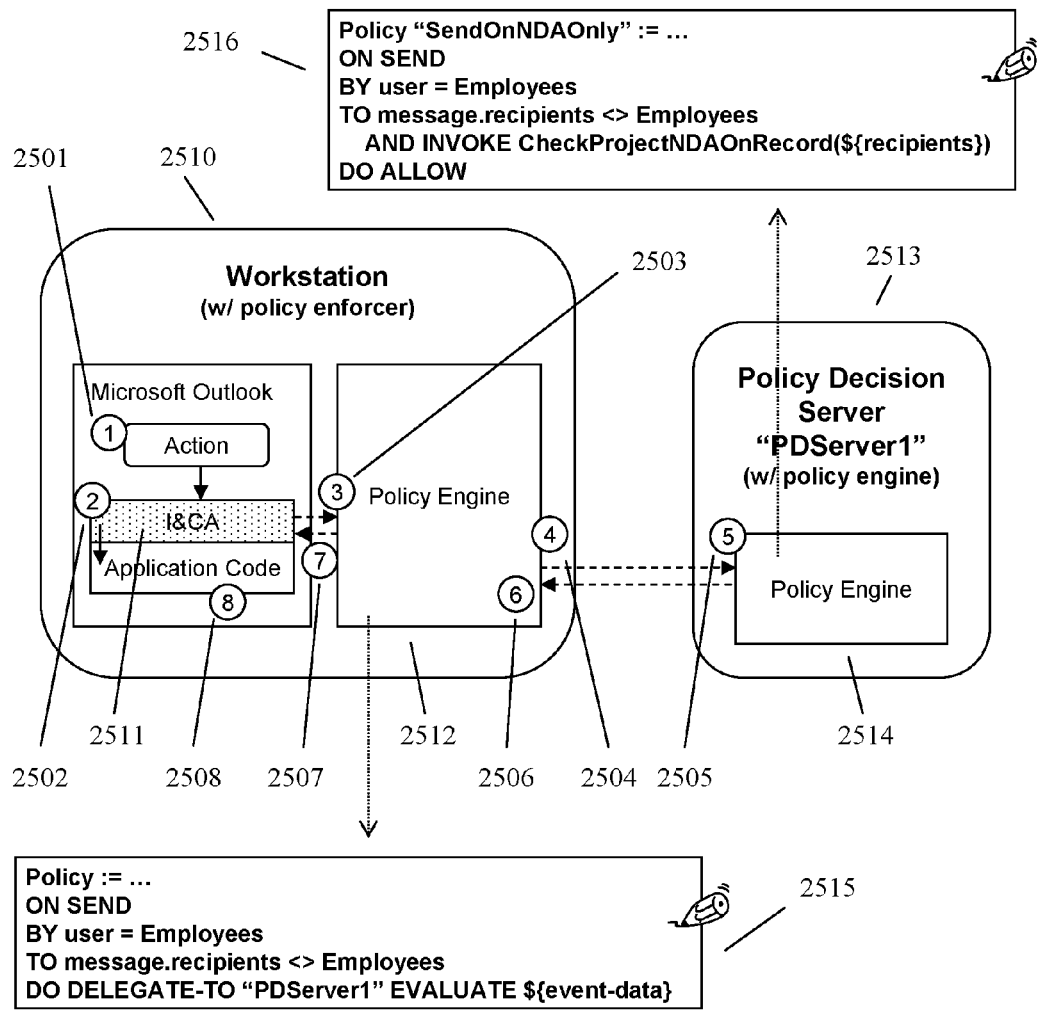
FIG. 25 is a block diagram that illustrates a workstation policy engine needing information about a recipient of a message that is unavailable at its location and the workstation policy engine delegating evaluation of the policy to a policy decision server according to the invention.

FIG. 25 illustrates an embodiment where a workstation policy engine delegates evaluation of a policy to a policy decision server because the information about a recipient in a message is unavailable at the workstation.

The definition of a delegation policy used in this example is:

```
FOR message.category = "Sensitive"
ON SEND
BY user = Employees
TO message.recipients <> Employees
DO DELEGATE-TO "PDServer1" EVALUATE ${event-data}
```

A delegation directive, DELEGATE-TO, is used in the delegation policy to instruct a policy engine to perform a delegation function. The DELEGATE-TO directive may specify a delegation target (i.e., "PDServer1") at which policy evaluation should be performed. In addition, an EVALUATE directive instructs a policy engine to direct a delegation target to perform policy evaluation with event data (here, ${event-data}) provided by the policy engine. The event data may include: action, resource(s), user, computer and application associated with an intercepted operation. Event data is transmitted to a delegation target as part of the delegation process.

Definition of the delegation target policy used in this example is:

```
FOR message.category = "Sensitive"
ON SEND
BY user = Employees
TO message.recipients <> Employees
  AND INVOKE CheckProjectNDAOnRecord(${recipients})
DO ALLOW OTHERWISE DENY
```

The delegation target policy uses a special directive INVOKE to invoke a user-defined function CheckProjectNDAOnRecord( ). The user-defined function checks if all recipients (here, ${recipient} which is part of ${eventdata}) of the message (this operation involve sending an e-mail message) have signed nondisclosure agreements (NDA). Since customer, vendor and partner information is not maintained by policy enforcers and policy server, a user-defined function is used to carry out the NDA validation process.

In this example, the delegation policy is evaluated at a workstation and the delegation target policy is evaluated at a policy decision server. When policy evaluation at a workstation policy enforcer involves the delegation policy, a delegation process is trigged. The delegation process causes policy evaluation to be invoked at a policy decision server. In this case, the policy decision server is PDServer1 and the policy being evaluated at the policy decision server is the delegation target policy.

Step 1 (2501): A user sends an e-mail message using Microsoft Outlook.

Step 2 (2502): The send message operation is intercepted by an application program interceptor and consequence applicator 2511 installed in Microsoft Outlook. The interceptor collects information about the send operation and forwards that information to a policy engine 2512 running on the workstation 2510.

Step 3 (2503): The policy engine 2512 receives the data collected by the interceptor and consequence applicator 2511 and selects policies relevant to the data received. Among the relevant policies, there is a policy (here, assume the above workstation delegation policy) containing a delegation directive that instructs the policy engine to delegate policy evaluation to another policy engine if the conditions of the delegation policy are satisfied. Assume the policy engine proceeds with the policy evaluation and the condition in the delegation policy is satisfied. The result of the policy evaluation includes a policy effect to be produced by delegating policy evaluation to another policy engine.

Step 4 (2504): The consequence portion of the delegation policy 2515 requires that the policy engine 2512 obtain a policy effect through delegating the policy execution to a policy engine 2514 on policy decision server "PDServer1" 2513. The policy engine ("master") 2512 on the workstation attempts to communicate with the policy engine ("helper") 2514 on PDServer1. If the master policy engine fails to communicate with the helper policy engine, the policy effect of the delegation policy will be DENY.

Step 5 (2505): In case communications with a helper policy engine on PDServer1 (2513) are successful, the helper policy engine 2514 receives the delegation policy 2515 execution request from the master policy engine 2512 along with all event data collected by the workstation policy enforcer (where the master policy engine is located). The helper policy engine selects policies relevant to the data received and evaluates the relevant policies. The consequence resulting from the policy evaluation is returned to the master policy engine. In this case, assume the above delegation target policy 2516 is selected, the recipients contained in the event data have nondisclosure agreements on record, and the policy evaluation produces a policy effect of ALLOW.

(a) Note that the policy selection step described in step 5 (2505) is not required if a delegation target policy (2516) or a set of delegation target policies is named in the delegation policy (2515). In this case, the named delegation target policy (2516) or delegation target policy set is evaluated.

Step 6 (2506): The consequence produced by the helper policy engine 2514 on PDServer1 is returned to the master policy engine 2512 on the workstation. The master policy engine returns the consequence to the interceptor and consequence applicator 2511. In this example, which is a simplified scenario, the consequence produced by the helper policy engine is returned to the interceptor and consequence applicator. In a more complex scenario, this consequence can be combined with other policy consequences in the master policy engine using a combining algorithm to produce a final consequence that is returned to the interceptor and consequence applicator on the workstation.

Step 7 (2507): The interceptor and consequence applicator 2511 receives the consequence containing a policy effect of ALLOW from by the master policy engine 2512. The consequence applicator in the interceptor and consequence applicator 2511 applies the policy effect ALLOW which allows the send message operation to continue.

Step 8 (2508): Application program code in Microsoft Outlook is executed to complete the send message operation.

Figure 26:
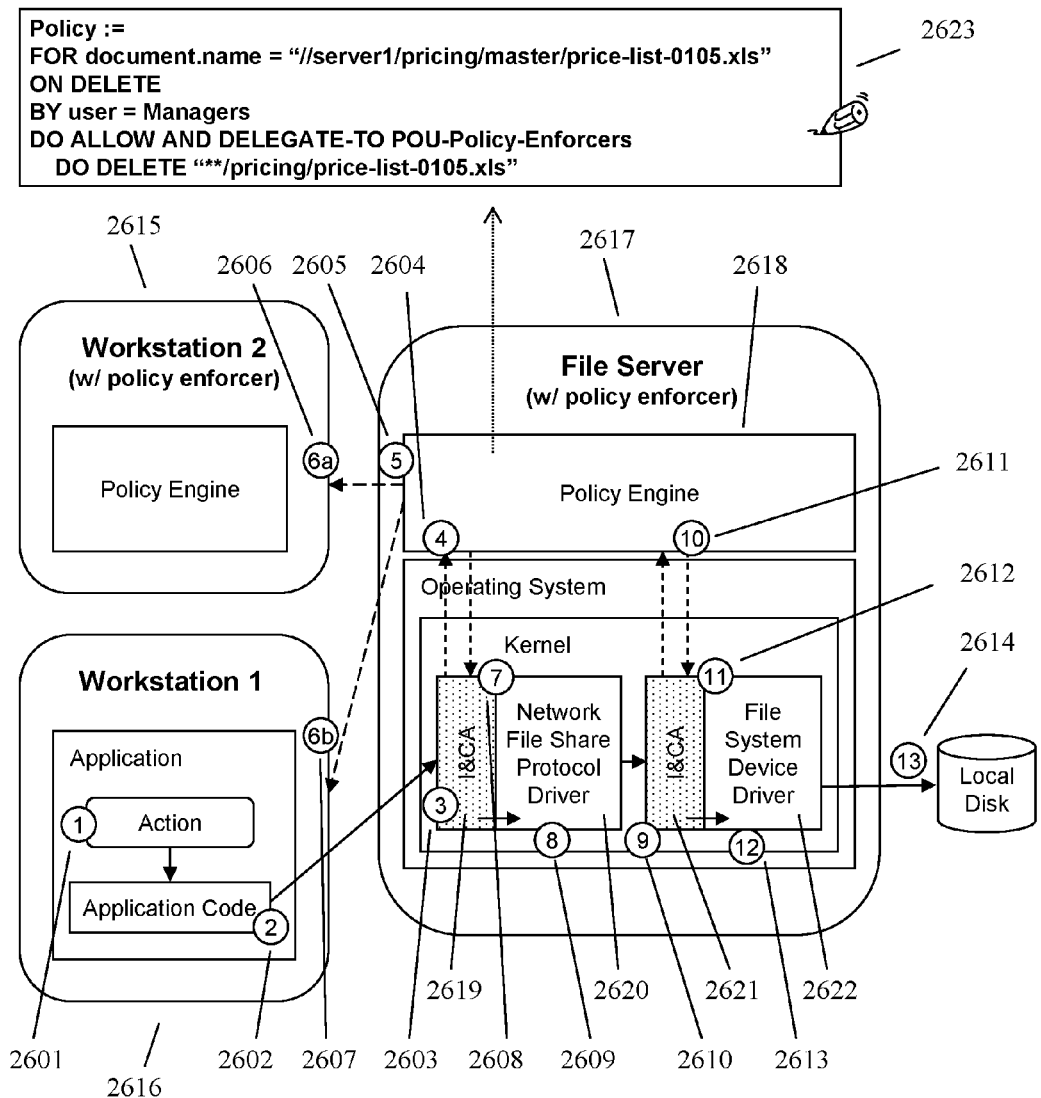
FIG. 26 is a block diagram that illustrates a document server policy that requires copies of a file on all workstations be deleted when the master copy on a document server is deleted according to the invention.

FIG. 26 illustrates an embodiment where a document server policy requires that copies of a file on all workstations be deleted when the master copy of the same file on a document server is deleted.

The policy definition is:

```
FOR document.name = "//server1/pricing/master/price-list-0105.xls"
ON DELETE
BY user = Managers
DO ALLOW AND DELEGATE-TO POU-Policy-Enforcers
DO DELETE "**/pricing/price-list-0105.xls"
```

A delegation directive, DELEGATE-TO, is specified in the policy to instruct a policy engine to delegate policy consequence implementation to all policy enforcers belong to a POU-Policy-Enforcers group. The policy consequence to be implemented (i.e., DELETE "**/pricing/price-list-0105.xls") is specified using a DO directive.

Step 1 (2601): A user at a workstation 1 (2616) tries to delete a master price list file on a file server.

Step 2 (2602): Application program code is executed on workstation 1 (2616) that results in a delete file request on the file server 2617.

Step 3 (2603): A network file share protocol interceptor 2619 on the file server intercepts the delete file request from workstation 1 (2616). The interceptor collects information about the delete file request and forwards the collected data to a policy engine 2618 on the file server.

Step 4 (2604): The policy engine 2618 on the file server receives the data collected by the interceptor and consequence applicator 2619 and selects polices relevant to the data received. Among the relevant policies there is a policy (2623) that specifies the delegation of consequence applications to other policy enforcers (referred to as "delegation policy" below). The policy engine proceeds with the policy evaluation.

Step 5 (2605): The conditions in the delegation policy (2623) are satisfied and the policy engine 2618 processes the delegation task specified in the consequence portion of the delegation policy (2623). The policy engine ("master") 2618 on the file server attempts to communicate with the "POU-Policy-Enforcers" specified in the delegation policy (2623). For each point-of-use policy enforcer ("helper") contacted, the master policy engine instructs the helper policy enforcer to carry out the portion of the consequence to be delegated.

Steps 6a and 6b (2606, 2607): The helper policy enforcer receives a consequence delegation request from the master policy engine and carries out the delegated consequence accordingly. In this case, if one or more copies of the specified price list file exist, they will be deleted from the workstation's storage devices.

Step 7 (2608): The interceptor and consequence applicator 2619 receives a consequence returned from the master policy engine. In this case, the consequence contains a policy effect of ALLOW and the interceptor and consequence applicator allows the delete file request to be carried out.

Step 8 (2609): The network file share protocol driver 2620 logic that implements a delete file request is executed.

Steps 9-13 (2610-2614): The steps between step 9 and step 13 as shown in the figure may or may not be carried out depending on policy enforcer and file server implementations. The following outlines one of the possible scenarios:

(a) In step 8 (2609), the network file share protocol driver 2620 logic results in a call to the file system device driver 2622. The call is intercepted at step 9 (2610) by an interceptor and consequence applicator component 2621. The interceptor collects information about the intercepted operation and forwards that data to the policy engine 2618. Policy engine evaluates relevant policies in step 10 (2611) and returns a policy effect of ALLOW to the interceptor and consequence applicator. In step 11 (2612), the interceptor and consequence applicator allows the call to be carried out. In steps 12 and 13 (2613, 2614) the file system device driver 2622 logic is executed to serve the file open request which involves accessing data on a local disk.

3.0 Implementation Mechanisms—Hardware Overview

Figure 27:
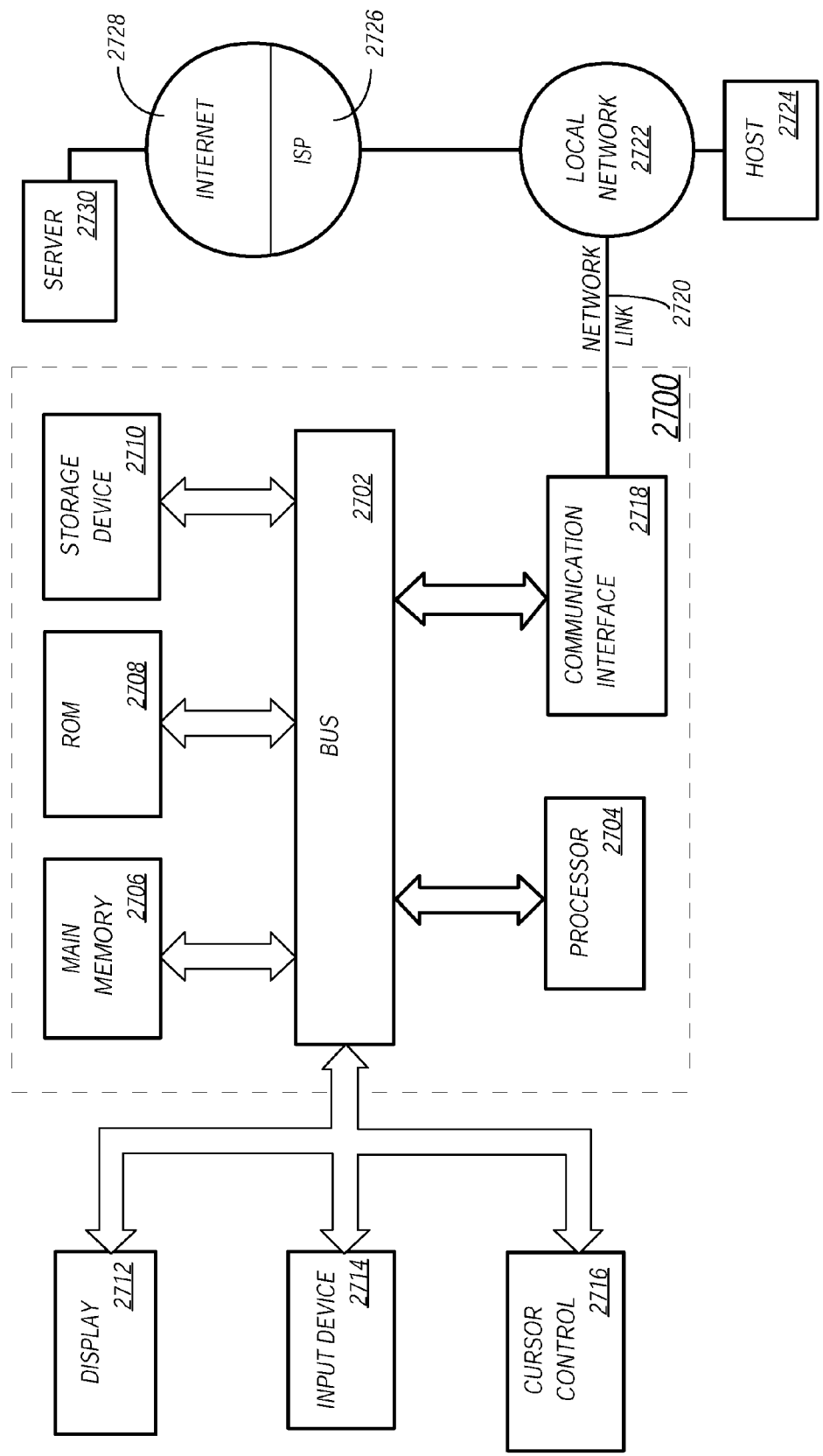
FIG. 27 is a block diagram that illustrates a computer system upon which an embodiment may be implemented.

FIG. 27 is a block diagram that illustrates a computer system 2700 upon which an embodiment of the invention may be implemented. Computer system 2700 includes a bus 2702 or other communication mechanism for communicating information, and a processor 2704 coupled with bus 2702 for processing information. Computer system 2700 also includes a main memory 2706, such as a random access memory ("RAM") or other dynamic storage device, coupled to bus 2702 for storing information and instructions to be executed by processor 2704. Main memory 2706 also may be used for storing temporary variables or other intermediate information during execution of instructions to be executed by processor 2704. Computer system 2700 further includes a read only memory ("ROM") 2708 or other static storage device coupled to bus 2702 for storing static information and instructions for processor 2704. A storage device 2710, such as a magnetic disk or optical disk, is provided and coupled to bus 2702 for storing information and instructions.

Computer system 2700 may be coupled via bus 2702 to a display 2712, such as a cathode ray tube ("CRT"), for displaying information to a computer user. An input device 2714, including alphanumeric and other keys, is coupled to bus 2702 for communicating information and command selections to processor 2704. Another type of user input device is cursor control 2716, such as a mouse, trackball, stylus, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

The invention is related to the use of computer system 2700 for controlling document access using centrally managed rules. According to one embodiment of the invention, controlling document access using centrally managed rules is provided by computer system 2700 in response to processor 2704 executing one or more sequences of one or more instructions contained in main memory 2706. Such instructions may be read into main memory 2706 from another computer-readable medium, such as storage device 2710. Execution of the sequences of instructions contained in main memory 2706 causes processor 2704 to perform the process steps described in this application. In alternative embodiments, hard-wired circuitry may be used in place of or in combination with software instructions to implement the invention. Thus, embodiments of the invention are not limited to any specific combination of hardware circuitry and software.

The term "computer-readable medium" as used in this application refers to any medium that participates in providing instructions to processor 2704 for execution. Such a medium may take many forms, including but not limited to, nonvolatile media, volatile media, and transmission media. Nonvolatile media includes, for example, optical or magnetic disks, such as storage device 2710. Volatile media includes dynamic memory, such as main memory 2706. Transmission media includes coaxial cables, copper wire and fiber optics, including the wires that comprise bus 2702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described in this application after, or any other medium from which a computer can read.

Various forms of computer readable media may be involved in carrying one or more sequences of one or more instructions to processor 2704 for execution. For example, the instructions may initially be carried on a magnetic disk of a remote computer. The remote computer can load the instructions into its dynamic memory and send the instructions over a telephone line using a modem. A modem local to computer system 2700 can receive the data on the telephone line and use an infrared transmitter to convert the data to an infrared signal. An infrared detector can receive the data carried in the infrared signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network ("ISDN") card or a modem to provide a data communication connection to a corresponding type of telephone line. As another example, communication interface 2718 may be a local area network ("LAN") card to provide a data communication connection to a compatible LAN. Wireless links may also be implemented. In any such implementation, communication interface 2718 sends and receives electrical, electromagnetic, or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider ("ISP") 2726. ISP 2726 in turn provides data communication services through the world wide packet data communication network now commonly referred to as the "Internet" 2728. Local network 2722 and Internet 2728 both use electrical, electromagnetic, or optical signals that carry digital data streams. The signals through the various networks and the signals on network link 2720 and through communication interface 2718, which carry the digital data to and from computer system 2700, are exemplary forms of carrier waves transporting the information.

Computer system 2700 can send messages and receive data, including program code, through the network(s), network link 2720 and communication interface 2718. In the Internet example, a server 2730 might transmit a requested code for an application program through Internet 2728, ISP 2726, local network 2722 and communication interface 2718. In accordance with the invention, one such downloaded application provides for controlling document access using centrally managed rules as described in this application.

The received code may be executed by processor 2704 as it is received, and/or stored in storage device 2710, or other nonvolatile storage for later execution. In this manner, computer system 2700 may obtain application code in the form of a carrier wave.

4.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

The invention claimed is:

1. A method comprising:
controlling usage, at a client system, of an application program,
wherein the usage comprises an operational functionality of the application program comprising at least one of editing or copying content of a document opened by the application program,
the controlling step limits the application program's operational functionality in accordance to at least one rule stored on the client system,
the at least one rule contains at least one expression used by the controlling step to control application program operation,
the application program comprises a first modification and a second modification relative to the application program in unmodified form,
the first modification comprises an interception feature, and
the second modification comprises a usage control feature; and
controlling access, at a server, to documents,
wherein the controlling step limits document access operation in accordance to at least one rule stored on the server, and
the at least one rule contains at least one expression used by the controlling step to control document access operation, wherein the controlling usage, at a client system, of an application program comprises
detecting at the client system, via the interception feature of the application program, an application program operation corresponding to at least one low-level operation on a first document managed by the server associated with a first application program operation from a first application executing on the client system, and
intercepting the application program operation corresponding to the at least one low-level operation, based on the detected application program operation by the interception feature, to prevent the at least one low-level operation from executing.

2. The method of claim 1 comprising:
collecting at the client system information on the first application program operation; and
receiving at the server the collected information on the first application executing on the client system.

3. A method of controlling application usage and document access in a plurality of computers using centrally managed rules, the method comprising:
controlling usage of an application program on a computer system,
wherein the usage comprises an operational functionality of the application program comprising at least one of editing or copying content of a document opened by the application program,
wherein the controlling usage step limits the application program's operational functionality in accordance with at least one rule stored on the computer system,
wherein the at least one rule comprises a first expression used by the controlling usage step to control application program operation,
wherein the application program comprises a modification to include an interception feature installed on the client system after installation of the application program, and
wherein installation of the interception feature comprises modifying the application program to perform usage control; and
controlling, on a computer system, access to documents,
wherein the controlling access step limits the document access operation via the interception feature in accordance with the at least one rule stored on the computer system, and
wherein the at least one rule comprises a second expression used by the controlling access step to control access to documents.

4. The method of claim 3 wherein the at least one rule comprises a first rule comprising the first expression and a second rule comprising the second expression.

5. The method of claim 3 wherein the at least one rule comprises a first rule comprising the first expression and the second expression.

6. A method of controlling application usage and document access in a plurality of computers using centrally managed rules, the method comprising:

controlling usage of an application program on a computer system, wherein the usage comprises an operational functionality of the application program comprising at least one of editing or copying content of a document opened by the application program, wherein the controlling usage step limits the application program's operational functionality in accordance with a rule stored on the computer system, wherein the rule comprises an expression used by the controlling usage step to control application program operation, wherein the application program is modified to include an interception feature installed on the client system after installation of the application program, and wherein installation of the interception feature includes modifying the application program to perform usage control; and controlling, on a computer system, access to documents, wherein the controlling access step limits the document access operation via the interception feature in accordance with the rule stored on the computer system, and wherein the expression of the rule is used by the controlling access step to control access to documents.

7. The method of claim 1 wherein the usage being controlled is different from the access being controlled.

8. The method of claim 1 wherein the usage being controlled comprises an operational functionality of the application program to a document after access has been permitted to the document, wherein the access comprises opening of the document.

9. The method of claim 1 wherein as a result of the controlling access, at a server, to documents, the client is permitted to open a document, and as a result of the controlling usage, at a client system, of an application program, usage of the application program on the open document can be controlled.

10. The method of claim 3 wherein as a result of the controlling access, at a server, to documents, the client is permitted to open a document, and as a result of the controlling usage, at a client system, of an application program, usage of the application program to alter a content of the open document can be controlled.

11. The method of claim 6 wherein as a result of the controlling access, at a server, to documents, the client is permitted to open a document, and as a result of the controlling usage, at a client system, of an application program, usage of the application program to alter a content of the open document can be controlled.

12. The method of claim 1 wherein the low-level operation on a first document comprises a cut-and-paste operation.

13. The method of claim 1 wherein the operational functionality of the application program comprises a cut-and-paste operation.

14. The method of claim 3 wherein the operational functionality of the application program comprises a cut-and-paste operation.

15. The method of claim 6 wherein the operational functionality of the application program comprises a cut-and-paste operation.

16. The method of claim 2 comprising:
evaluating whether to allow the first application program operation at the client system based on the collected information on the first application and the first application program operation.

* * * * *